US008623931B2

(12) United States Patent
Parker et al.

(10) Patent No.: US 8,623,931 B2
(45) Date of Patent: *Jan. 7, 2014

(54) PROTEIN-CONTAINING FOAMS, MANUFACTURE AND USE THEREOF

(75) Inventors: Anthony A. Parker, Newtown, PA (US); Joseph J. Marcinko, West Deptford, NJ (US)

(73) Assignee: Biopolymer Technologies, Ltd., Tel Aviv (IL)

( * ) Notice: Subject to any disclaimer, the term of this patent is extended or adjusted under 35 U.S.C. 154(b) by 208 days.

This patent is subject to a terminal disclaimer.

(21) Appl. No.: 12/719,721

(22) Filed: Mar. 8, 2010

(65) Prior Publication Data

US 2010/0305227 A1    Dec. 2, 2010

Related U.S. Application Data

(60) Provisional application No. 61/157,944, filed on Mar. 6, 2009, provisional application No. 61/246,208, filed on Sep. 28, 2009, provisional application No. 61/246,215, filed on Sep. 28, 2009.

(51) Int. Cl.
C08G 18/64    (2006.01)
C08G 18/00    (2006.01)

(52) U.S. Cl.
USPC ............................. 521/102; 521/155; 521/170

(58) Field of Classification Search
USPC ........................................ 521/102, 170, 155
See application file for complete search history.

(56) References Cited

U.S. PATENT DOCUMENTS

| | | | |
|---|---|---|---|
| 1,460,757 A | 7/1923 | Johnson et al. | |
| 2,881,076 A | 4/1959 | Sair | |
| 3,075,930 A * | 1/1963 | Stewart et al. | 521/102 |
| 3,629,162 A * | 12/1971 | Richardson et al. | 521/163 |
| 3,658,731 A * | 4/1972 | Richardson et al. | 521/102 |
| 3,966,971 A * | 6/1976 | Morehouse et al. | 435/272 |
| 4,098,645 A | 7/1978 | Hartdegen et al. | |
| 4,109,057 A | 8/1978 | Nakamura et al. | |
| 4,246,360 A | 1/1981 | Brown et al. | |
| 4,320,208 A | 3/1982 | Reischl et al. | |
| 4,322,364 A * | 3/1982 | Hughes et al. | 560/351 |
| 4,327,195 A | 4/1982 | Cioca et al. | |
| 4,390,450 A | 6/1983 | Gibson et al. | |
| 4,497,862 A * | 2/1985 | Cioca et al. | 428/220 |
| 4,609,690 A | 9/1986 | Gruber et al. | |
| 4,689,381 A | 8/1987 | Krinski et al. | |
| 5,035,902 A | 7/1991 | Bilinski et al. | |
| 5,130,404 A * | 7/1992 | Freeland | 528/52 |
| 5,133,991 A | 7/1992 | Norman et al. | |
| 5,348,760 A | 9/1994 | Parker et al. | |
| 5,366,550 A | 11/1994 | Schad | |
| 5,506,285 A | 4/1996 | Timm et al. | |
| 5,523,293 A | 6/1996 | Jane et al. | |
| 5,607,633 A | 3/1997 | Sleeter et al. | |
| 5,648,420 A | 7/1997 | Fujiwara et al. | |
| 5,656,689 A | 8/1997 | Fujiwara et al. | |
| 5,681,505 A | 10/1997 | Phillips et al. | |
| 5,703,157 A | 12/1997 | Fujiwara et al. | |
| 5,710,190 A | 1/1998 | Jane et al. | |
| 5,719,301 A | 2/1998 | Sleeter | |
| 5,962,541 A * | 10/1999 | Peterson et al. | 521/131 |
| 5,968,995 A * | 10/1999 | Rizk et al. | 521/159 |
| 6,080,405 A | 6/2000 | Ishibashi et al. | |
| 6,231,985 B1 | 5/2001 | Chen et al. | |
| 6,306,997 B1 | 10/2001 | Kuo et al. | |
| 6,335,043 B1 * | 1/2002 | Jiang et al. | 426/425 |
| 6,365,650 B1 | 4/2002 | Chen et al. | |
| 6,420,443 B1 * | 7/2002 | Clark et al. | 521/114 |
| 6,465,569 B1 | 10/2002 | Kurth | |
| 6,489,391 B1 | 12/2002 | Schilling et al. | |
| 6,495,056 B2 | 12/2002 | Kubo et al. | |
| 6,518,387 B2 | 2/2003 | Kuo et al. | |
| 6,649,667 B2 * | 11/2003 | Clatty | 521/170 |
| 6,730,299 B1 | 5/2004 | Tayot et al. | |
| 6,841,101 B2 | 1/2005 | Nakos et al. | |
| 6,852,407 B2 | 2/2005 | Yasue | |
| 6,866,880 B2 | 3/2005 | Bhattacharya et al. | |
| 6,884,756 B2 | 4/2005 | Lynch et al. | |
| 6,893,579 B2 | 5/2005 | Espiard et al. | |
| 7,060,798 B2 | 6/2006 | Li et al. | |
| 7,081,159 B2 | 7/2006 | Thames et al. | |
| 7,175,701 B2 | 2/2007 | Oyasato et al. | |
| 7,226,615 B2 | 6/2007 | Yuksel et al. | |
| 7,252,735 B2 | 8/2007 | Li | |
| 7,253,244 B2 | 8/2007 | Gruenewaelder et al. | |
| 7,265,169 B2 | 9/2007 | Li et al. | |
| 7,285,583 B2 | 10/2007 | Stumphauzer et al. | |
| 7,345,136 B2 | 3/2008 | Wescott et al. | |

(Continued)

FOREIGN PATENT DOCUMENTS

CN    1698453 A    11/2005
EP    1268702 B1    9/2005

(Continued)

OTHER PUBLICATIONS

Derwent abstract of JP 04-214475 (published 1992).*
Hettiarachchy et al. (1995) "Alkali-Modified Soy Protein with Improved Adhesive and Hydrophobic Properties," JAOCS 72(12):1461-1464.
Hettiarachchy et al. (1996) "Preparation and Functional Properties of a Protein Isolate from Defatted Wheat Germ," Cereal Chem. 73(3):363-367.
International Preliminary Report on Patentability and Written Opinion of the International Searching Authority of International Patent Application No. PCT/US2010/026526, issued on Sep. 6, 2011 (11 pages).
International Preliminary Report on Patentability and Written Opinion of the International Searching Authority of International Patent Application No. PCT/US2010/026553, issued on Sep. 6, 2011 (7 pages).
International Search Report of International Patent Application No. PCT/US2010/026526, mailed Mar. 15, 2011 (6 pages).
International Search Report of International Patent Application No. PCT/US2010/026553, mailed Nov. 16, 2010 (4 pages).
Javni et al. (2003) "Effect of Different Isocyanates on the Properties of Soy-Based Polyurethanes," Journal of Applied Polymer Science 88:2912-2916.

(Continued)

Primary Examiner — Melissa Rioja
(74) Attorney, Agent, or Firm — Goodwin Procter LLP

(57) ABSTRACT

The invention relates generally to protein-containing polyurethane foams, methods and compositions for making the polyurethane foams, and articles comprising the polyurethane foams.

53 Claims, 19 Drawing Sheets

(56) References Cited

U.S. PATENT DOCUMENTS

| | | | |
|---|---|---|---|
| 7,387,795 B2 | 6/2008 | Hollenberg et al. | |
| 7,393,930 B2 | 7/2008 | Li et al. | |
| 7,416,598 B2 | 8/2008 | Sun et al. | |
| 7,625,441 B2 | 12/2009 | Gagnon et al. | |
| 7,704,537 B2 | 4/2010 | Lopez et al. | |
| 7,722,712 B2 | 5/2010 | Li | |
| 7,772,313 B2 | 8/2010 | Stumphauzer et al. | |
| 7,785,440 B2 | 8/2010 | Li | |
| 7,789,932 B2 | 9/2010 | Anderson et al. | |
| 7,803,855 B2 | 9/2010 | Kintzley et al. | |
| 2002/0005251 A1 | 1/2002 | Sun et al. | |
| 2002/0010233 A1* | 1/2002 | Yasue | 524/21 |
| 2003/0212227 A1 | 11/2003 | Stroobants et al. | |
| 2005/0070635 A1 | 3/2005 | Breyer et al. | |
| 2005/0113257 A1 | 5/2005 | Lynch et al. | |
| 2005/0165220 A1* | 7/2005 | Barker et al. | 530/377 |
| 2005/0222358 A1 | 10/2005 | Wescott et al. | |
| 2005/0234156 A1 | 10/2005 | Thames et al. | |
| 2005/0250900 A1 | 11/2005 | Stofko | |
| 2005/0257905 A1 | 11/2005 | Shoseyov | |
| 2005/0272892 A1 | 12/2005 | Hse et al. | |
| 2005/0277733 A1 | 12/2005 | Wescott et al. | |
| 2005/0282988 A1 | 12/2005 | Li | |
| 2006/0135368 A1 | 6/2006 | Anderson et al. | |
| 2006/0156954 A1 | 7/2006 | Li et al. | |
| 2006/0194010 A1 | 8/2006 | Hiscock | |
| 2006/0231968 A1 | 10/2006 | Cowan et al. | |
| 2007/0020476 A1 | 1/2007 | Kintzley et al. | |
| 2007/0148339 A1 | 6/2007 | Wescott et al. | |
| 2007/0180877 A1 | 8/2007 | Anderson et al. | |
| 2007/0244300 A1* | 10/2007 | Schweizer et al. | 530/377 |
| 2007/0281145 A1 | 12/2007 | Khabbaz | |
| 2008/0021187 A1 | 1/2008 | Wescott et al. | |
| 2008/0027159 A1 | 1/2008 | Rivers et al. | |
| 2008/0050602 A1 | 2/2008 | Spraul et al. | |
| 2008/0063759 A1 | 3/2008 | Raymond et al. | |
| 2008/0063760 A1 | 3/2008 | Raymond et al. | |
| 2008/0064852 A1 | 3/2008 | Ddamulira et al. | |
| 2008/0095914 A1 | 4/2008 | Deak et al. | |
| 2008/0125577 A1* | 5/2008 | Gosnell et al. | 530/377 |
| 2008/0213597 A1 | 9/2008 | Li | |
| 2008/0234458 A1 | 9/2008 | West | |
| 2008/0255333 A1 | 10/2008 | Trocino | |
| 2008/0281069 A1 | 11/2008 | Jennissen | |
| 2008/0287635 A1 | 11/2008 | Sun et al. | |
| 2008/0292886 A1 | 11/2008 | Allen et al. | |
| 2009/0013743 A1 | 1/2009 | Lynch et al. | |
| 2009/0098387 A1 | 4/2009 | Brady et al. | |
| 2009/0197036 A1 | 8/2009 | Hwang et al. | |
| 2010/0048875 A1* | 2/2010 | Segall et al. | 530/377 |
| 2010/0063255 A1* | 3/2010 | Logie et al. | 530/377 |
| 2010/0069533 A1 | 3/2010 | Brady et al. | |
| 2010/0069534 A1 | 3/2010 | Wescott et al. | |
| 2010/0240805 A1 | 9/2010 | Miller et al. | |
| 2010/0258033 A1 | 10/2010 | Yang et al. | |
| 2010/0285295 A1 | 11/2010 | Wang et al. | |
| 2010/0310877 A1 | 12/2010 | Parker et al. | |
| 2011/0048280 A1 | 3/2011 | Wescott et al. | |
| 2011/0132551 A1* | 6/2011 | Klapdohr et al. | 159/49 |
| 2013/0131231 A1 | 5/2013 | Bouguettaya et al. | |

FOREIGN PATENT DOCUMENTS

| | | |
|---|---|---|
| EP | 973640 | 9/2007 |
| EP | 1900642 | 3/2008 |
| EP | 1900650 | 3/2008 |
| EP | 1588628 | 5/2008 |
| EP | 1268702 B2 | 9/2009 |
| EP | 2236578 | 10/2010 |
| EP | 2163590 | 7/2011 |
| EP | 1742542 | 11/2011 |
| GB | 1065015 | 4/1967 |
| JP | 04214475 A * | 8/1992 |
| WO | WO-9319125 | 9/1993 |
| WO | WO-02062866 | 8/2002 |
| WO | WO-2005035665 | 4/2005 |
| WO | WO-2005072260 | 8/2005 |
| WO | WO-2005099477 | 10/2005 |
| WO | WO-2005100451 | 10/2005 |
| WO | WO-2005113700 | 12/2005 |
| WO | WO-2006041469 | 4/2006 |
| WO | WO-2006112672 A1 | 10/2006 |
| WO | WO-2006132785 | 12/2006 |
| WO | WO-2007008385 | 1/2007 |
| WO | WO-2007064970 | 6/2007 |
| WO | WO-2007086632 | 8/2007 |
| WO | WO-2008011455 | 1/2008 |
| WO | WO-2008024444 | 2/2008 |
| WO | WO-2008118741 | 10/2008 |
| WO | WO-2009013482 A2 * | 1/2009 |
| WO | WO-2009048598 | 4/2009 |
| WO | WO-2010065758 | 6/2010 |
| WO | WO-2010102284 | 9/2010 |
| WO | WO-2010102297 | 9/2010 |
| WO | WO-2011025911 | 3/2011 |

OTHER PUBLICATIONS

Kumar et al. (2002) "Adhesives and plastics based on soy protein products," Industrial Crops and Products 16:155-172.

Lambuth, A.L., Soybean Glues, in *Handbook of Adhesives*, 2nd ed., Van Nostrand Reinhold, New York, 1977, pp. 172-180.

Lin et al. (1996) "Physical, Mechanical and Thermal Properties of Water-Blown Rigid Polyurethane Foam Containing Soy Protein Isolate," Cereal Chem 73(2):189-196.

Lin et al. (1997) "Water-Blown Flexible Polyurethane Foam Extended with Biomass Materials," Journal of Applied Polymer Science 65(4):695-703.

Allen et al. (2010) "Investigations of the Molecular Interactions of Soy-Based Adhesives," Forest Products Journal 60(6):534-540.

Mo et al. (1999) "Effects of Molding Temperature and Pressure on Properties of Soy Protein Polymers," Journal of Applied Polymer Science 73:2595-2602.

Park et al. (1999) "Physical and Mechanical Properties of Soy Protein-Based Plastic Foams," JAOCS 76:1201-1205.

Shih (1994) "Interaction of Soy Isolate with Polysaccharide and Its Effect on Film Properties," JAOCS 71(11):1281-1285.

Swain et al. (2005) "Biodegradable Polymers. Part II. Thermal degradation of biodegradable plastics cross-linked from formaldehyde-soy protein concentrate," J. Therm. Anal. Cal. 79:33-38.

Wang et al. (2007) "Soy Protein Adhesion Enhanced by Glutaraldehyde Crosslink," Journal of Applied Polymer Science 104:130-136.

Wang et al. (2009) "Improved Water Resistance of Soy Protein Adhesive at Isoelectric Point," Transactions of the ASABE 52(1):173-177.

Wu et al. (2001) "Effects of the Molecular Weight on the Properties of Thermoplastics Prepared from Soy Protein Isolate," Journal of Applied Polymer Science 82:3373-3380.

Zhang et al. (2003) "Ways of Strengthening Biodegradable Soy-Dreg Plastics," Journal of Applied Polymer Science 88:422-427.

Zhong et al. (2001) "Properties of soy protein isolate/polycaprolactone blends compatibilized by methylene diphenyl diisocyanate," Polymer 42:6961-6969.

Zhong et al. (2007) "Isoelectric pH of Polyamide-Epichlorohydrin Modified Soy Protein Improved Water Resistance and Adhesion Properties," Journal of Applied Polymer Science 103:2261-2270.

Weimer et al. "Wood adhesives prepared from lucerne fiber fermentation residues of *Ruminococcus albus* and *Clostridium thermocellum*," Appl. Microbiol. Biotechnol., vol. 66, pp. 635-640, 2005.

International Search Report and Written Opinion dated Feb. 7, 2012 for International Application No. PCT/US2011/039453, International Filing Date Jun. 7, 2011.

Kretschmer et al. (1957) "Infrared Spectroscopy and Optical Rotatory Dispersion of Zein, Wheat Gluten and Gliadin," *J. Phys. Chem.* 61:1627-1631.

Chinese Office Action dated Oct. 10, 2013 for Chinese Patent Application No. 201080019599.3 (14 pages).

* cited by examiner

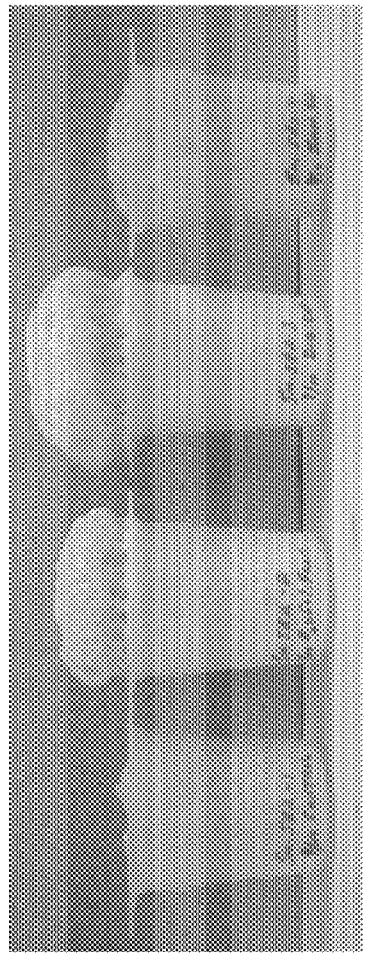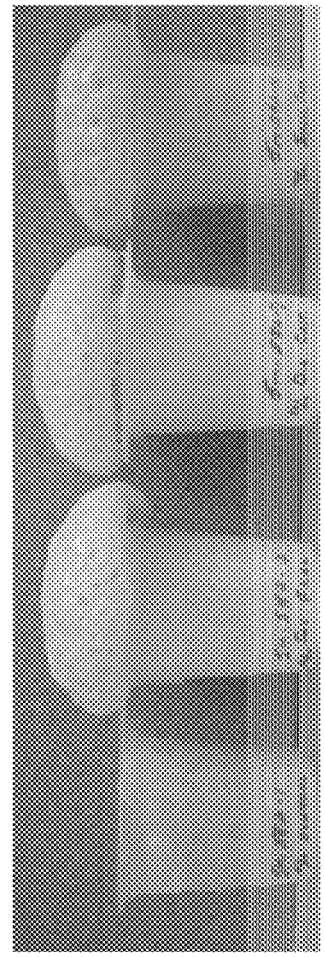
Figure 17(A)  Figure 17(B)
Figure 17

PROTEIN-CONTAINING FOAMS, MANUFACTURE AND USE THEREOF

CROSS-REFERENCE TO RELATED APPLICATIONS

This application claims the benefit of and priority to co-pending U.S. Provisional Patent Application Ser. No. 61/246,215, filed Sep. 28, 2009, to co-pending U.S. Provisional Patent Application No. 61/246,208, filed Sep. 28, 2009, and to co-pending U.S. Provisional Patent Application No. 61/157,944, filed Mar. 6, 2009, the entire contents of each of which are incorporated by reference herein.

FIELD OF THE INVENTION

The invention relates generally to protein-containing foams, their manufacture and their use.

BACKGROUND

Foams are used in a wide variety of industrial and consumer applications including, for example, foam insulation, packaging foams, crash padding, carpet backings, decorative foams for simulated wood furnishings, etc. Utilization of these foams continues to grow throughout the world. The growth can be attributed to, among other things, their light weight, good strength to weight ratio, their insulation and sound proofing properties, and the energy absorbing properties of foams. Polyurethane foams are very popular and can be made in a variety of different forms. For example, polyurethane foam can be fabricated in a flexible, semi-rigid, or rigid form with flexible foams generally being softer, less dense, more pliable, and more subject to structural rebound subsequent to loading than rigid foams.

The preparation of polyurethane foams have been discussed extensively in the foam arts. Nevertheless, a common approach for making polyurethane foams is by reaction of a polyol and an isocyanate, which forms the backbone urethane group. Typically, a blowing agent, for example, an inert gas or a compound that creates gas, is used to create cells within the foam. Additional modulating agents, for example, catalysts and surfactants can be added during production to modulate the properties of the resulting foam product.

Recently, efforts have been underway to replace or reduce the use of polyester or polyether polyols in the production of polyurethane foams, with a more versatile, renewable, less costly, and more environmentally friendly components. For example, foams have been produced using fatty acid triglycerides derived from vegetables. Because such materials are renewable, relatively inexpensive, versatile, and environmentally friendly, they are desirable as ingredients for foam manufacture.

However, there still exists a need for the development of renewable, less costly, and more environmentally friendly agents that can modulate the properties of foam. For example, renewable materials that can be used to improve the properties of foam, such as a higher foam rise, uniform cell structure, and/or a lower density foam, would be advantageous. Of particular value would be a material present in waste by-products, which can be obtained inexpensively and in large quantities.

SUMMARY

The invention is based, in part, upon the discovery that certain protein compositions derivable from a variety of starting materials, for example, waste plant biomass, can be used to modulate the properties of foam, and can, for example, make lower density foams containing a greater number of smaller, more uniform cells.

In one aspect, the invention provides an isolated, water-soluble polypeptide composition capable of stabilizing a polyurethane-based foam. The isolated, water-soluble polypeptide fraction comprises one or more of the following features: (a) an amide-I absorption band between about 1633 $cm^{-1}$ and 1680 $cm^{-1}$, as determined by solid state Fourier Transform Infrared spectroscopy (FTIR); (b) an amide-II band between approximately 1522 $cm^{-1}$ and 1560 $cm^{-1}$, as determined by solid state FTIR; (c) two prominent 1° amide N—H stretch absorption bands centered at about 3200 $cm^{-1}$, and at about 3300 $cm^{-1}$, as determined by solid state FTIR; (d) a prominent cluster of protonated nitrogen nuclei defined by $^{15}N$ chemical shift boundaries at about 94 ppm and about 100 ppm, and $^1H$ chemical shift boundaries at about 7.6 ppm and at about 8.1 ppm, as determined by solution state, two-dimensional proton-nitrogen coupled NMR; (e) an average molecular weight of between about 600 and about 2,500 Daltons; (f) an inability to stabilize an oil-in-water emulsion, wherein, when an aqueous solution comprising 14 parts by weight of protein dissolved or dispersed in 86 parts by weight of water is admixed with 14 parts by weight of polymeric diphenylmethane diisocyanate (PMDI), the aqueous solution and the PMDI produce an unstable suspension that macroscopically phase separates under static conditions within five minutes after mixing; (g) the water-soluble polypeptide composition is capable of stabilizing a polyurethane-based foam relative to a polyurethane-based foam created from the same starting composition lacking the water-soluble protein composition; and (h) the water-soluble polypeptide composition is capable of reducing the density of a polyurethane-based foam by at least 5% (for example, at least 10%, 20%, 30%, 40%, 50%, 60%, 70%, 80%, 90% or 100%) relative to a polyurethane-based foam created from the same starting composition but that lacks the water-soluble polypeptide composition.

In another aspect the invention provides a method for preparing an isolated, water-soluble polypeptide composition for use in the preparation of a foam. The method comprises: (a) dispersing a protein containing starting material in an aqueous solution at a pH greater than about 6.5 for at least 5 minutes to produce a suspension containing particulate matter; (b) after step (a), optionally reducing the pH to about 4.0-5.0; and then separating the aqueous solution from the particulate matter thereby to harvest a solution enriched for the water-soluble polypeptide composition described herein.

In certain embodiments, the method further comprises one or more of: (i) prior to step (a), digesting the starting material with an enzyme; (ii) after step (a), digesting the suspension with an enzyme; (iii) after step (b), digesting the suspension with an enzyme; or (iv) after step (c), digesting the solution enriched for the water-soluble polypeptide composition with an enzyme. Useful enzymes include, for example, a serine-, leucine-, lysine-, or arginine-specific protease. The method optionally further comprises drying the water-soluble polypeptide composition harvested in step (c).

In each of the these aspects, the water-soluble protein composition can be derived from animal material (for example, milk and whey, fishmeal, animal tissue) or from plant material (for example, corn, wheat, sunflower, cotton, rapeseed, canola, castor, soy, camelina, flax, jatropha, mallow, peanuts, algae, legumes, palm, tobacco, sugarcane bagasse, and combinations thereof). In certain other embodiments, the starting material (the biomass) in the process for making the water-soluble protein composition can be whey, canola meal, canola protein isolate, castor meal, castor protein isolate, soy meal, soy protein isolate, or a combination thereof.

In another aspect, the invention provides a foam produced using the water-soluble protein composition described herein. The foam can be a polyurethane foam that comprises the reaction product of a mixture comprising: (a) the water-soluble polypeptide composition described herein; (b) an isocyanate-based reactant; and (c) an optional isocyanate-reactive compound. In certain embodiments, the mixture optionally can further comprise, among other things, a surfactant and/or a catalyst and/or a blowing agent.

In another aspect, the invention provides a polyurethane foam comprising a reaction product of a mixture comprising: (a) a protein containing composition, (b) an isocyanate-based reactant, and (c) an optional isocyanate-reactive component, wherein the protein containing composition is capable of reducing the density of the polyurethane foam by at least 5% (for example, by at least 10%, 20%, 30%, 40%, 50%, 60%, 70%, 80% or 90%) relative to a polyurethane foam produced from the same mixture but lacking the protein containing composition. In certain embodiments, the mixture optionally can further comprise, among other things, a surfactant and/or a catalyst and/or a blowing agent.

In another aspect, the invention provides a polyurethane foam comprising a reaction product of a mixture comprising: (a) an isolated protein containing composition, wherein the protein containing composition is capable of dispersing PMDI in an aqueous medium, (b) an isocyanate-based reactant, and (c) an optional isocyanate-reactive component. The protein containing composition comprises a water-insoluble/water dispersible protein fraction either alone or in combination with a water-soluble protein fraction. In certain embodiments, the mixture optionally can further comprise, among other things, a surfactant and/or a catalyst and/or a blowing agent.

In each of the foregoing aspects, the isocyanate-based reactant can be an organic polyisocyanate, for example, a polymeric diphenylmethane diisocyanate, 2,4-tolylene diisocyanate, 2,6-tolylene diisocyanate, benzene diisocyanate, m-xylylene diisocyanate, 1,4-phenylene diisocyanate, 1,3-phenylene diisocyanate, 4,4'-diphenyl diisocyanate, 4,4'-diphenyldimethylmethane diisocyanate, hexamethylene diisocyanate, tolidine diisocyanate, dianisidine diisocyanate, 1,5-naphthalene diisocyanate, 1,4-cyclohexane diisocyanate, or a combination thereof. Alternatively or in addition, the isocyanate-based reactant comprises a urethane, allophanate, urea, biuret, carbodiimide, uretonimine, isocyanurate, or a combination thereof. In certain embodiments, the isocyanate-based reactant can be a polymeric diphenylmethane diisocyanate.

The isocyanate-reactive compound can be a compound nucleophilically reactive with an isocyanate. For example, the isocyanate-reactive compound can be a compound having, for example, a hydroxyl group or an amino group capable of reacting with the isocyanate. In certain embodiments, the isocyanate-reactive compound is a polyol, for example, polyol derived from castor oil, linseed oil, or soy oil. In certain other embodiments, the isocyanate-reactive compound is a polyol initiated with a compound selected from the group consisting of glycerol, trimethylopropane, triethanolamine, pentaerythritol, sorbitol sucrose, diamine, tolylene diamine, diaminodiphenylmethane, a polymethylene polyphenylene polyamine, ethanolamine, diethanolamine, or a mixture thereof. Furthermore, the isocyanate reactive compound can include a water-insoluble/water dispersible polypeptide composition, used alone or in combination with any of the aforementioned isocyanate-reactive compounds. The water-insoluble/water dispersible polypeptide composition has the ability to disperse with the isocyanate-based reactant and to become an integral structural component of the resulting cured foam. However, unlike the water-soluble polypeptide proteins, the water-insoluble polypeptide compositions typically do not reduce the density of the resulting foam.

Alternatively or in addition, the isocyanate-reactive compound can be a hydroxyl terminated polythioether, polyamide, polyesteramide, polycarbonate, polyacetal, polyolefin or polysiloxane, or a polyester obtained by condensation of a glycol or higher functionality polyol with a dicarboxylic acid. In certain embodiments, the isocyanate-reactive compound is polyoxypropylene glycol, polypropylene oxide-ethylene oxide, propylene glycol, propane diol, glycerin, an amine alkoxylate, or a mixture thereof. In certain other embodiments, the isocyanate-reactive compound is polyoxypropylene glycol.

In certain embodiments, the foam has a density in the range of from about $0.01$ g/cm$^3$ to about $0.5$ g/cm$^3$, as determined by ASTM D-7487. In certain embodiments, the foam can have a density that is from 5% to 80% less dense than a foam created from the same starting composition that lacks the water-soluble polypeptide composition described herein or protein containing composition that contains an amount of a water-soluble protein sufficient to reduce the density of the resulting foam. In certain other embodiments, the foam cream time, as defined by ASTM D-7487, is less than one minute. In certain other embodiments, the foam free rise height, as determined by ASTM D7487, is greater than the foam free rise height of a foam created from the same starting composition lacking the water-soluble polypeptide composition described herein or protein containing composition that contains an amount of a water-soluble protein sufficient to reduce the density of the resulting foam. For example, the foam free rise height can be at least 5% greater than the foam free rise height of a foam created from the same starting composition lacking such proteins. In certain other embodiments, the foam has a larger number of smaller, more uniform cells when compared to a foam created from the same starting composition lacking the water-soluble polypeptide composition described herein or a protein containing composition that contains an amount of a water-soluble protein sufficient to reduce the density of the resulting foam.

In another aspect, the invention provides a method of producing a polyurethane foam, which comprises the steps of: (a) mixing a protein containing composition (for example, the water-soluble polypeptide composition as described herein) and an isocyanate-based reactant to produce a mixture; and (b) permitting the mixture to produce a polyurethane foam. Although, the water-soluble fraction does not need to be isolated to be effective in reducing the density of the resulting foam, under certain circumstances it is desirable to separate the water-soluble and water-insoluble protein fractions and to add them in controlled ratios to modulate the properties of the resulting foams. In certain embodiments, the mixture in step (a), further comprises an isocyanate-reactive compound. The isocyanate-based reactant and the isocyanate-reactive compound can be the same as those described above for the other aspects of the invention.

The mixture in step (a) optionally further comprises a blowing agent or a compound that forms a blowing agent. It is understood that, under certain circumstances, water is capable of forming a blowing agent. The water-soluble protein can be dissolved, dispersed or suspended in water, in a solution containing the isocyanate-based reactant, or in a solution containing the isocyanate reactive material.

In certain embodiments, the mixture in step (a) can further comprise a catalyst that facilitates generation of the foam. Exemplary catalysts include, for example, dibutyltin dilaurate, dibutyltin diacetate, triethylenediamine, 2,2'-dimethylamino diethyl ether, 2-dimethylamino ethanol, stannous octoate, potassium octoate, an alkali metal salt of a carboxylic acid, or a combination thereof. Alternatively or in addition, the mixture in step (a) further comprises a surfactant, for example, a polyether silicone. Alternatively or in addition, the mixture in step (a) can further comprise an additive selected from the group consisting of a fire retardant, a filler, a reinforcement, a smoke suppressant, a biocide, an inert plasticizer, an antistatic agent, and combinations thereof.

In certain embodiments, the isocyanate-based reactant constitutes from about 10% (w/w) to about 90% (w/w) of the starting materials used to prepare the foam. In certain other embodiments, the isocyanate-reactive compound constitutes from about 10% (w/w) to about 90% (w/w) of the starting materials used to prepare the foam. In certain other embodiments, the protein containing composition (e.g., the water-soluble polypeptide composition) constitutes from about 0.01% (w/w) to about 50% (w/w) of the starting materials used to prepare the foam. In certain other embodiments, the foam is produced at an Index in the range from about 250% to about 800%.

In another aspect, the invention provides a premix for preparing a polyurethane foam, comprising: a protein containing composition (for example, a water-soluble polypeptide composition described herein, a water-insoluble/water dispersible polypeptide composition, or a mixture thereof) and an isocyanate-based reactant. The protein containing composition is characterized as being capable of reducing the density of the polyurethane foam by at least 5% (for example, by at least 10%, 20%, 30%, 40%, 50%, 60%, 70%, 80% or 90%) relative to a polyurethane foam produced from the same mixture but lacking the protein containing composition. The premix can also include, among other things, an isocyanate-reactive compound, a blowing agent or a compound that forms a blowing agent, a surfactant, and a catalyst that facilitates generation of the foam.

The isocyanate-based reactant, the isocyanate-reactive compound, the blowing agent or the compound that forms the blowing agent, the surfactant, and the catalyst can be the same as those discussed hereinabove. In certain embodiments, the isocyanate-based reactant constitutes from about 10% (w/w) to about 90% (w/w) of the premix. In certain embodiments, the isocyanate-reactive compound constitutes from about 10% (w/w) to about 90% (w/w) of the premix. In certain other embodiments, the protein containing composition (for example, the water-soluble polypeptide composition) constitutes from about 0.1% (w/w) to about 99% (w/w) of the starting materials used to prepare the foam.

In another aspect, the invention provides an article comprising the foam described herein.

BRIEF DESCRIPTION OF THE DRAWINGS

The foregoing and other objects, features and advantages of the invention will become apparent from the following description of preferred embodiments, as illustrated in the accompanying drawings. The drawings are not necessarily to scale, with emphasis instead being placed on illustrating the principles of the present invention, in which:

FIG. 17 shows polyurethane foams produced according to the procedures in Example 10, where FIG. 17(A) shows a 9:10 ratio of polyisocyanate:PMDI and FIG. 17(B) shows a 10:10 ratio of polyisocyanate:PMDI.

DETAILED DESCRIPTION OF THE INVENTION

Figure 1:
FIG. 1 is a flow chart showing the steps of an exemplary method for producing isolated polypeptide compositions useful in the practice of the invention.

The invention is based, in part, upon the discovery that certain protein fractions derivable from a variety of starting materials (for example, waste plant biomass) can be used to modulate the properties of foam, and can, for example, make lower density foams containing a greater number of smaller, more uniform cells. The invention provides an isolated, water-soluble polypeptide composition capable of stabilizing a polyurethane-based foam, protein-containing polyurethane foams, methods and compositions for preparing protein-containing polyurethane foams, and articles comprising said polyurethane foams. The isolated water-soluble polypeptide composition can be isolated from a variety of sources, for example, plant matter (such as biomass produced as a waste by-product of the agricultural industry) or animal matter (for example, milk or whey, fish meal, or animal tissue).

It has been discovered that the certain protein fractions (which can include isolated water-soluble protein compositions and crude protein containing compositions that contain a certain amount of the water-soluble proteins) can be added to polyurethane foam-forming compositions to alter the properties of the resulting polyurethane foam. For example, the resulting foam can have, for example, lower density and/or smaller, more uniform cell size relative to foams generated from the same starting materials that lack the protein fraction. As a result, it is possible to produce foams that require less raw material (for example, isocyanate-based reactants and/or isocyanate-reactive compounds) to fill a given volume. As a result, it is possible to prepare foams with the desired physical characteristics cheaper than foams that lack the proteins, and it also is possible to produce foams without the use of known polyurethane foam surfactants in the formulation. These protein-containing polyurethane foams can be prepared by mixing certain protein compositions described herein, an isocyanate-based reactant and an optional isocyanate-reactive compound to produce a premix that generates a foam. Further description of the protein compositions capable of stabilizing a polyurethane-based foam, protein-containing polyurethane foams, methods and compositions for preparing such protein-containing polyurethane foams, and articles comprising said polyurethane foams are provided below.

I. Polypeptide Compositions

Different protein fractions derivable from animal and plant biomass have different physical and chemical properties. As a result, the proteins can be used to modulate the desired characteristics of the resulting foams. The water-soluble protein fractions described herein provide polyurethane foams having lower density and/or smaller, more uniform cell size when compared to foams prepared without the water-soluble protein fraction. In certain embodiments, a water-insoluble/water dispersible protein fraction can also be further added to the premix that generates the foam. Addition of water-insoluble/water dispersible protein fraction further modifies the properties of the foam produced from the premix. The addition of water-insoluble/water dispersible proteins can provide structural rigidity to, and/or modulate the density of, the resulting foam. In addition, both the water-insoluble/water-dispersible protein fraction and the water-soluble protein fraction can be used alone or in combination to produce adhesives, which are described in detail in U.S. patent application Ser. No. 12/719,521, filed on Mar. 8, 2010, the disclosure of which is incorporated by reference herein.

The terms "protein" and "polypeptide" are used synonymously and refer to polymers containing amino acids that are joined together, for example, via peptide bonds or other bonds, and may contain naturally occurring amino acids or modified amino acids. The polypeptides can be isolated from natural sources or synthesized using standard chemistries. Furthermore, the polypeptides may be modified or derivatized by either natural processes, such as post-translational processing, or by chemical modification techniques well known in the art. Modifications or derivatizations may occur anywhere in the polypeptide, including, for example, the peptide backbone, the amino acid side-chains and the amino or carboxyl termini. Modifications include, for example, cyclization, disulfide bond formation, demethylation, deamination, formation of covalent cross-links, formation of pyroglutamate, formylation, gamma-carboxylation, glycosylation, GPI anchor formation, hydroxylation, iodination, methylation, myristolyation, oxidation, pegylation, proteolytic digestion, phosphorylation, etc. As used throughout, the term "isolated" refers to material that is removed from its original environment (e.g., the natural environment if it is naturally occurring).

The starting material for producing the isolated polypeptide compositions, which can be a meal or a protein isolate, can be derived from plant material (for example, one or more of corn, wheat, sunflower, cotton, rapeseed, canola, castor, soy, camelina, flax, jatropha, mallow, peanuts, palm, tobacco, sugarcane bagasse, and algae) and/or animal material (for example, milk, whey, fish meal, animal tissue). It is understood that the water-soluble protein fraction can be produced in a variety of ways, for example, as described throughout the Examples.

For example, water-soluble proteins can be isolated by washing plant or animal material with water, and simply harvesting the proteins that dissolve in the water washes. It is understood, however, that the resulting washes may contain compounds other than water-soluble proteins, for example, water soluble carbohydrates such as starches and sugars, etc. However, given that the ratio of the water-soluble protein fraction to the water-insoluble/water dispersible protein fraction can vary depending on a number of factors such as the source of the starting material as well as any processing steps that may already have been carried out on the starting material, and given that the water-insoluble/water dispersible polypeptide does not facilitate the density reduction and may even diminish this effect, it is preferable to separate the two different polypeptide fractions and then to add them together in controlled manner to control the physical and chemical properties of the resulting foam, and to improve the reproducibility of the resulting foam. If density reduction is not required in the foam of interest, then it is understood that it is possible to reduce or eliminate altogether the water-soluble polypeptide from the composition, and to use the water-insoluble/water dispersible polypeptide as the exclusive protein-based component in the formulation. This can be desirable when it is desirable to produce a foam with equivalent or higher density (which affects modulus, strength, permeability, etc.), than a comparable foam that contains no protein, or a comparable foam that contains any amount of the water-soluble polypeptide fraction.

Similarly, it is understood that the water-insoluble/water dispersible protein fraction can be produced by a number of approaches, which are described in detail throughout the Examples and in co-pending U.S. patent application Ser. No. 12/719,521, filed on Mar. 8, 2010, the disclosure of which is incorporated by reference herein. For example, a crude water-insoluble/water dispersible protein fraction can be isolated from soy protein isolate by washing with water to remove water-soluble proteins and water-soluble components from the soy protein isolate. Although the crude water-insoluble/water dispersible protein fraction can disperse a number of oils, depending upon the particular application it can be advantageous to isolate a more pure form of the water-insoluble/water dispersible protein fraction. One approach for preparing both water-soluble protein fractions and water-insoluble/water dispersible protein fractions are shown schematically in FIG. 1.

As shown in FIG. 1, the starting material (for example, ground meal) is dispersed in aqueous media (for example, water) at pH 6.5-13 for at least 5 minutes, at least 20 minutes, at least 40 minutes or at least 1 hour, to form a mixture. Starting materials include, without limitation, whey protein, canola meal, canola protein isolate, castor meal, castor protein isolate, soy meal, or soy protein isolate, or a combination thereof. Then, optionally, the pH of the mixture can be lowered by the addition of acid (to provide a mixture with a pH in the range of, for example, 4.0-5.0) to precipitate both a portion of water-soluble proteins and water-insoluble proteins. At this point, the water-soluble proteins can be separated from the precipitate by harvesting the supernatant. It is understood, that in certain embodiments, the water-soluble protein fraction can be harvested prior to the step of lowering the pH (see FIG. 1). In other words, the starting material is dispersed in aqueous media (for example, water) and the water soluble-material (containing the water-soluble protein fraction) is separated from the water-insoluble material using conventional separation techniques. Alternatively, the water-soluble protein can be harvested after the pH has been lowered or can be harvested from the washes, for example, water washes, of the water-insoluble material (see FIG. 1). It is understood that the water-soluble protein can be produced by combining two or more of the aqueous fractions harvested at different steps that contain the water-soluble protein.

The residual water-insoluble material (i.e., the precipitate) can be harvested. The harvested material then can be washed (under certain circumstances, washed extensively) with water and the remaining water-insoluble/water dispersible material is harvested.

The protein isolation procedures described above can be modified to use a water-alcohol mixture instead of just water. For example, water-soluble proteins may be isolated by washing plant or animal material with a water-alcohol mixture, and simply harvesting the proteins that dissolve in the water-alcohol mixture. A variety of alcohols are contemplated to be amenable to the isolation conditions. In certain embodiments, the alcohol is an aliphatic alcohol, aromatic alcohol, or a polyol such as PPG-2000. In certain embodiments, the ratio of water to alcohol in the water-alcohol mixture is in the range of from 10:1 to 5:1, from 5:1 to 2:1, from 2:1 to 1:2, from 1:2 to 1:5, or from 1:5 to 1:10.

It is understood that the water-soluble protein fraction and/or the water-insoluble/water-dispersible protein fraction can be used as is or dried and stored until use. Drying can be performed by techniques known in the art, including spray drying, freeze drying, oven drying, vacuum drying, or exposure to desiccating salts (such as phosphorous pentoxide or lithium chloride).

It is understood that the process can also include one or more enzyme digestion and/or chemical hydrolysis steps. Digestion can be facilitated using one or more enzymes, and hydrolysis can be facilitated using one or more chemicals, for example, acid- or alkali-based hydrolysis. For example, the starting material (for example, the ground meal) can be exposed to enzymatic digestion before or after, or both before and after the incubation of the starting material in the alkaline aqueous media. Alternatively, or in addition, an enzymatic digestion step can be performed on the material following addition of acid to provide a mixture with a pH in the range of 4.0 to 5.0. Alternatively, or in addition, the harvested water-soluble protein fraction and/or the water-insoluble/water dispersible material after harvesting can be exposed to enzymatic digestion. Chemical hydrolysis, however, can occur with or replace the enzymatic digestion steps noted above.

Under certain circumstances residual basic species and alkali metals present in chemically digested proteins are not compatible with polyisocyanates and can cause trimerization of the isocyanate groups, leading to stability problems in the final polyisocyanate compositions. Enzymatic digestion, however, can be used to avoid or reduce isocyanate stability problems associated with some chemical hydrolysis steps.

It is understood that enzymes useful in the digestion of the protein fractions include endo- or exo-protease of bacterial, fungal, animal or vegetable origin or a mixture of thereof. Useful enzymes include, for example, a serine-, leucine-, lysine-, or arginine-specific protease. Exemplary enzymes include trypsin, chymotrypsins A, B and C, pepsin, rennin, microbial alkaline proteases, papain, ficin, bromelain, cathepsin B, collagenase, microbial neutral proteases, carboxypeptidases A, B and C, camosinase, anserinase, V8 protease from *Staphylococcus aureus* and many more known in the art. Also combinations of these proteases may be used.

Also commercially available enzyme preparations such as, for example, Alcalase®, Chymotrypsine 800s, Savinase®, Kannase®, Everlase®, Neutrase®, Flavourzyme® (all available from Novo Nordisk, Denmark), Protex 6.0L, Peptidase FP, Purafect®, Purastar OxAm®, Properase® (available from Genencor, USA), Corolase L10 (Rohm, Germany), Pepsin (Merck, Germany), papain, pancreatin, proleather N and Protease N (Amano, Japan), BLAP and BLAP variants available from Henkel, K-16-like proteases available from KAO, or combinations thereof. The Table 1 below describes the amino acid specificity of certain useful endonucleases.

TABLE 1

| No | Amino Acid | Notation | Commercial Endopeptidase(s) |
|---|---|---|---|
| 1 | Alanine | A | Pronase ®; Neutrase ®: |
| 2 | Cysteine | C | Papain |
| 3 | Aspartic | D | Fromase ®; |
| 4 | Glutamic | E | Alcalase ®; |
| 5 | Phenylalanine | F | Neutrase ®: Fromase ® |
| 6 | Glycine | G | Flavorzyme ®; Neutrase ®: |
| 7 | Histidine | H | Properase ®; |
| 8 | Isoleucine | I | Neutrase ®: |
| 9 | Lysine | K | Alcalase ®; Trypsin; Properase ® |
| 10 | Leucine | L | Alcalase ®; Esperase ®; Neutrase ®: |
| 11 | Methionine | M | Alcalase ®; Neutrase ®: |
| 12 | Asparigine | N | Savinase ®; Flavourzyme ®; Duralase ®; |
| 13 | Proline | P | Pronase ®; Neutrase ®: |
| 14 | Glutamine | Q | Alcalase ® |
| 15 | Arginine | R | Trypsin; Properase ®; |
| 16 | Serine | S | Savinase ®; Flavourzyme ®; Duralase ®; |
| 17 | Threonine | T | Savinase ®; Flavourzyme ®; Duralase ®; |
| 18 | Valine | V | Neutrase ®: |
| 19 | Tryptophane | W | Neutrase ®: Fromase ® |
| 20 | Tyrosine | Y | Alcalase ®; Esperase ®; Fromase ® |

Depending upon the choice enzyme(s), enzymatic digestion usually is conducted under aqueous conditions at the appropriate pH conditions (for example, depending upon the enzyme or enzyme mixture at neutral or at low pH). In certain digestion systems, the digestion optimally occurs at a pH less than 9, or less than 8. For certain applications, the pH of the aqueous protein digestion system is in the range of 3-9, 4-8 or 5-7.5. Once digestion has proceeded to the desired extent, the enzymatic reaction can be stopped, and the resulting product can optionally be washed and then used as is or dried to form a powder.

The physical and chemical properties of the resulting water-soluble protein fraction and the water-insoluble/water-dispersible protein fraction are described in more detail below.

In certain embodiments, the proteins in the isolated protein fractions are modified. Suitable processes for the modification or derivatization of the polypeptide fractions are provided in the literature. The nature and extent of modification will depend in large part on the composition of the starting material. The derivative can be produced, for example, by replacing at least a portion of primary amine groups of said isolated protein with hydroxyl groups, deaminating the protein, or replacing a portion of amide groups of the protein with carboxyl groups, etc. In other embodiments, the isolated polypeptide compositions described herein can be obtained by reacting the protein with protein modifying agents, for example, nitrous oxide, nitrous acid, salts of nitrous acid, or a combination thereof.

A. Water-soluble Polypeptide Composition Capable of Stabilizing a Polyurethane-Based Foam The water-soluble protein fractions, for example, the water-soluble protein fractions isolated pursuant to the protocol set forth in FIG. 1, are substantially or completely soluble in water.

The water-soluble protein fractions have one or more of the following features: (a) an amide-I absorption band between about 1633 $cm^{-1}$ and 1680 $cm^{-1}$, as determined by solid state FTIR, (b) an amide-II band between approximately 1522 $cm^{-1}$ and 1560 $cm^{-1}$, as determined by solid state FTIR, (c) two prominent 1° amide N—H stretch absorption bands centered at about 3200 $cm^{-1}$, and at about 3300 $cm^{-1}$ as determined by solid state FTIR, (d) a prominent cluster of protonated nitrogen nuclei defined by $^{15}N$ chemical shift boundaries at about 94 ppm and about 100 ppm, and $^1H$ chemical shift boundaries at about 7.6 ppm and 8.1 ppm, as determined by solution state, two-dimensional proton-nitrogen coupled NMR, (e) an average molecular weight of between about 600 and about 2,500 Daltons, for example, as determined by MALDI mass spectroscopy, and (f) an inability to stabilize an oil-in-water emulsion, wherein, when aqueous solution comprising 14 parts by weight of protein dissolved or dispersed in 86 parts by weight if water is admixed with 14 parts by weight of polymeric diphenyl methane diisocyanate (PMDI), the aqueous solution and the PMDI produce an unstable suspension that macroscopically phase separates under static conditions within five minutes after mixing; (g) the water-soluble polypeptide composition is capable of stabilizing a polyurethane-based foam relative to a polyurethane-based foam created from the same starting composition lacking the water-soluble protein composition; and (h) the water-soluble polypeptide composition is capable of reducing the density of a polyurethane-based foam by at least 5% (for example, at least 10%, 20%, 30%, 40%, 50%, 60%, 70%, 80%, 90% or 100%) relative to a polyurethane-based foam created from the same starting composition but that lacks the water-soluble polypeptide composition.

Figure 4:
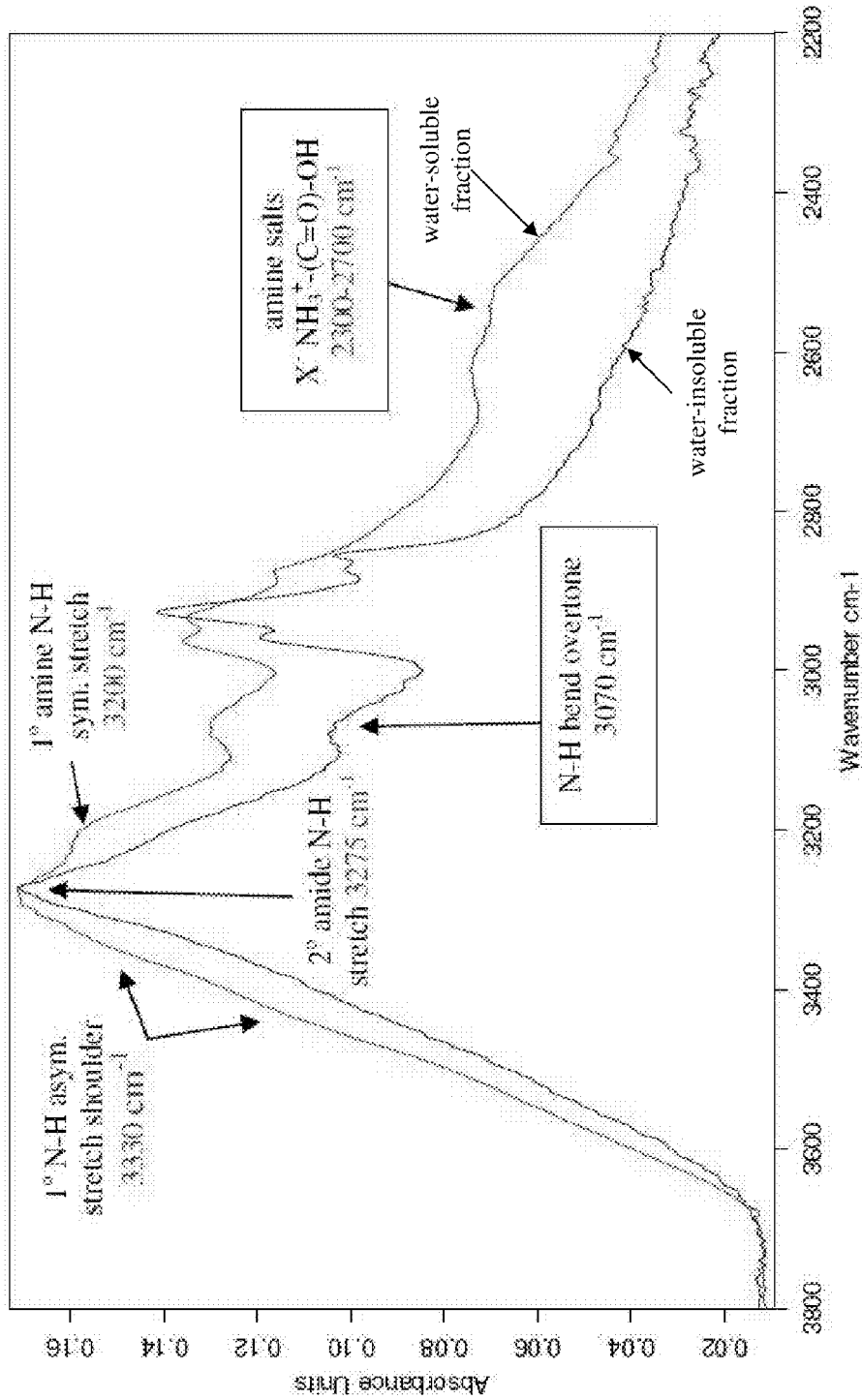
FIG. 4 shows solid state FTIR spectra of isolated water-soluble and water-insoluble fractions from digested castor where the N—H stretching region is expanded.
Figure 6:
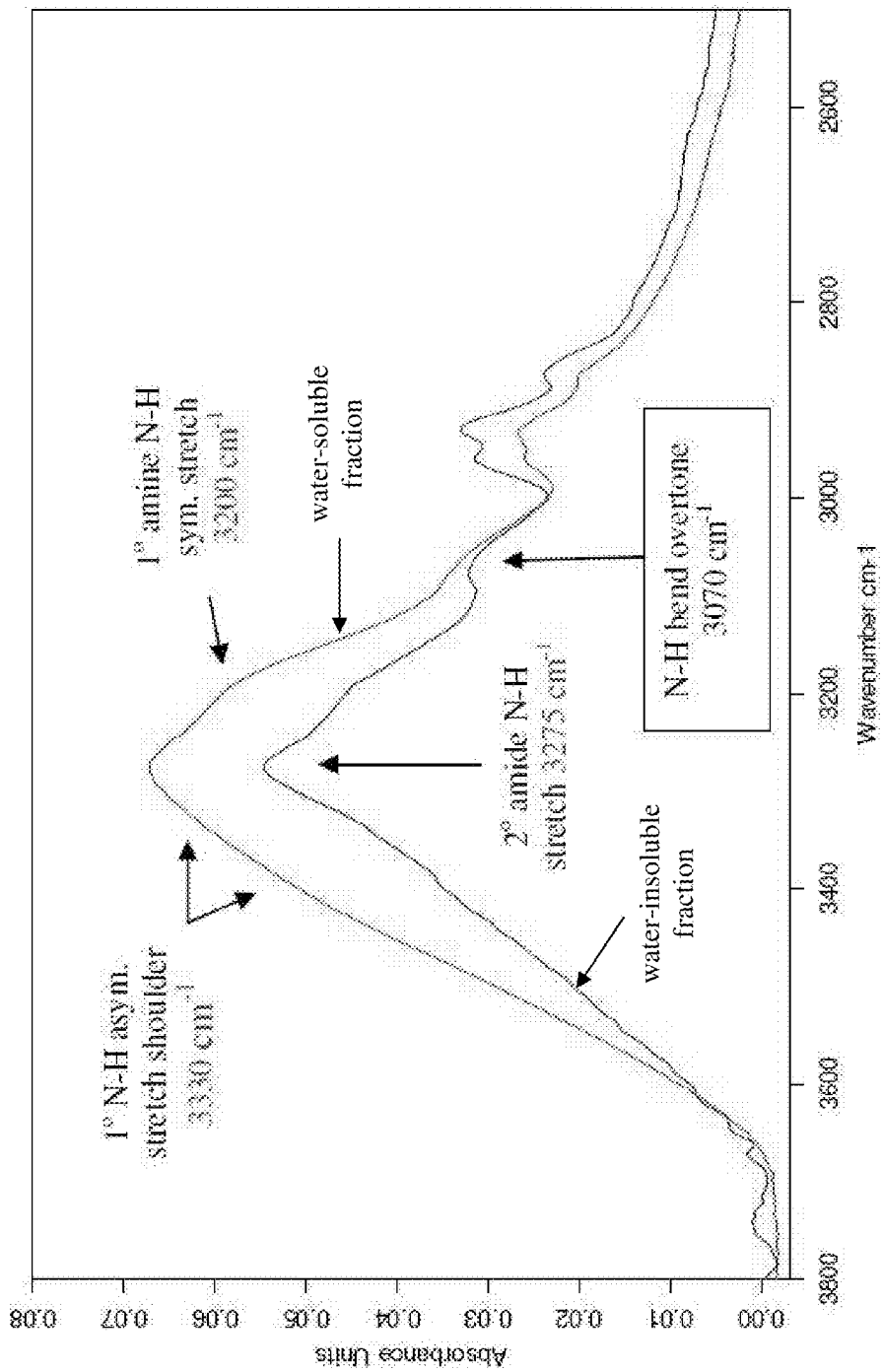
FIG. 6 shows the solid state FTIR spectra of isolated water-soluble and water-insoluble fractions from castor protein (lot 5-94), where the N—H and O—H stretch regions are expanded.
Figure 9:
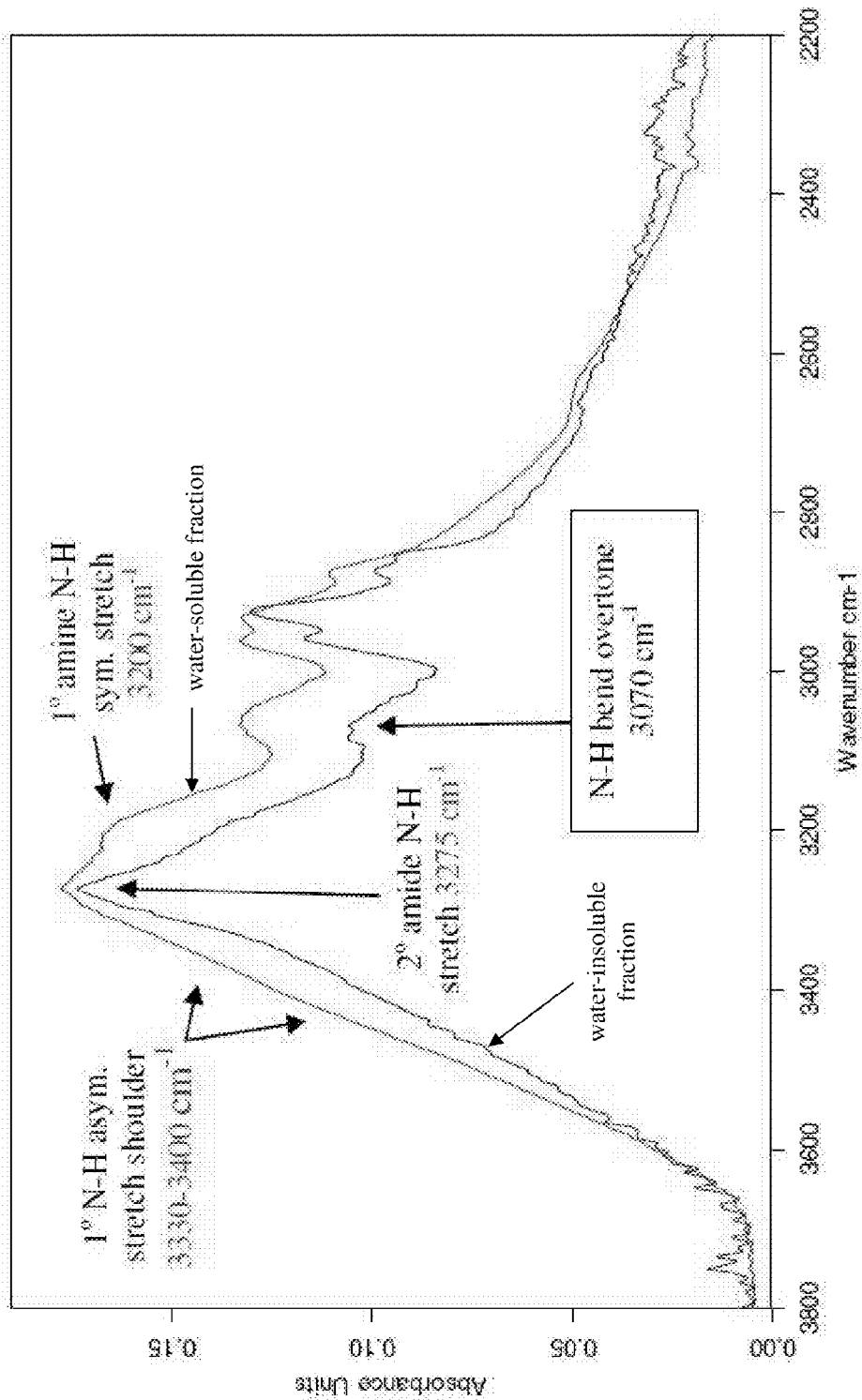
FIG. 9 shows overlaid solid state FTIR spectra of isolated water-soluble and water-insoluble fractions from digested soy, where the N—H stretching region is expanded.
Figure 10:
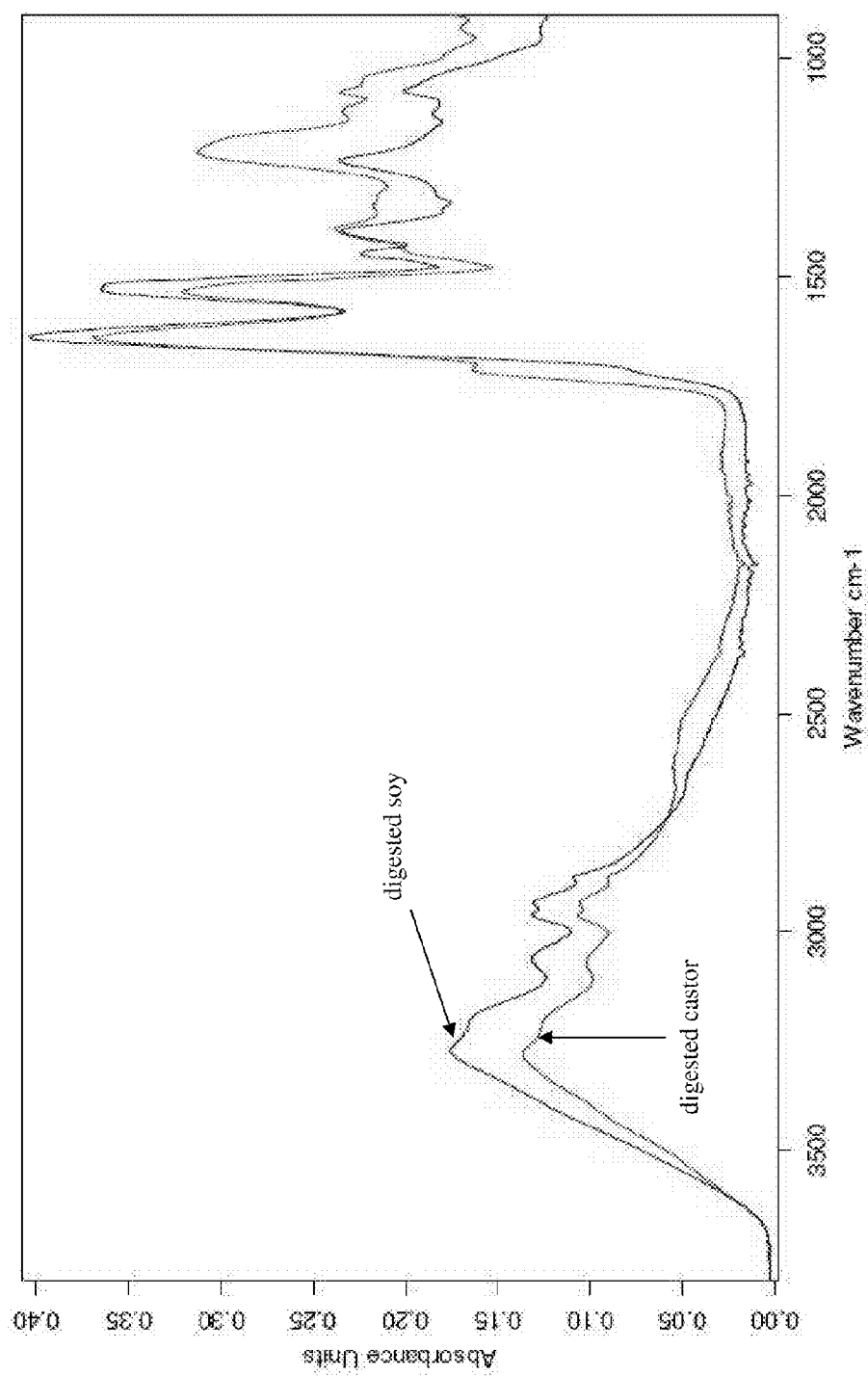
FIG. 10 shows overlaid solid state FTIR spectra of isolated water-soluble polypeptide fractions from digested soy and digested castor.
Figure 11:
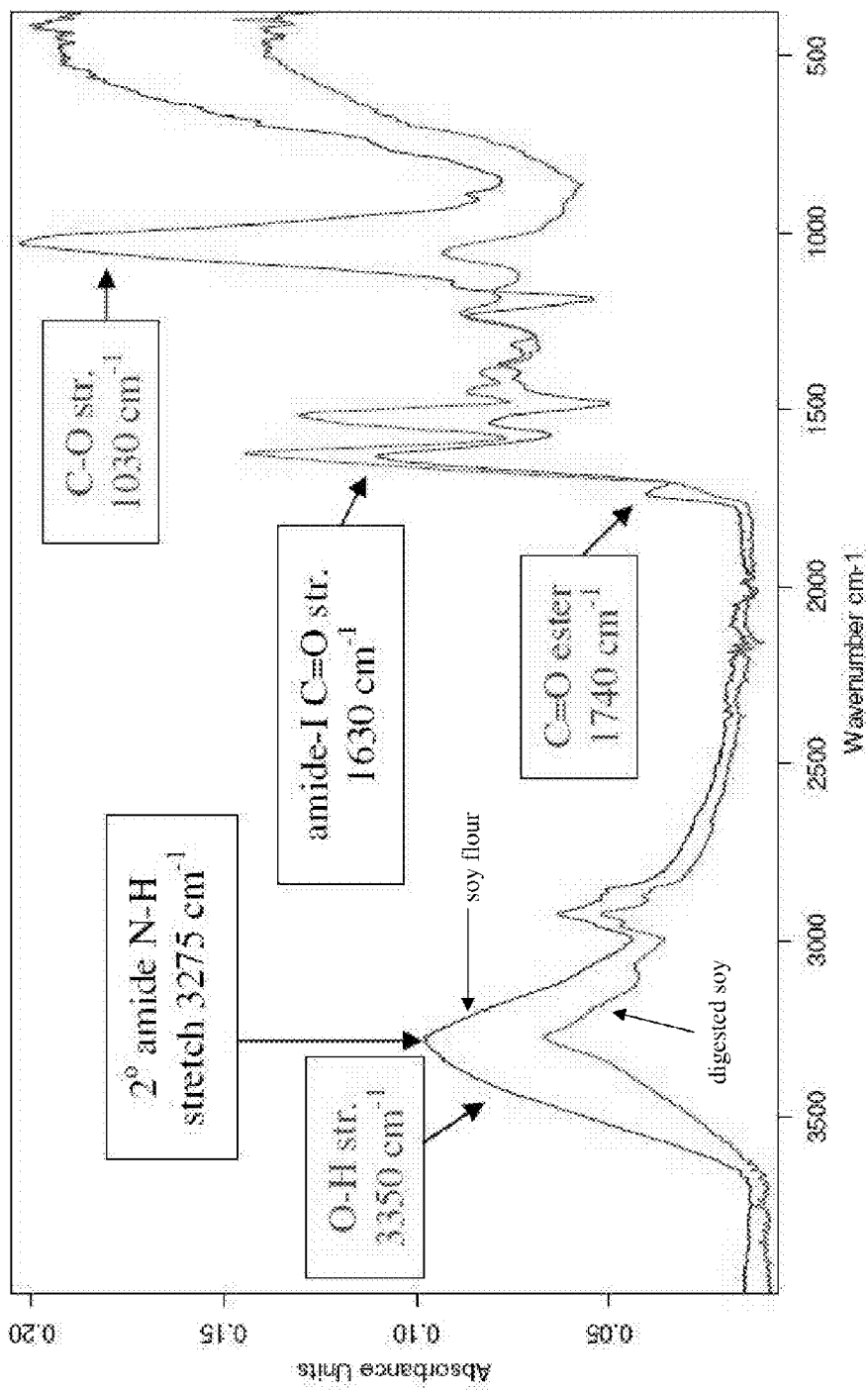
FIG. 11 shows overlaid solid state FTIR spectra of isolated water-insoluble fractions from digested soy and soy flour.
Figure 12:
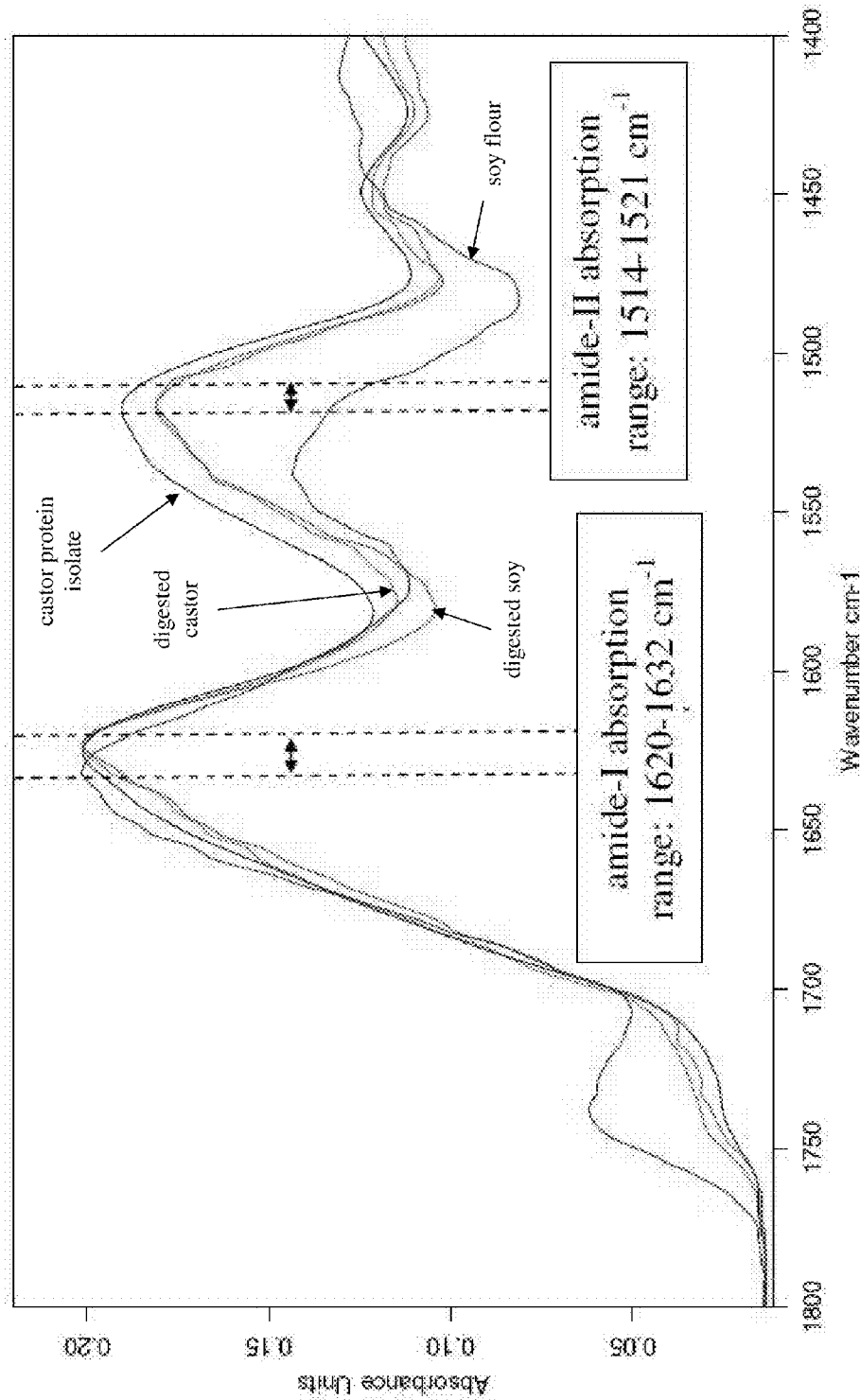
FIG. 12 shows overlaid solid state FTIR surface ATR spectra of the isolated water-insoluble/dispersible fractions from multiple protein samples (digested soy lot 5-81, soy flour, castor protein isolate lot 5-94, digested castor lot 5-90) where the carbonyl amide region is expanded.

In certain embodiments, the water-soluble polypeptide compositions contain a substantial amount of primary amines, carboxylic acids, amine salts, and carboxylate salts relative to the water-insoluble/water dispersible protein fraction. The water-soluble protein fraction comprises a relatively high concentration of primary amines (at about 3300 and 3200 $cm^{-1}$) relative to secondary amine (at about 3275 $cm^{-1}$) as seen in FIGS. 4, 6 and 9.

B. Water-Insoluble/Water Dispersible Polypeptide Composition

The water-insoluble/water dispersible polypeptide composition is characterized by several physical and chemical properties.

One important property of the water-insoluble/water dispersible protein fraction is that it is capable of dispersing or emulsifying oil in water or water in oil (see Example 3). The protein fraction that has these properties generally includes one or more of the following features: (a) an amide-I absorption band between about 1620 $cm^{-1}$ and 1632 $cm^{-1}$ and an amide-II band between approximately 1514 $cm^{-1}$ and 1521 $cm^{-1}$, as determined by solid state FTIR, (b) a prominent 2° amide N—H stretch absorption band centered at about 3272 $cm^{-1}$, as determined by solid state FTIR, (c) an average molecular weight of between about 600 and about 2,500 Daltons, and (d) two protonated nitrogen clusters defined by $^{15}N$ chemical shift boundaries at about 86.2 ppm and about 87.3 ppm, and $^1H$ chemical shift boundaries at about 7.14 ppm and 7.29 ppm for the first cluster, and $^1H$ chemical shift boundaries at about 6.66 ppm and 6.81 ppm for the second cluster, as determined by solution state, two-dimensional proton-nitrogen coupled NMR.

In contrast to the water-soluble protein composition, the water-insoluble/water dispersible fraction is capable of dispersing or emulsifying oil in water or water in oil to produce a homogeneous emulsion stable, by visual inspection, for least 5 minutes. In certain embodiments, the dispersion or emulsion exhibits substantially no phase separation by visual inspection for at least 10, 15, 20, 25, or 30 minutes, or even 1, 2, 3, 4, 5, 6, 9, 12, 18, or 24 hours after mixing the polypeptide composition with the oil. As shown in Example 3, the water-insoluble/water dispersible fraction is capable of emulsifying or dispersing a wide selection of oils, including, for example, an organic polyisocyanate (for example, PMDI) mineral oil, soybean oil, derivatized soybean oil, motor oil, castor oil, derivatized castor oil, dibutyl phthalate, epoxidized soybean oil, corn oil, vegetable oil, caprylic triglyceride, Eucalyptus oil, and tributyl o-acetylcitrate. In an exemplary assay, 14 parts (by weight) of a protein sample of interest is mixed with 86 parts (by weight) of water and the resulting solution or dispersion is mixed with 14 parts (by weight) of oil, for example, PMDI. Under these conditions, the water-insoluble/water dispersible protein fraction produces a dispersion or emulsion exhibits substantially no phase separation by visual inspection for at least 5 minutes after mixing the polypeptide composition with the oil.

In certain embodiments, the water-insoluble/water dispersible fraction is substantially free of primary amines, carboxylic acids, amine salts, and carboxylate salts. The water-insoluble protein/water dispersible protein fraction has a higher fraction of secondary amines relative to the water-soluble protein fraction (see, Example 1).

The water-insoluble/water dispersible protein fraction can act as a surfactant to an organic polyisocyanate (e.g., PMDI), lowering interfacial tension to the point where the water insoluble organic polyisocyante is readily emulsified with minimal energy input, creating an oil-in-water emulsion. When the source material is soy protein, a stable emulsion can be obtained using undigested substantially insoluble (fractionated) protein. In certain embodiments, a stable emulsion of polyisocyanate (e.g., PMDI) in water can be achieved when the isolated fractionated polypeptide is comprised of a water-insoluble/water dispersible fraction, either alone, or in combination with a water soluble component. In its dry powdered form, the water-insoluble/water dispersible polypeptide is also capable of dispersing within an oil such as PMDI. Thus, in certain embodiments, the water-insoluble polypeptide can be pre-dispersed in the isocyanate-based reactant in the absence of water.

In certain embodiments, the water-soluble and/or water-insoluble polypeptide fractions described herein, can have a weight average molecular weight of between about 500 and 25,000 Daltons. Useful polypeptide fractions can have a weight average molecular weight of between about 600 and 2,500 Da., between about 700 and 2,300 Da., between about 900 and 2,100 Da., between about 1,100 and 1,900 Da., between about 1,300 and 1,700 Da., between about 1,000 and 1,300 Da., between about 2,000 and 2,500 Da., or between about 1,000 and 2,500 Da.

The isolated polypeptide composition can be used to make foams, as described herein, by combining them with a reactive prepolymer. Reactive prepolymers can be selected from the group consisting of an organic polyisocyanate; a reaction product between an organic polyisocyanate and a polypeptide, a polyol, an amine based polyol, an amine containing compound, a hydroxy containing compound, a water-insoluble/water-dispersible polypeptide composition, a water-soluble polypeptide, or a combination thereof. It is understood, however, that foams do not necessarily have to be isocyanate-based. Optional foams can include any liquid, liquid solution, or liquid mixture that is capable of polymerizing or gelling to form a rigid structure in the presence of a blowing agent. Liquid mixtures can include for example PVC plastisols; liquids can include polymerizable monomers such as styrene and methymethacrylate; liquid solutions can include polymers dissolved in solvents such as polystyrene dissolved in supercritical $CO_2$ or toluene. Alternatively, or in addition, the liquids can also comprise prepolymers such as epoxy containing compounds; a reaction product between an epoxy containing compound and a polypeptide, a polyol, an amine based polyol, an amine containing compound, a hydroxy containing compound, or a combination thereof; an organosilane; a polymer latex; a polyurethane; and a mixture thereof.

When making the foams, the isolated polypeptide composition, in certain embodiments, is capable of dispersing the reactive prepolymer in the aqueous medium to produce a stable dispersion or a stable emulsion. The dispersion or emulsion exhibits substantially no phase separation by visual inspection for at least 5 minutes after mixing the polypeptide composition with the reactive prepolymer. In certain embodiments, the dispersion or emulsion exhibits substantially no phase separation by visual inspection for at least 10, 15, 20, 25, or 30 minutes, or even 1, 2, 3, 4, 5, 6, 9, 12, 18, or 24 hours after mixing the polypeptide composition with the reactive prepolymer. In certain embodiments, the dispersion or emulsion exhibits substantially no phase separation by visual inspection for at least 10, 15, 20, 25, or 30 minutes, or even 1, 2, 3, 4, 5, 6, 9, 12, 18, or 24 hours after mixing the polypeptide composition with the oil. As shown in Example 3, the water-insoluble/water dispersible fraction is capable of emulsifying or dispersing a wide selection of oils, including, for example, an organic polyisocyanate (for example, PMDI) mineral oil, soybean oil, derivatized soybean oil, motor oil, castor oil, derivatized castor oil, dibutyl phthalate, epoxidized soybean oil, corn oil, vegetable oil, caprylic triglyceride, Eucalyptus oil, and tributyl o-acetylcitrate. In an exemplary assay, 14 parts (by weight) of a protein sample of interest is mixed with 86 parts (by weight) of water and the resulting solution or dispersion is mixed with 14 parts (by weight) of oil, for example, PMDI. Under these conditions, the water-insoluble/water dispersible protein fraction produces a dispersion or emulsion exhibits substantially no phase separation by visual inspection for at least 5 minutes after mixing the polypeptide composition with the oil.

In certain embodiments, the water-insoluble/water dispersible protein fraction provides a stable emulsion or dispersion, for example, an aqueous emulsion or dispersion, comprising from about 1% to about 90% (w/w) of an oil and from about 1% to about 99% (w/w) of an isolated polypeptide composition, wherein the isolated polypeptide composition produces a stable emulsion or dispersion of the oil in an aqueous medium. The aqueous emulsion or dispersion optionally comprises from about 1% to about 50% (w/w) of oil and from about 1% to about 99% (w/w) of the isolated polypeptide composition. The term "stable" when used in reference to the dispersions and emulsions refers to the ability of the polypeptide fraction described herein to create a kinetically stable emulsion for the duration of the intended application of the dispersion or emulsion. The terms "emulsion," "dispersion" and "suspension" are used interchangeable herein.

II. Isocyanate-Based Reactant

The term "isocyanate-based reactant," as used herein, is understood to mean a compound that comprises an isocyanate group. A wide variety of isocyanate-containing compounds are known in the art relating to preparation of polyurethane foams, and such compounds are contemplated to be useful in the practice of the present invention.

In certain embodiments, the isocyanate-based reactant comprises a urethane, allophanate, urea, biuret, carbodiimide, uretonimine, isocyanurate or a combination. When the isocyanate based reactant contains a urethane, these can be produced by reaction of an organic isocyanate with a polyol or other hydroxyl compound.

In certain embodiments, the isocyanate-based reactant is an organic polyisocyanate. The term "polyisocyanate," as used herein, refers to difunctional isocyanate species, higher functionality isocyanate species, and mixtures thereof. Depending on the circumstances, the reactive polyisocyanate is combined with the isolated and fractionated polypeptide described herein in order to form the compositions provided herein. Alternatively, the isocyanate-based reactant can be a product formed by reacting an organic polyisocyanate and a compound containing a nucleophilic functional group capable of reaction with an isocyanate group. Exemplary compounds containing a nucleophilic functional group capable of reacting with an isocyanate group include a polypeptide, a polyol, an amine based polyol, an amine containing compound, a hydroxy containing compound, or a combination thereof. In certain other embodiments, allophanate prepolymers are utilized. Allophanate prepolymers typically require higher temperatures (or allophanate catalysts) to facilitate reaction of a polyol with the polyisocyanate to form the allophanate prepolymer.

As noted above, the organic polyisocyanate can be prepared from a "base polyisocyanate." The term "base isocyanate" as used herein refers to a monomeric or polymeric compound containing at least two isocyanate groups. The particular compound used as the base polyisocyanate can be selected so as to provide a foam having certain desired properties. For example, base polyisocyanate can be selected based on the number-average isocyanate functionality of the compound. For example, in certain embodiments, the base polyisocyanate can have a number-average isocyanate functionality of 2.0 or greater, or greater than 2.1, 2.3 or 2.4. In certain embodiments, the reactive group functionality of the polyisocyanate component ranges from greater than 1 to several hundred, 2 to 20, or 2 to 10. In certain other embodiments, the reactive group functionality of the polyisocyanate component is at least 1.9. In certain other embodiments, the reactive group functionality of the polyisocyanate component is about 2. Typical commercial polyisocyanates (having an isocyanate group functionality in the range of 2 to 3) may be pure compounds, mixtures of pure compounds, oligomeric mixtures (an important example being polymeric MDI), and mixtures of these.

Useful base polyisocyanates have, in one embodiment, a number average molecular weight of from about 100 to about 5,000 g/mol, from about 120 to about 1,800 g/mol, from about 150 to about 1,000 g/mol, from about 170 to about 700 g/mol, from about 180 to about 500 g/mol, or from about 200 to about 400 g/mol. In certain other embodiments, at least 80 mole percent or, greater than 95 mole percent of the isocyanate groups of the base polyisocyanate composition are bonded directly to an aromatic group. In certain embodiments, the foams described herein have a concentration of free organically bound isocyanate (—NCO) groups in the range of from about 5% to 35% (wt/wt), about 7% to 31% (wt/wt), 10% to 25% (wt/wt), 10% to 20% (wt/wt), 15% to 27% (wt/wt).

In certain embodiments, the base polyisocyanate is an aromatic polyisocyanate, such as p-phenylene diisocyanate; m-phenylene diisocyanate; 2,4-toluene diisocyanate; 2,6-toluene diisocyanate; naphthalene diisocyanates; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 2,2'-diphenylmethane diisocyanate (2,2'-MDI); 3,3'-dimethyl-4,4'-biphenylenediisocyanate; mixtures of these; and the like. In certain embodiments, polymethylene polyphenyl polyisocyanates (MDI series polyisocyanates) having a number averaged functionality greater than 2 are utilized as the base polyisocyanate.

In certain embodiments, the MDI base polyisocyanate comprises a combined 2,4'-MDI and 2,2'-MDI content of less than 18.0%, less than 15.0%, less than 10.0%, or less than 5.0%.

In certain other embodiments, the MDI diisocyanate isomers, mixtures of these isomers with tri- and higher functionality polymethylene polyphenyl polyisocyanates, the tri- or higher functionality polymethylene polyphenyl polyisocyanates themselves, and non-prepolymer derivatives of MDI series polyisocyanates (such as the carbodiimide, uretonimine, and/or isocyanurate modified derivatives) are utilized as polyisocyanates for use as the base polyisocyanate. In certain other embodiments, the base polyisocyanate composition comprises an aliphatic polyisocyanate (e.g., in a minor amount), e.g., an aliphatic polyisocyanate comprising an isophorone diisocyanate, 1,6-hexamethylene diisocyanate, 1,4-cyclohexyl diisocyanate, or saturated analogues of the above-mentioned aromatic polyisocyanates, or mixtures thereof.

In certain other embodiments, the base polyisocyanate comprises a polymeric polyisocyanate, e.g., a polymeric diphenylmethane diisocyanate (polymethylene polyphenyl polyisocyanate) species of functionality 3, 4, 5, or greater. In certain embodiments, the polymeric polyisocyanates of the MDI series comprise RUBINATE-M® polyisocyanate, or a mixture of MDI diisocyanate isomers and higher functionality oligomers of the MDI series. In certain embodiments, the base polyisocyanate product has a free —NCO content of about 31.5% by weight and a number averaged functionality of about 2.7.

In certain embodiments, the isocyanate group terminated prepolymers are urethane prepolymers. These can be produced by reaction of a hydroxyl-functional compound with an isocyanate functional compound. In certain other embodiments, allophanate prepolymers are utilized. Allophanate prepolymers typically require higher temperatures (or allophanate catalysts) to facilitate reaction of the polyol with the polyisocyanate to form the allophanate prepolymer.

Polyisocyanates used in the compositions described can have the formula $R(NCO)_n$, where n is 2 and R can be an aromatic, a cycloaliphatic, an aliphatic, each having from 2 to about 20 carbon atoms. Examples of polyisocyanates include, but are not limited to, diphenylmethane-4,4'-diisocyanate (MDI), toluene-2,4-diisocyanate (TDI), toluene-2,6-diisocyanate (TDI), methylene bis(4-cyclohexylisocyanate ($Hi_2MDI$), 3-isocyanatomethyl-3,5,5-trimethyl-cyclohexyl isocyanate (IPDI), 1,6-hexane diisocyanate (HD1), naphthalene-1,5-diisocyanate (NDI), 1,3- and 1,4-phenylenediisocyanate, triphenylmethane-4,4',4"-triisocyanate, polymeric diphenylmethane diisocyanate (PMDI), m-xylene diisocyanate (XDI), 1,4-cyclohexyl diisocyanate (CHD1), isophorone diisocyanate, isomers, dimers, trimers and mixtures or combinations of two or more thereof. The term "PMDI" encompasses PMDI mixtures in which monomeric MDI, for example 4,4'-, 2,2'- and/or 2,4'-MDI, is present. PMDI is, in one embodiment, prepared by phosgenation of the corresponding PMDA in the presence of an inert organic solvent. PMDA is in turn obtained by means of an acid aniline-formaldehyde condensation which can be carried out industrially either continuously or batchwise. The proportions of diphenylmethanediamines and the homologous polyphenylpolymethylenepolyamines and their positional isomerism in the PMDA are controlled by selection of the ratios of aniline, formaldehyde and acid catalyst and also by means of a suitable temperature and residence time profile. High contents of 4,4'-diphenylmethanediamine together with a simultaneously low proportion of the 2,4' isomer of diphenylmethanediamine are obtained on an industrial scale by the use of strong mineral acids such as hydrochloric acid as catalyst in the aniline-formaldehyde condensation.

The level of covalent cross-linking, which impacts the rigidity of the foam, can be influenced by the reactive group functionality of the monomers. Reactive group functionalities discussed herein will be understood to be number averaged for polymeric or oligomeric materials (such as polymeric polyols, polyisocyanate prepolymers, uretoniminecarbodiimide modified polyisocyanates, and the polymeric isocyanates of the MDI series) and absolute for pure compounds. The reactive group functionality of the polyisocyanate component ranges from greater than 1 to several hundred, 2 to 20, or 2 to 10. In certain embodiments, the polyisocyanate functionality is at least 1.9, or at least 2.0.

Polyisocyanates, which are commercially available, can be pure compounds, mixtures of pure compounds, oligomeric mixtures (an important example being polymeric MDI), and mixtures of the foregoing. The range of isocyanate group functionalities for the commercial polyisocyanates is understood in the art to be from 2 to 3. The higher the reactive group functionalities of the monomers used in the foam formulation, the higher the crosslink density will be. Very highly crosslinked polyurethane foams tend to be rigid (hard).

The extent of cross-linking is not the only factor that determines the rigidity (or flexibility) of a cellular polyurethane. The backbone rigidity of the matrix polymer, which is determined by the rigidity of the precursor monomers, can also affect rigidity of the foam. Monomers having a highly rigid backbone can produce rigid foams which are not cross-linked, or only lightly cross-linked. Examples of relatively rigid monomers include those having a high concentration of aromatic rings. The combination of an aromatic polyisocyanate and an aromatic polyol tends to produce a polymer with a rigid backbone, hence the polymer tends to be rigid and foams made from it are rigid.

The flexibility of a polymer is also affected by secondary inter-chain forces such as hydrogen bonding and crystallinity. Since polyurethanes and polyureas formed from the reaction of polyisocyanates and polyfunctional active hydrogen monomers tend to have high concentrations of "—NH" groups along the polymer backbone, they are often hydrogen bonded. The equivalent weights of the monomers determines the number of "—NH" groups along the polymer backbone. As a result, the use of monomers of lower functional group equivalents weight produces a polymer having more "—NH" groups in its structure. These, therefore, tend to have more hydrogen bonds between the chains, and thus are often more rigid. With all other factors being equal, the use of monomers of higher equivalent weights tends to reduce the amount of hydrogen bonding between the polymer chains, producing a more flexible polymer. Urea groups tend to produce more hydrogen bond linkages than urethane groups, such that a high urea concentration in the polymer structure tends to result in a more rigid material than one with only urethane groups.

The ability of the polymer backbone to form crystalline, or microcrystalline, domains in the bulk material can also have a significant impact on the rigidity of the material. This ability is sometimes realized in polyurethanes having very regular repeating structures, and these materials can be highly rigid. However, crystallinity can easily be disrupted by covalent crosslinks and other irregularities in the backbone structure. This is an example of a case where one factor (e.g., crystallinity) may conflict with another factor (e.g., cross-linking). It is understood that the effects of the different factors controlling the degree of foam rigidity are not always additive but can be adjusted to give foams of desired properties using techniques known to those skilled in the art.

III. Isocyanate-Reactive Compound

The term "isocyanate-reactive compound," as used herein, refers to a compound containing a chemical functionality reactive with an isocyanate group. A variety of isocyanate-reactive compounds are known in the art, and are contemplated to be useful in the practice of the present invention. Selection of particular isocyanate-reactive compounds and the relative amounts of such compounds used in the foam-forming composition can be performed to provide foams having desired chemical and physical features.

A. Types of Isocyanate-Reactive Compounds

Isocyanate-reactive compounds typically are nucleophilically reactive with an isocyanate-based reactant. Isocyanate-reactive compounds useful in making polyurethane foams can be organic compounds containing a plurality of active hydrogen groups capable of forming a polymer by reaction with the isocyanate. Reactive functional groups contemplated to be amenable to the present invention include, for example, primary alcohols, secondary alcohols, polyols, primary amines, secondary amines, and carboxylic acids. Exemplary primary alcohols and secondary alcohols include aliphatic alcohols, whereas primary amines and secondary amines include aromatic amines and aliphatic amines. Furthermore, the isocyanate-reactive compound can include a water-insoluble/water dispersible protein composition and/or water-soluble protein composition, used either alone or in combination with any of the foregoing isocyanate-reactive compounds.

The choice of a given isocyanate-reactive compound can impact the properties of the resulting foam. For example, a distinguishing feature of flexible polyurethanes foams is the use of a high concentration by weight (relative to the total formulation weight) of at least one flexible polyol. Flexible polyols can comprise, for example, from about 25% to about 90% (wt/wt) or from about 50% to about 70% (wt/wt) of the foam composition and contribute to the flexible nature of these foams. The flexible polyols are themselves polymeric materials, usually liquids or low melting solids, containing hydroxyl groups at the chain termini. Exemplary flexible polyols have molecular weights in the range of 1,500 to 12,000 g/mol or 2,000 to 8,000 g/mol and have nominal —OH functionalities of 2 to 4, usually 2 to 3. The flexible polyols, as the name implies, have flexible backbones and are predominantly aliphatic. The flexible backbone is a polymer with a low glass transition temperature (e.g., less than 0° C., or less than −10° C.). Furthermore, it is desirable for the compound to be a liquid at ambient temperatures. Such flexible polyols can be classified by backbone polymer type into three categories: polyethers, polyesters, and hydrocarbons. Although one of the three basic backbone types can be used in a polyol, it is contemplated that certain polyols contain two or three of these basic backbone types. Furthermore, mixtures of different types of flexible polyols may be used to prepare the foam. Non limiting examples of hydrocarbon backbone types include the polybutadienes and the polyisoprenes, and the hydrogenated derivatives thereof. Copolymers of butadiene and isoprene, and hydrogenates of these copolymers can also be used. Non limiting examples of polyether backbone types include polyoxypropylene, polyoxyethylene, polytetramethylene, polyoxybutylene, and any of the possible copolymers thereof. Preferred polyether backbone types include polyoxypropylenes, polyoxyethylenes, polyoxypropylene-polyoxyethylene copolymers, and the polytetramethylenes.

In certain embodiments, the isocyanate-reactive compound is a polyoxyethyene capped polyoxypropylene polyol, which is predominantly primary —OH terminated.

Polyether polyols are most commonly made by polymerizing one or more alkylene oxides (such as ethylene oxide, propylene oxide, butylene oxide, or tetramethylene oxide) with a low molecular weight initiator molecule (such as water, ammonia, a glycol, a triol, or an amine; of molecular weight less than 150) in the presence of a catalyst. Mixtures of initiators can be used in the synthesis.

A widely used class of polyether polyols are polyoxyethylene capped polyoxypropylene diols and triols comprising predominantly propylene oxide by weight. Other widely used classes of polyether polyols are the polyoxypropylene diols and triols. The polyoxypropylene polyols are important in continuously produced slabstock flexible foam. The polyoxyethylene capped polyoxypropylene polyols are important in molded flexible foam applications. These polyoxyethylene capped polyols are particularly well suited to cold curing, due to the presence of primary —OH groups as the predominant isocyanate-reactive functional groups. Non-limiting examples of polyester type flexible polyols include those formed from the condensation of low molecular weight aliphatic diols of molecular weight less than 150 with aliphatic dicarboxylic acids of molecular weight less than 300, under conditions that promote hydroxyl termination. Preferred aliphatic diols for making these polyesters are the diprimary diols. Some specific examples of polyester diols are the poly(ethylene adipates), poly(butylene adipates), poly(diethylene glycol adipates), and the copolymers of these. These aliphatic polyesters sometimes additionally contain very minor amounts of triols, such as trimethylolpropane, to increase the hydroxyl functionality. Polyether type flexible polyols derived from propylene oxide and/or ethylene oxide are especially preferred because of their low cost.

Polyols useful in preparing the foams described herein include all known polyols, for example, polyols used in the polyurethanes art. In certain embodiments, the polyol comprises primary and/or secondary hydroxyl (i.e., —OH) groups. In certain other embodiments, the polyol comprises at least two primary and/or secondary hydroxyl groups per molecule. Mono functional alcohols (such as aliphatic alcohols, aromatic alcohols or hydroxyl functional monomers such as hydroxyl functional acrylates (to yield UV or thermally curable materials)) can be used to cap an isocyanate group. In certain other embodiments, the polyol comprises a hydroxyl group functionality from 1.6 to 10, from 1.7 to 6, between 2 to 4, or from 2 to 3. In certain other embodiments, the weight average molecular weight range for the optional polyols is from 100 to 10,000 g/mol, from 400 to 6,000 g/mol, or from 800 to 6,000 g/mol.

In certain other embodiments, useful polyols are polyester polyols or polyether polyols, such as an aliphatic polyether polyol. One exemplary aliphatic polyether polyol is polyoxypropylene glycol, with a number average molecular weight in the range of from 1,500 to 2,500 g/mol.

In certain embodiments, the total amount of all polyol, or polyols, in the isocyanate reactive component is from 1% to 80%, or from 3% to 70%, or from 5% to 60% by weight of the total.

In certain other embodiments, alkanolamines comprising primary, secondary, and/or tertiary amine groups can be used.

B. Amount of Isocyanate-Reactive Compound Used to Form the Foam

The relative amounts of the ingredients used to form the foam can impact the chemical and physical properties of the foam. For example, the ratio of the number of isocyanate groups in the isocyanate-based reactants to the total number of isocyanate-reactive groups (i.e., the total number of isocyanate-reactive functional groups that would be expected to react under the conditions of processing, including those contributed by the blowing agent) is a important parameter. The ratio of reactive equivalents (isocyanate:isocyanate reactive groups) is called the Index, and can be expressed as a percent.

Preparation of foam from material having an Index less than 100% can imply reduced cross-linking due to the presence of unreacted chain ends, thereby reducing the average density of cross-linking. However, one exception is when water (a blowing agent) is included in large excess. In this situation, some of the water molecules behave as a physical blowing agent (if the heat of the foaming reaction is sufficient to volatilize it during the foaming process). Otherwise, a large excess of water simply remains in the foam (eventually drying out) and need not substantially increase the number of unreactive polymer chain ends.

Preparation of foam from material having an Index above 100% can imply additional cross-linking. Additional cross-linking comes from various self-reactions of isocyanate groups (—NCO groups) as well as the formation of allophanate and biuret groups. Exemplary self-reactions of isocyanate groups in foam processing include carbodiimide formation, uretonimine formation, and isocyanurate formation (trimerization). Some of these self-reaction products can optionally also be present in the liquid polyisocyanate precursor stream (base polyisocyanate), but only the free isocyanate groups which remain are considered when calculating the Index of a urethane foam formulation. If, for example, a large excess of isocyanate (—NCO) groups is present in the formulation (corresponding to an Index of greater than 150%) and a catalyst for the trimerization of isocyanate groups (trimerization catalyst) is present, then the foam will contain significant quantities of isocyanurate linkages. The isocyanurate linkages increase the crosslink density substantially. These linkages are heat resistant and often are incorporated into rigid foams in order to increase combustion resistance.

The Index of a foam formulation is an important indicator of how flexible or rigid the foam will be. More covalent cross-linking (higher Index) generally means greater rigidity. Index ranges of from 10% or less (in extreme cases, where water is used in very large excess) up to 150%, or from 70% to 125%, can be used to prepare flexible urethane foams. A desirable Index range for most flexible thermoset urethane foams is from 80% to 110%. This is also the Index range most preferred for semi-rigid and semi-flexible foams. The terms semi-rigid and semi-flexible are used interchangeably.

Index ranges of from 200% to 2,500%, from 250% to 1,500%, or from 250% to 800% can be used to prepare polyurethane-polyisocyanurate foams. These foams are an important subclass of rigid urethane foams used as insulation foams in the construction industry. However, if polyisocyanurate linkages are not desired, then the Index range can be in the range of from 90% to 150%, or from 100% to 125%.

Reactive group functionalities for the organic isocyanate-reactive (active hydrogen) monomers suitable for use in the isocyanate-reactive component(s) of a foam formulation range from greater than 1 to several hundred, but much more generally from 1.5 to 20, more generally from 1.6 to 10. Having a functionality of more than 1.0 is important for chain extension (growth/polymerization) because there is more than one group to react with. If the functionality was 1.0, like a mono-alcohol, the isocyanate would become endcapped and the reaction would stop because the molecule has no more reactive groups.

In certain embodiments, the reactive group functionality for all the polymer-forming isocyanate-reactive species used in the formulation be at least 1.5, and ideally at least 2. However, an industrially important class of useful isocyanate reactive monomers have functionalities in the range from 1.5 to 2. These are the polyoxyalkylene diols (which nominally are diols) but actually have a hydroxyl functionality less than 2.

IV. Blowing Agents

Under certain circumstances, an additional blowing agent can be included in a premix to facilitate foam formation. The blowing agent produces bubbles (cells) in the polymer giving rise to the foam product. A large number of blowing agents are known in the art and are contemplated to be useful in the practice of the present invention. For example, the blowing agent can be physical blowing agent, which is a volatile composition that is a gas or converts to a gas under the conditions used to prepare the form. Alternatively, the blowing agent (e.g., $CO_2$) can be formed in situ during preparation of the foam by adding a compound (e.g., water) to the premix that reacts with one of the components of the premix to form a blowing agent. Blowing agents of this type are chemical blowing agents. A further class of blowing agents are those that decomposes during the foam-forming process to liberate a gas (for example, azo-functional compounds such as azobisdicarbonamide).

Commonly used physical blowing agents include air, nitrogen, and carbon dioxide, which are whipped into the liquid chemical precursors of the polyurethane foam. This method can be used to prepare high density foams. However, this procedure can be suboptimal for preparing low density foams. Other commonly used physical blowing agents include volatile inert organic compounds having boiling points (at 1 atmosphere pressure) from 0 to 50° C., from 10 to 40° C., or from 20 to 35° C. In certain instances, the organic physical blowing agent is a $C_1$-$C_5$ hydrocarbon $C_1$-$C_5$ fluorocarbons, $C_1$-$C_5$ hydrofluorocarbon, $C_1$-$C_5$ chlorocarbon, or a combination thereof. Non-limiting examples of such physical blowing agents include tetrafluoroethanes, pentafluoropropanes, methylene chloride, n-pentane, isopentane, and cyclopentane.

A common chemical blowing agent is water, where water reacts with two equivalents of organic isocyanate groups to liberate a mole of carbon dioxide (per water molecule) and form a urea linkage. Less commonly used chemical blowing agents include carboxylic acid compounds, which can react with isocyanates to liberate carbon dioxide and form an amide linkage.

The quantity of the blowing agent(s) used in the foam-forming formulation can be adjusted to produce the foam having the desired density. The density range for cellular polyurethanes ranges from as low as 0.1 lbs per cubic foot up to any amount short of full density (full density being the natural density of the polymer, without any expansion (i.e., no bubbles)). The amount of blowing agent(s) needed to produce a foam of a particular density from a given foam formulation is understood by those skilled in the art. When used, water is used in amounts from 0.1 to as much as 100% by weight or more of the reactive polymer forming monomers, but more typically from 0.2% to 20%. When used, physical blowing agents are used in amounts from 1% to 50% by weight of the reactive (polymer forming) monomers, but more typically from 2% to 30%.

V. Additives

In addition, additives can be added to the foam-forming premix in order to optimize the properties of the foam. Exemplary additives include catalysts, extenders, fillers, surfactants, viscosifying agents, antioxidants, antibacterial agents, fungicides, pigments, inorganic particulates, and cross-linking agents.

In certain embodiments, the catalyst(s) can comprise up to about 5% by weight of the foam-forming composition. Commonly used catalysts include tertiary amines and certain organometallic compounds. For example, the catalyst can be triethylenediamine, 2,2'-dimethylamino diethyl ether, 2-dimethylamino ethanol, stannous octoate, dibutyltin diacetate, dibutyltin dilaurate, or a combination thereof. These catalysts drive the reaction of isocyanates with alcohols and with water. Other catalysts drive the trimerization of isocyanate groups to form isocyanurate groups. Examples of these include potassium octoate (potassium 2-ethyl hexanoate), potassium acetate, and other alkali metal salts of soluble carboxylic acids. Additional catalysts contemplated to be amenable to preparing the foams described herein are described below.

Additional exemplary catalysts include a primary amine, a secondary amine, a tertiary amine, an organometallic compound, or a combination thereof. Exemplary primary amines include, for example, methylamine, ethylamine, propylamine, cyclohexylamine, and benzylamine. Exemplary secondary amines include, for example, dimethylamine, diethylamine, and diisopropylamine. Exemplary tertiary amines include, for example, diazabicyclooctane (Dabco), triethylamine, dimethyl benzylamine, bis-dimethylaminoethyl ether, tetramethyl guanidine, bis-dimethylaminomethyl phenol, 2,2'-dimorpholinodiethyl ether, 2-(2-dimethylaminoethoxy)-ethanol, 2-dimethylaminoethyl-3-dimethylaminopropyl ether, bis-(2-diaminoethyl)-ether, N,N-dimethyl piperazine, N-(2-hydroxyethoxyethyl)-2-azanorbornane, Tacat DP-914 (Texaco Chemical), Jeffcat®, N,N,N,N-tetramethyl butane-1,3-diamine, N,N,N,N-tetramethyl propane-1,3-diamine, N,N,N,N-tetramethyl hexane-1,6-diamine, 2,2'-dimorpholinodiethyl ether (DMDEE), or a mixture thereof. Exemplary organometallic compounds include, for example, di-n-octyl tin mercaptide, dibutyl tin maleate, diacetate, dilaurate, dichloride, bis-dodecyl mercaptide, tin(II) acetate, ethyl hexoate and diethyl hexoate, $Fe^{+3}$ 2,4-pentanedionate (FeAcAc), or lead phenyl ethyl dithiocarbamate.

Exemplary extenders include, for example, inert extenders or active extenders. In certain embodiments, the inert extender is vegetable particulate matter, vegetable oil, mineral oil, dibasic esters, propylene carbonate, non-reactive modified aromatic petroleum hydrocarbons, and in general any non-active hydrogen containing liquid that can be incorporated into the foam. The active extender can be a pyrrolidone monomer or polymers, an oxizolidone monomer or polymers, an epoxidized oil, or an unsaturated oil, such as linseed oil.

In addition, one or more surfactants can be added to the foam-forming composition to alter the chemical and physical properties of the foam. In certain embodiments, the surfactant(s) can comprises up to about 5% by weight of the foam-forming composition. Exemplary surfactants include, for example, monomeric types, polymeric types, or mixtures thereof. One commonly used surfactant is an organofunctional silicone compound, such as a polyether silicone. Combinations of different silicones can be selected to balance foam stability during rise with the need to open the cells (in open celled foams).

Other additives include, for example, antioxidants, antifoaming agents, anti-bacterial agents, fungicides, pigments, viscosifying agents, gelling agents, aereosolozing agents, inorganic particulates (e.g., titanium dioxide, yellow iron oxide, red iron oxide, black iron oxide, zinc oxide, aluminum oxide, aluminum trihydrate, calcium carbonate), clays such as montmorillonite, wetting agents, and the like.

In certain embodiments, the additive is a water-dispersible additive or a water-soluble additive. Water-soluble additives include hydroxyl-functional or amine-functional compounds (such as glycerin, urea, propylene glycol, polypropylene glycol, polyethylene glycol, trimethylol propane and its adducts, etc.) capable of reacting with a polymeric isocyanate, e.g., PMDI.

In other embodiments, the additive can be a cross-linking agent, for example, a cross-linking agent that can be used to bond lignocellulosic material to glass. Exemplary cross-linking agents include an organosilane, such as dimethyldichlorosilane (DMDCS), alkyltrichlorosilane, methyltrichlorosilane (MTCS), N-(2-aminoethyl)-3-aminopropyl trimethoxysilane (AAPS), or a combination thereof. In other embodiments the polypeptide fractions are combined with an organosilane. The term "organosilane" refers to any group of molecules including monomers, hydrolyzed monomers, hydrolyzed dimers, oligomers, and condensation products of a trialkoxysilane having a general formula:

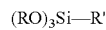

(RO)$_3$Si—R' where R is preferably a propyl, ethyl, methyl, isopropyl, butyl, isobutyl, sec-butyl, t-butyl, or acetyl group, and R' is an organofunctional group where the functionality may include an aminopropyl group, an aminoethylaminopropyl group, an alkyl group, a vinyl group, a phenyl group, a mercapto group, a styrylamino group, a methacryloxypropyl group, a glycidoxy group, an isocyante group, or others.

Similarly, a bis-trialkoxysilane having the general formula (RO)$_3$Si—R'—Si(OR)$_3$ can also be employed as an "organosilane" either alone or in combination with a trialkoxysilane, where R is preferably a propyl, ethyl, methyl, isopropyl, butyl, isobutyl, sec-butyl, t-butyl, or acetyl group, and R' is a bridging organofunctional residue which may contain functionality selected from the group consisting of amino groups, alky groups, vinyl groups, phenyl groups, mercapto groups, and others. Similarly, a tetraalkoxysilane having the general formula (RO)$_4$Si can also be employed as an "organosilane" either alone or in combination with a trialkoxysilane, or a bis-trialkoxysilane, where R is preferably a propyl, ethyl, methyl, isopropyl, butyl, isobutyl, sec-butyl, t-butyl, or acetyl group.

Other types of additives, which are of a more optional and application-specific nature, include fire retardants, fillers, reinforcements (such as glass fibers, mineral platelets such as wollastonite, and fibrous preforms), smoke suppressants, biocides, inert plasticizers, antistatic agents, combinations of these, and a host of others. The skilled artisan can select the appropriate amount of such additives based on the properties desired for the foam. For example, fillers can be used at very high levels, and can exceed the weight of the total polymer forming monomers in the formulation in some situations. Fillers can include cheap particulates such as calcium carbonate, clay minerals, sawdust and wood fibers. Fibrous reinforcements can also be use at levels exceeding the weight of the total polymer forming monomers in the formulation. Other types of optional additives, when used at all, are typically used at levels less than 15% or 10% by weight of the total polymer formulation. Most types of optional additives are individually used at levels of less than 5% by weight of the total formulation.

Examples of fire retardants include organophosphorus compounds, halogenated organophosphorus compounds, halogenated aromatic compounds, melamine (as filler), graphite (filler), alumina trihydrate (filler), antimony oxide, and combinations of the foregoing. This list is not to be construed as limiting. Soluble fire retardants are generally preferred and can be effective at lower levels than filler type fire retardants.

The appropriate use of additives in the formulation of reaction systems for cellular polyurethanes will be understood by those skilled in the art. Some additives contain isocyanate reactive functional groups and therefore must be accounted for in calculating the Index of foam formulations that contain these additives.

VI. Manufacture and Characteristics of Resulting Foams

The invention provides for the preparation of a variety of foams characterized by the different physical and chemical features. For example, the foam can be a thermoset foam or a thermoplastic foam.

A thermoset foam typically is prepared by reacting liquid precursors. Mixing the precursors (isocyanate-based reactant, isocyanate-reactive agent, blowing agent, and polypeptide composition) initiates the polymerization reaction and generates heat. The heat of reaction aids in the foam expansion. Shaping of the final foam article takes place during the foaming and polymerization process, while the reaction mixture is still flowable. In thermoset urethane foams the matrix polymer often is cross-linked. The extent of cross-linking depends on the stoichiometry of the polymer forming reaction and the reactive group functionalities of the monomers used. The amount of cross-linking can vary significantly, and the amount of cross-linking can be adjusted to optimize the properties of the foam. For example, rigid urethane foams generally are more highly cross-linked than flexible urethane foam.

When making thermoset urethane foams, the isocyanate-reactive ingredients are usually combined with the blowing agent (especially if the blowing agent comprises isocyanate reactive functional groups, as in the case of water) and optional additives to produce a liquid mixture. The liquid mixture then is mixed with a isocyanate-based reactant to initiate polymerization and foaming. In some variations on this general process, a portion of the isocyanate-reactive ingredients can optionally be pre-reacted with a stoichiometric excess of a polyisocyanate to form a liquid isocyanate-terminated prepolymer. The prepolymer is later reacted with the remainder of the isocyanate-reactive ingredients in the final step (to complete the polymerization and initiate foaming). In the most common variation on the prepolymer process, the prepolymer also comprises residual monomeric polyisocyanate species (base polyisocyanates). These sometimes are referred to as semiprepolymers, pseudoprepolymers, or quasiprepolymers. These terms are used interchangeably. If the isocyanate terminated prepolymer contains no monomeric polyisocyanate species it is referred to as a full prepolymer. Whether or not a prepolymer is used, the most common processing mode for thermosetting urethane foams is to use two liquid components (i.e., a polyisocyanate component, and the blend of isocyanate-reactive monomers plus blowing agents plus optional additives). There are however some important exceptions to this rule. During the continuous manufacture of flexible foam slabstock and rigid foam laminates, three or more components are often used. The additional components may comprise reactive polymer-forming ingredients of the formulation (such as polyisocyanates or polyols).

Thermoplastic foams often are prepared using a two-step procedure. For example, in certain embodiments, polymer forming ingredients are processed into solid pellets, which are compounded with any desired additives and blowing agents. The final forming and expanding operation is accomplished by applying external heat, usually in an extruder. The external heat drives the expanding process by volatilizing a volatile blowing agent, by decomposing a chemical blowing agent to liberate a gas, or some combination of these processes. The thermoplastic foam is shaped in a molding means, and the shape is locked in when the matrix polymer cools and solidifies. Thermoplastic urethane foams are usually linear, although limited cross-linking may occur during the forming process.

The foam-forming materials described herein can be used to prepare flexible foam, rigid foam, or semi-rigid foam. Flexible foams made from polyurethanes, for example, often have polymer matrices that are phase separated elastomers. The flexible phase of the polymer is the portion derived from the flexible polyol. Since this flexible phase is often the predominant portion of the polymer by weight, it is a continuous phase. The non-flexible portion of the polymer is that derived from the reaction of polyisocyanates with water and (optionally) low molecular weight glycols of less than 200 molecular weight. This "hard" phase of the polymer typically separates from the soft phase during polymerization. Although the "phases" are covalently bonded to each other, they behave as if separate. Hence, the matrix polymer is elastomeric, but its hardness is determined by the relative proportions of the hard and soft phases. These relative proportions are adjustable, by selecting how much flexible polyol is used as a percentage of the total formulation.

Flexible foam formulations typically are blown mostly or exclusively with water (sometimes augmented with air or carbon dioxide injected into the liquid chemical precursor streams). Preparation of lower density foam typically requires more water (to generate $CO_2$ for expansion), which produces more urea groups in the hard phase, thus higher hardness of the foam. Minor amounts of low molecular weight glycols (of molecular weight less than 200, preferably less than 150) are sometimes included in the formulation if a hard and resilient flexible foam is desired. These glycols typically are less than 10% of the total formulation, desirably less than 5%, and sometimes are referred to as chain extenders. The preferred glycols are linear di-primary diols such as ethylene glycol, 1,4-butanediol, 1,6-hexanediol, and combinations of these. Foams of this type are called "high resilience" (or HR) foams. Flexible foams typically have densities less than 5 lbs per cubic foot, more typically less than 3 lbs per cubic foot, and are predominantly open celled.

Flexible foams of very low density (less than 1 lb per cubic foot) can be prepared by crushing rigid foams that contain minor amounts of flexible polyols in their matrix polymer phase. The crushing has the effect of breaking the rigid rod-like segments that form the boundaries between the cells of the foam (referred to as "struts"). Such flexible foams can be used as cushioning materials in automotive seating, furniture, and bedding. Foam densities for these applications range from about 1.5 to 4 lbs per cubic foot, more typically 1.8 to 3 lbs per cubic foot.

Flexible foams usually are open celled foams, except at very high densities (over 4 lbs per cubic foot). Because of their open celled structure, water blowing is the preferred mode of foam expansion. Flexible foams usually are made with a flexible polymer matrix. The crosslink density in the polymer matrix is low and the Index is seldom higher than 105% (often lower than 100%). The number averaged functionality of the polyisocyanates used in flexible foams are low, usually from 2 to 2.4, more typically from 2 to 2.3.

Rigid foams typically have a rigid plastic matrix. The matrix polymer typically is either a polyurethane or a polyurethane-polyisocyanurate. In either case, the polyols used are quite different from the types used in flexible foams. The rigid polyols overlap to some degree with flexible polyols in molecular weight, typically ranging from 400 to 2,000, more commonly 500 to 1,500. The rigid polyols may be grouped into two broad categories. The first are rigid backbone, low functionality aromatic polyesters. Typically these are used in preparing polyurethane-polyisocyanurate foams, and typically are di-functional. The second category comprises high functionality polyethers, having functionalities of 3 to 10.

Aromatic polyester polyols used in rigid foams are typically prepared from phthalate type acids (any of the three commercial isomers), phthalate type esters, phthalic anhydride, or phthalate polymers such as PET by reaction thereof with low molecular weight glycols (typically less than 200 molecular weight). The preferred glycol for this purpose is diethylene glycol (DEG). This glycol tends to produce polyester resins that are liquid and of sufficiently low viscosity for processing in a mixing activated system. The DEG is generally used in large excess over the aromatic precursor, and thereby acts as a reactive solvent for the hydroxyl terminated polyester resin.

High functionality polyether polyols typically are prepared by reacting propylene oxide with a high functionality initiator. These rigid polyols are characterized by having lower equivalent weights (per —OH group) than flexible polyols. This is due to higher functionality at lower molecular weight. The equivalent weights of these polyols typically are less than 300, more typically between 50 and 200. This compares with flexible polyols, which typically have hydroxyl equivalent weights of greater than 500. The initiators typically used in preparing rigid polyether type polyols include sugars such as sucrose, and aromatic polyamines such as the toluenediamines and the oligomeric condensates of formaldehyde with aniline. Each of the primary amine groups on these aromatic polyamines reacts with two or more moles of propylene oxide. The rigid polyether polyols, like the aromatic ester polyols, typically are diluted with low molecular weight glycols such as DEG in order to achieve viscosities which are low enough for mixing activated processing.

The rigid polyols (of either type) often are further compounded with lower molecular weight aliphatic glycols, tri-ols, tetrols, and alkanolamines. Examples of these lower molecular weight polyols (which generally have molecular weights of under 200) include ethylene glycol, diethylene glycol, triethylene glycol, propylene glycol, dipropylene glycol, tripropylene glycol, the butanediols, glycerol, trimethylolpropane, diethanolamine, triethanolamine, dipropanolamine, tripropanolamine, mixtures of these, and the like.

The polymer matrices used rigid foams are almost always more highly cross-linked than those used in flexible foams. Much of the cross-linking in these polymers comes from the polyisocyanate. The number averaged functionality of the polyisocyanates used in rigid foams typically range from 2.5 to 3. Rigid polyisocyanurate-polyurethane is very highly cross-linked due to the isocyanurate (trimer) linkages in the polymer.

There is a continuum of foam types between "flexible" and "rigid". These may be called semi-rigid or semi-flexible. These foams may be prepared by using combinations of rigid and flexible polyols and polyisocyanate functionalities anywhere from 2 to 3, but most typically 2.5 to 2.8. These foams are used in a wide range of structural, energy absorbing, and decorative applications. A particularly important application of semi-rigid/semi-flexible foams is automotive poured-in-place dashboard pads and knee pads. These foams typically are poured in place behind a decorative flexible facing material such as a fabric or PVC. Densities typically range from 2 to 10 pounds per cubic foot (sometimes higher), depending on the application. Since these are non-insulation applications, the foams are most typically water blown.

Higher density cellular polyurethanes, with densities ranging from above 10 pounds per cubic foot to just short of full density, are sometimes called "microcellular" polyurethanes. These are used in a wide range of applications, which include flexible shoe soles to rigid synthetic wood substitutes, and a spectrum of semi-rigid/semi-flexible applications in between these extremes. Microcellular flexible polyurethane shoe soles may be prepared with integral skins. The skins form spontaneously due to localized collapse of the foam cells near the mold surface. The core of the foam remains cellular. This mechanism of integral skin formation is promoted by using a volatile physical blowing agent, such as a hydrofluorocarbon that is liquid at ambient temperatures. Spontaneous skin formation occurs if the temperature of the mold surface is lower than the boiling point of the physical blowing agent. Integral skin foams are also used in other applications, such as automotive armrests and various furniture applications. Shoe sole foams are generally prepared from formulations which consist entirely (or almost entirely) of difunctional monomers. Typically, the Index is 100% or sometimes slightly lower (99%). These polymers can be made from flexible diols (especially polyesters), low molecular weight diol chain extenders such as 1,4-butanediol or ethylene glycol, and diisocyanates such as 4,4'-diphenylmethane diisocyanate and semiprepolymers thereof. The polymers used in shoe sole foams are therefore essentially linear. The blowing agent usually comprises small amounts of water. By contrast, rigid and semi-rigid/semiflexible microcellular foams are more highly crosslinked. The selection of monomers is analogous to the lower density analogs. However; the higher density foams are usually closed celled. At the highest end of the polyurethane foam density spectrum are the reaction injection molded (RIM) elastomers. These can be blown entirely by entraining small amounts of air (or nitrogen) into the liquid precursor streams. This entraining process, sometimes called nucleation, amounts to whipping the gas into the liquid chemicals prior to mixing of the opposing streams and processing. RIM elastomers typically are formed from a polyisocyanate-reactive stream that comprises both a flexible polyol and a chain extender. The amount of chain extender is adjusted to control the rigidity (or flexibility) of the elastomer. Examples of typical chain extenders used to prepare these elastomers include low molecular weight glycols and aromatic diamines.

It is understood that the skilled artisan, using the methods and compositions (for example, water-soluble protein fractions and/or water-insoluble/water dispersible protein fractions, certain isocyanate-based reactants, certain isocyanate reactive compounds, and certain additives) described herein can create foams having the desired physical and chemical properties, for example, density, rigidity, compressibility, resilience, etc. For example, if a foam with lower density is desired, a water-soluble protein composition can be included in the premix. In contrast, the inclusion of water-insoluble/water dispersible protein fraction can be used to create foams with a higher density and/or with more structural integrity than can be achieved without a protein additive (for example, a water-soluble protein). Alternatively, a blend of the water-insoluble/water dispersible protein can be used to create foams of the requisite features.

In certain embodiments, the isocyanate-based reactant constitutes from about 10% (w/w) to about 90% (w/w) of the starting materials used to prepare the foam. In certain other embodiments, the isocyanate-reactive compound constitutes from about 10% (w/w) to about 90% (w/w) of the starting materials used to prepare the foam. In certain other embodiments, the protein containing composition (e.g., the water-soluble polypeptide composition) constitutes from about 0.01% (w/w) to about 50% (w/w) or from about 0.01% (w/w) to about 30% (w/w) or from about 0.01% (w/w) to about 10% (w/w) of the starting materials used to prepare the foam. In certain other embodiments, the foam is produced at an Index in the range from about 250% to about 800%.

It is also appreciated, for example, as demonstrated in Example 11, that small amounts of the added protein compositions (e.g., crude material, protein isolates, or isolated water-soluble and/or water-insoluble proteins) in the foam pre-mix can have a profound effect on the physical properties of the resulting foams. In certain embodiments, the pre-mix contains less than 10%, 9%, 8%, 7%, 6%, 5%, 4%, 3%, 2%, 1%, 0.5%, 0.1%, 0.05%, or 0.01% by weight the protein composition. By way of example, in Example 11, the polyol blend (Part B) containing about 0.09% by weight of a water-soluble protein fraction was capable of modulating the density of the resulting foam.

In addition, the polypeptide composition can be designed to have a particular polydispersity index. In addition, the polypeptide composition and the adhesive composition can be designed to have a polydispersity index. The term "polydispersity index" (PDI) refers to the ratio between the weight average molecular weight $\overline{M_w}$ and the number average molecular weight $$\overline{M_n}: PDI = \frac{\overline{M_w}}{\overline{M_n}}$$

The terms "number average molecular weight," denoted by the symbol Mn and "weight average molecular weight," denoted by the symbol Mw, are used in accordance with their conventional definitions as can be found in the open literature. The weight average molecular weight and number average molecular weight can be determined using analytical procedures described in the art, e.g., chromatography techniques, sedimentation techniques, light scattering techniques, solution viscosity techniques, functional group analysis techniques, and mass spectroscopy techniques (e.g., MALDI mass spectroscopy). For instance, as illustrated in Example 2, average molecular weight and number average molecular weight of the polypeptide composition was determined by MALDI mass spectroscopy. Further, it is contemplated that polypeptide compositions having different molecular weights may provide foam compositions having different properties. As such, the weight average molecular weight, number average molecular weight, and polydispersity index can be an important indicator when optimizing the features of the foam composition. Further, as described herein, the molecular weight of the polypeptide composition can be altered by subjecting the proteins therein to enzymatic digestion or fractionation of the polypeptide composition.

Further, it is contemplated that polypeptide compositions having different molecular weights may provide adhesive compositions having different properties. As such, the weight average molecular weight, number average molecular weight, and polydispersity index can be an important indicator when optimizing the features of the adhesive composition. In particular, it is contemplated that the ability to optimize the molecular weight characteristics of the polypeptide compositions provides advantages when preparing an adhesive composition for a particular use. Further advantages include obtaining adhesive compositions with similar properties even though the polypeptide composition may be obtained from a different source (e.g., soy vs. castor) or when similar protein sources are harvested during different seasons, over varying periods of time, or from different parts of the world. For example, proteins isolated from soy and castor (each having different molecular weight distributions) can be made to have similar molecular weight distributions through digestion and fractionation processes described herein. Accordingly, the ability to measure and control the consistency of molecular weight distributions is contemplated to be beneficial when optimizing various features of the adhesive composition, e.g., long-term reproducibility of physical properties and process characteristics of formulated adhesives. The molecular weight characteristics of the polypeptide composition can be altered by subjecting the proteins therein to enzymatic digestion or fractionation according to the procedures described herein.

In certain embodiments, the PDI of the premixes used to produce the foam compositions described herein is from about 1 to about 3, from 1 to 1.5, from 1.5 to 2, from 2 to 2.5, from 2.5 to 3, from 1 to 2, from 1.5 to 2.5, or from 2 to 3.

VII. Applications of Foam

Numerous applications for foams have been described in the art, and the foams described herein are contemplated to be amenable to a large variety of applications. For example, flexible foams made using methods described herein may be molded (as in automobile seating), or poured as slabstock and subsequently cut to shape (as in furniture and bedding). Other important applications of flexible polyurethane foams include carpet underlay.

The foams may also be used as insulation. It is understood that an important physical property of insulation foams is thermoconductivity. In order to achieve the lowest possible thermoconductivity, rigid foams can be blown with a volatile hydrofluorocarbons (such as the pentafluoropropanes). These physical blowing agents have lower thermoconductivities than air or carbon dioxide. Water can be used as a secondary blowing agent. The density range for rigid insulation foams typically is from 1.5 to 4 or from 2 to 2.5 pounds per cubic foot. Rigid foams can be poured or injected in place, but are more commonly produced as laminated boardstock. The laminate boards subsequently are cut to shape and used in construction. Rigid insulation foams typically are closed celled foams, in order to retain the low thermoconductivity (hydrofluorocarbon) blowing agent.

Rigid foams can also be used for purely structural applications, where thermoconductivity is not a factor. An important example of a purely structural application of rigid foams is automobile interior door panels. These materials are molded to shape and entirely water blown. They often are reinforced with glass fibers in order to enhance structural strength. Short glass fibers can be added to the liquid precursor streams, usually the isocyanate-reactive component. More commonly the structural reinforcement is provided in the form of glass mats or preforms which are pre-placed in the mold. The reacting foam-forming mixture then is poured over the mat (before the mold is closed) or injected through the mat. The foam then rises and flows through the mat within the mold.

Foam can also be used as packaging. Foams for packaging are typically water blown, open celled, and of very low density. Foam densities in packaging are typically below 2 pounds per cubic foot and may be less than 1 pound per cubic foot. These foams can be poured or injected around the objects to be packaged.

EXAMPLES

The invention now being generally described, will be more readily understood by reference to the following examples, which are included merely for purposes of illustration of certain aspects and embodiments of the present invention, and are not intended to limit the invention.

Example 1

Isolation of Polypeptide Compositions

Procedures for isolating and characterizing the water-soluble polypeptide composition, water-insoluble polypeptide composition, or a mixture thereof are described below.
Procedure A: Preparation of Water-Soluble Polypeptide Composition and Preparation of Water-Insoluble Polypeptide Composition.

Everlase digested protein from castor (experimental sample lot 5-90) was obtained from Prof. S. Braun at the Laboratory of the Department of Applied Biology at the Hebrew University of Jerusalem, Israel. Digested castor can be prepared as follows: castor meal protein is suspended in water at the ratio of about 1:10 w/w. Calcium chloride is added to an effective concentration of about 10 mM, and the pH of the suspension adjusted to pH 9 by the addition of 10 N NaOH. The reaction is then heated to 55° C. while stirring. Next, Everlase 16L Type EX® (NOVOZYMES') is added at the ratio of 20 g per kg of castor meal protein, and the mixture is stirred at the same temperature for about 4 hours. Finally, the resulting mixture is brought to a pH 3.5 with citric acid and spray-dried to provide a powder.

The Everlase digested protein from castor (lot 5-90) was fractionated to yield a water-soluble fraction, and a water-insoluble, dispersible fraction. In the first step, 300 g of digested castor was slurried into 1 liter of distilled water. The mixture was shaken by hand, and was then placed into a sonicator bath for a period of 30 minutes. The slurry then was removed and was allowed to set idle for a period of up to two days to allow the insoluble portion to settle (in separate experiments, it was found that centrifuging was equally adequate). At that point, the clear yellow/amber supernatant was pipetted away and was retained for future use. Fresh distilled water was then added to the sediment to bring the total volume back to the 1-Liter mark on the container. The process of shaking, sonicating, settling, supernatant extracting, and replenishing with fresh distilled water (washing) then was repeated (6 times in total). In the final step, the water was pipetted from the top of the grayish-black sediment, and the sediment was then dried in a vacuum oven at 45° C. Based on the sediment's dry weight, the water-insoluble/water dispersible polypeptide fraction was determined to comprise of approximately 50% by weight of the digested castor. Separately, the $1^{st}$ and $2^{nd}$ supernatants were combined and were then dried to yield a transparent yellow-colored, water-soluble polypeptide fraction.

After drying the fractions, it was verified that the grayish-black sediment (the water-insoluble and dispersible fraction) could not be re-dissolved in water. On the other hand, the dried supernatant fraction (clear/amber, glassy solid) was completely soluble in water.

Figure 2:
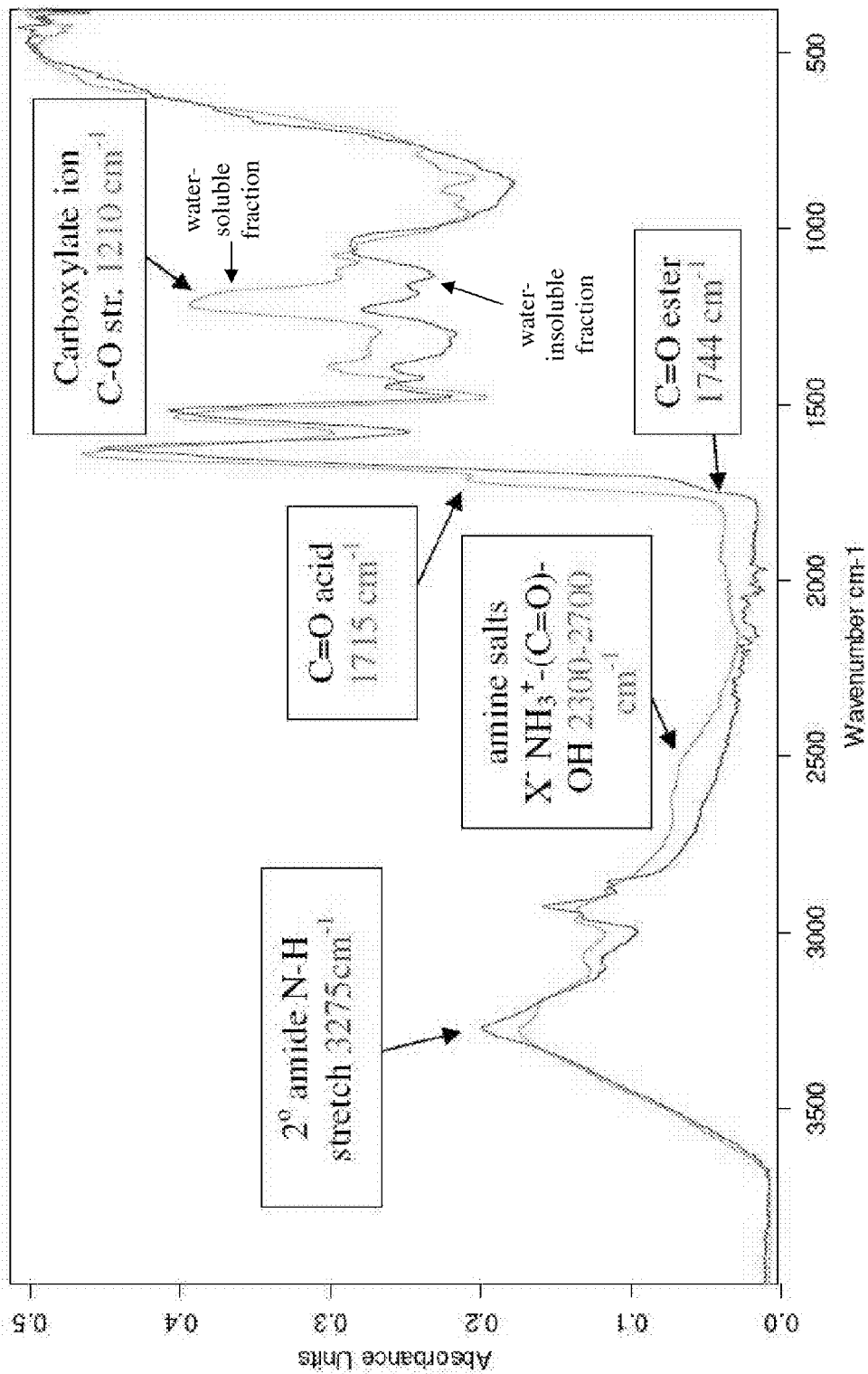
FIG. 2 shows overlaid solid state FTIR spectra for water-soluble and water-insoluble protein fractions isolated from digested castor lot 5-90.
Figure 3:
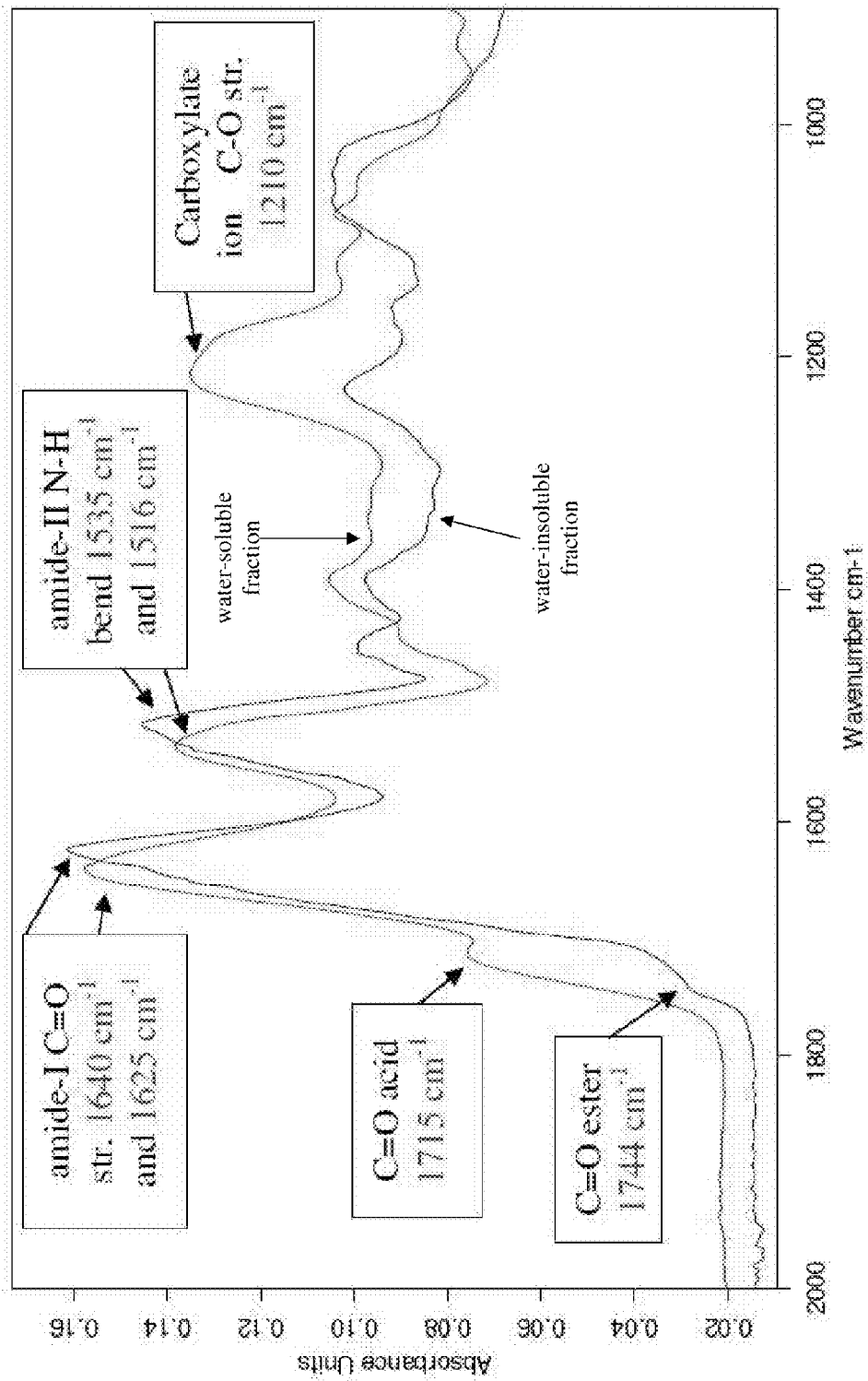
FIG. 3 shows solid state FTIR spectra of isolated water-soluble and water-insoluble fractions from digested castor, where the carbonyl amide region is expanded.

The two fractions were separately analyzed by solid state FTIR (see FIGS. 2-4). The spectra in FIG. 2 show that carboxylate and amine salt moieties are primarily associated with the water-soluble fraction. FIG. 3 shows that the amide carbonyl stretch band and the amide N—H bend bands are shifted to higher wavenumbers in the water-soluble polypeptide fraction. These components also appear to be present in the water-insoluble dispersible polypeptide fraction, but the predominant amide-I and amide-II bands are shifted to lower wavenumbers. Aside from hydrogen bonding effects, these differences also appear to be related to the presence of a higher fraction of primary amide groups in the water-soluble polypeptide fraction, and to a higher fraction of secondary amide groups in the water-dispersible polypeptide fraction (from the main-chain polypeptide chains). This is corroborated by the N—H stretching region depicted in FIG. 4.

FIG. 4 shows solid state FTIR spectra of isolated fraction from digested castor where the N—H stretching region from FIG. 2 is expanded. The spectra were vertically scaled to achieve equivalent absorbance intensities for the secondary amide N—H stretch band centered at 3275 $cm^{-1}$. FIG. 4 shows that the predominant type of amide in the water-dispersible fraction is the secondary main-chain amide as evidenced by the single, highly symmetric band centered at 3275 $cm^{-1}$. Although the water-soluble fraction also contains this type of amide, it also contains significantly higher fractions of primary amides as evidenced by the presence of the two primary N—H stretching bands at approximately 3200 $cm^{-1}$ (symmetric) and at approximately 3300 $cm^{-1}$ (asymmetric), respectively.

These spectra show that the water-soluble polypeptide fraction combined a relatively high concentration of primary amines, free carboxylic acids, acid salts, and amine salts. Conversely, the water-insoluble/water dispersible polypeptide fraction had a higher fraction of secondary amides. In addition, the amide-I carbonyl absorption band for the water-insoluble/dispersible fraction was observed to appear at a wavenumber of approximately 1625 $cm^{-1}$, whereas that of the water-soluble fraction was observed at approximately 1640 $cm^{-1}$. As will be discussed in other Examples, this feature is one of the distinguishing differences between the water-soluble and water-insoluble polypeptide fractions; not only for castor proteins, but for soy proteins as well.

Procedure B: Additional Procedure for Preparation of Water-Soluble Polypeptide Composition and Preparation of Water-Insoluble Polypeptide Composition.

Digested soy protein was obtained as an experimental sample (lot 5-81) from Prof. S. Braun, the Laboratory of Applied Biology at the Hebrew University of Jerusalem, Israel. The digested soy protein was prepared as follows. Soy protein isolate (Soy protein isolate SOLPRO 958® Solbar Industries Ltd, POB 2230, Ashdod 77121, Israel) was suspended in water at a ratio of 1:10 (w/w). The pH of the suspension was adjusted to pH 7 with 10N NaOH, and was then heated to 55° C. while stirring. Neutrase 0.8 L® (NOVOZYMES') then was added at a ratio of 20 g per kg of soy protein, and the mixture was stirred at the same temperature for 4 hours. The resulting mixture (pH 6.5) was spray-dried to yield a light tan powder.

Digested soy (lot 5-81) was fractionated to yield a water-soluble polypeptide fraction, and a water-insoluble/water dispersible polypeptide fraction. In the first step, 300 g of digested soy was slurried into 1 liter of distilled water. The mixture was shaken by hand, and was then placed into a sonicator bath for a period of 30 minutes. Aliquots were placed into centrifuge tubes, and the tubes were then spun at 3,400 rpm for a period of approximately 35 minutes. The centrifuged supernatant, which contained the water-soluble fraction, was decanted off of the remaining water-insoluble sediment, and was poured into a separate container for later use (this clear yellow supernatant was placed into an open pan and was allowed to evaporate dry at a temperature of 37° C.). After the first washing step, fresh distilled water was then added to the tubes, and the remaining sediment was dispersed into the water by means of hand-stirring with a spatula. The combined centrifugation, decanting, and re-dispersion procedures were performed for a total of 5 cycles. After the final cycle, the free liquid containing residual water soluble protein was decanted from the residual paste-like dispersion (yellowish-peach in color). The resulting dispersion (gravimetrically determined to be 16.24% solids by weight) contained the water-insoluble/water dispersible proteins.

The paste-like dispersion was observed to be stable for a period of several weeks. It was also discovered that the dispersion could be readily combined with water-soluble polymers, and with water-dispersible polymer latexes. Moreover, the dispersion was readily compatible with PMDI (a stable dispersion was formed when PMDI was added to the slurry, and there was no evidence of PMDI phase separation, even after 24 hours). By contrast, neither the water soluble extract from the digested soy, nor the digested soy itself was capable of stabilizing a dispersion of PMDI in water.

After drying aliquots of both fractions, it was verified that the yellow sediment (the water-insoluble/dispersible extract) could not be re-dissolved in water. On the other hand, the dried supernatant fraction (clear/yellow solid) was completely soluble in water. The two dried extracts were separately analyzed by solid state FTIR (see FIGS. 5-8). FIG. 6 shows overlaid solid state FTIR spectra of isolated fractions from digested soy, where the N—H region is expanded. The spectra were vertically scaled to achieve equivalent absorbance intensities for the secondary amide N—H stretch band centered at 3275 cm$^{-1}$. FIG. 6 shows that the predominant type of amide in the water-dispersible fraction is the secondary main-chain amide as evidenced by the single, highly symmetric band centered at 3275 cm$^{-1}$. Although the water-soluble polypeptide fraction also contains this type of amide, it also contains significantly higher fractions of primary amides as evidenced by the presence of the two primary N—H stretching bands at approximately 3200 cm$^{-1}$ (symmetric) and at approximately 3300 cm$^{-1}$ (asymmetric), respectively. Collectively, these spectra revealed that the water-soluble polypeptide fraction was comprised of a relatively high concentration of primary amines. Conversely, the water-insoluble, dispersible polypeptide fraction was comprised of a higher fraction of secondary amines.

Figure 5:
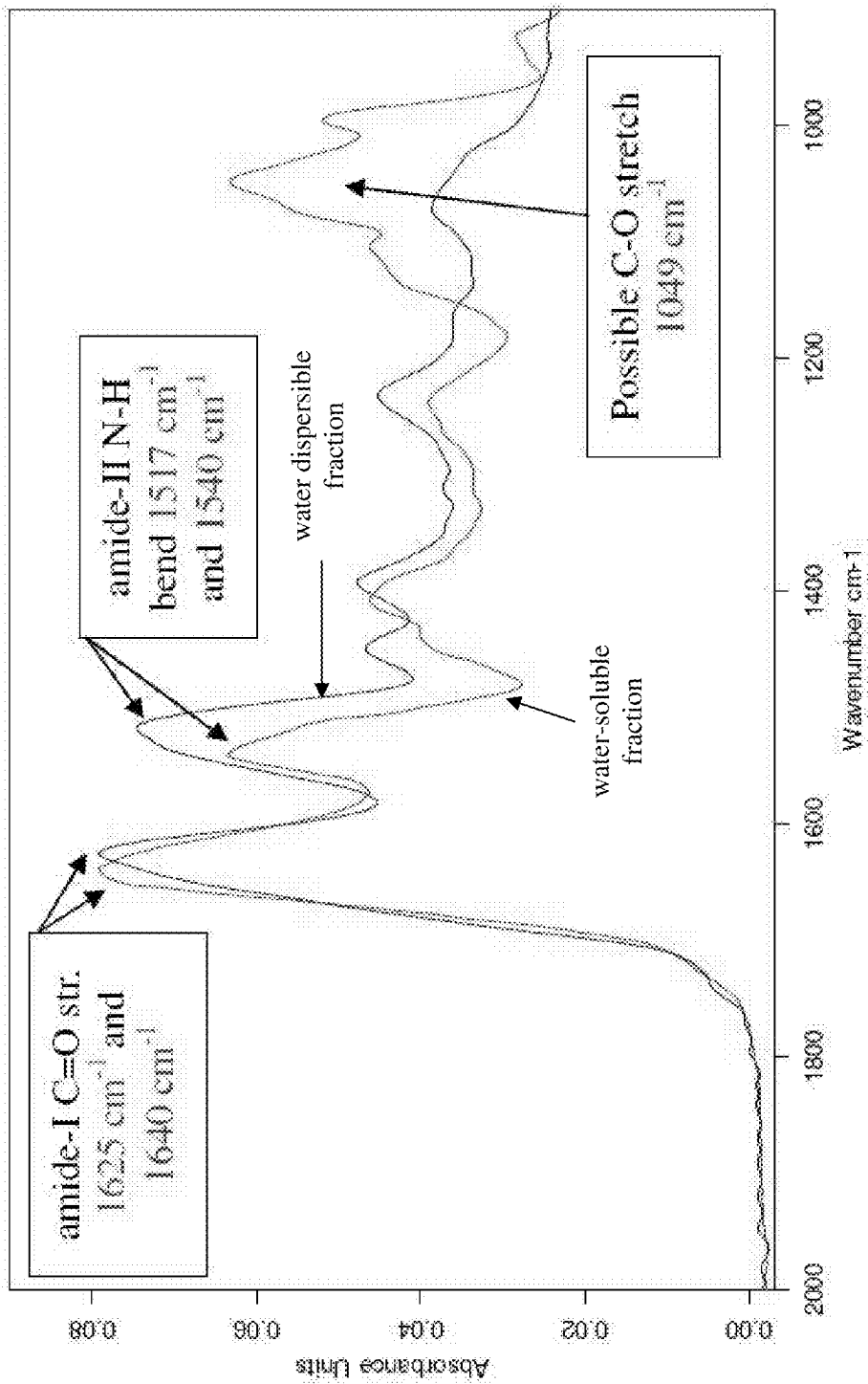
FIG. 5 shows overlaid solid state FTIR spectra of isolated fractions from castor protein (lot 5-94), showing an expansion of the carbonyl amide region (water-soluble fraction, and water-insoluble/water dispersible fraction)

As shown in FIG. 5, the amide carbonyl stretch band and the amide N—H bend band are shifted to higher wavenumbers in the water-soluble fraction. These components also appear to be present in the water-insoluble dispersible fraction, but the predominant amide-I and amide-II bands are shifted to lower wavenumbers. Aside from hydrogen bonding effects, these differences appear to be related to the presence of a higher fraction of primary amide groups (and/or primary amines) in the water-soluble polypeptide fraction (from lower molecular weight amino acid fragments), and to a higher fraction of secondary amide groups in the water-dispersible polypeptide fraction (from the main-chain polypeptide chains). This is supported by the N—H stretching region depicted in FIG. 6.

FIG. 6 shows that the predominant type of amide in the water-dispersible fraction is the secondary main-chain amide as evidenced by the single, highly symmetric band centered at 3275 cm$^{-1}$. Although the water-soluble fraction also contains this type of amide, it also contains significantly higher fractions of primary amines as evidenced by the presence of the two primary N—H stretching bands at 3200 cm$^{-1}$ (symmetric) and at approximately 3300 cm$^{-1}$ (asymmetric), respectively.

Figure 7:
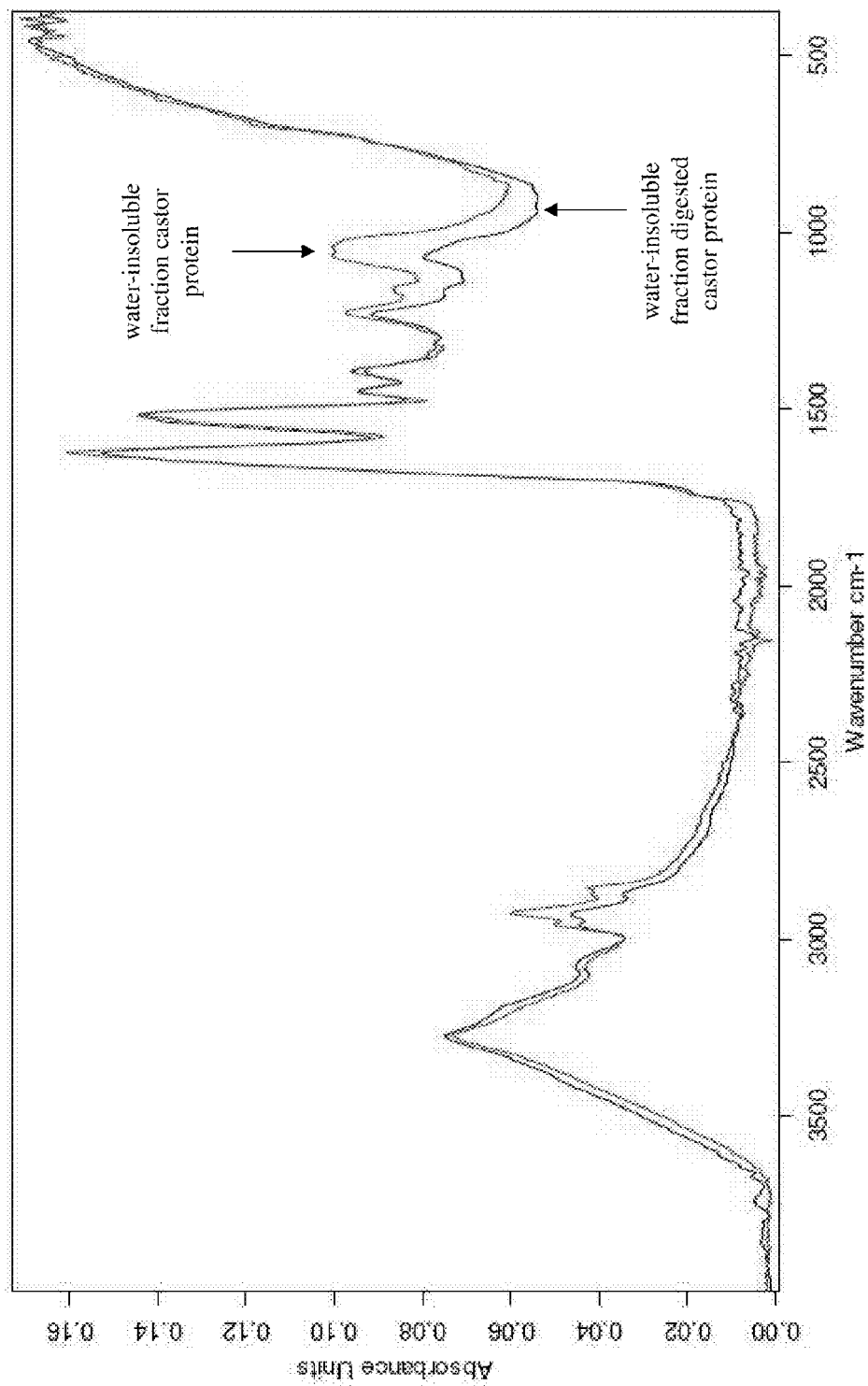
FIG. 7 shows overlaid solid state FTIR spectra of the isolated water-insoluble/water dispersible fractions from castor protein (lot 5-94) and from enzyme digested castor (lot 5-90)
Figure 8:
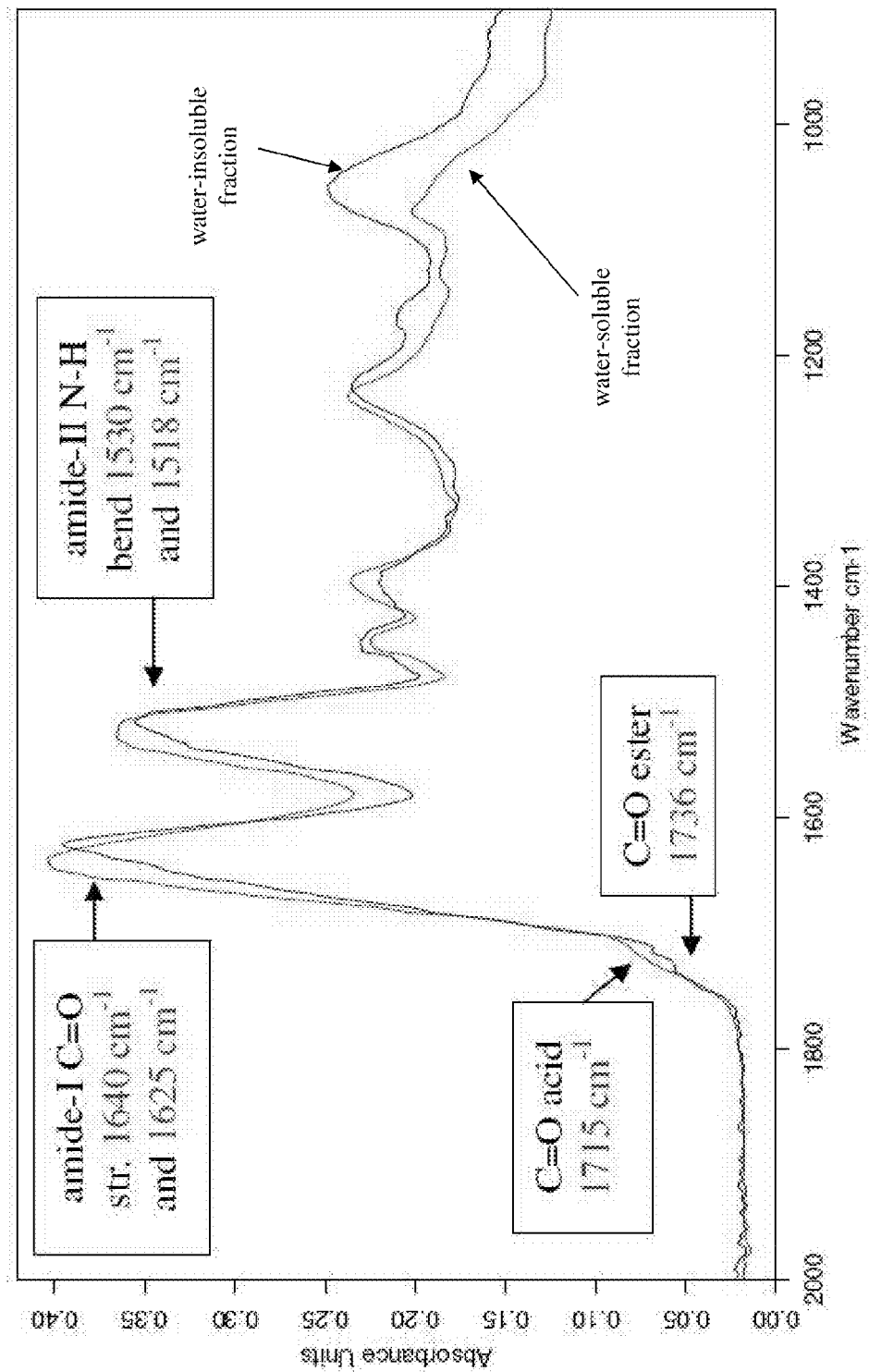
FIG. 8 shows overlaid solid state FTIR spectra of isolated water-soluble and water-insoluble fractions from digested soy, where the carbonyl amide region is expanded, where the spectra were vertically scaled to achieve equivalent absorbance intensities for the amide-I carbonyl stretch.

In spite of being derived from different plant sources, the water-insoluble dispersible fractions from digested soy and digested castor are spectrally similar to one another (see FIG. 7). Conversely, the water-soluble polypeptide fractions appear to have different FTIR spectral characteristics (see FIG. 8). Further, MALDI mass spectroscopic indicates the water-soluble polypeptide fractions from digested soy and digested castor have different molecular weight characteristics. The commonality between the two types of water-soluble fractions is that they both appear to contain primary amines/amides.

Procedure C: Additional Procedure for Preparation of Water-Soluble Polypeptide Composition and Preparation of Water-Insoluble Polypeptide Composition Castor meal (4.0 kg containing 24.8% protein) was suspended in 0.1M NaOH at a 10:1 w/w meal to alkali ratio. The suspension was stirred for 18 hours at ambient temperature and the solids were then removed by centrifugation. The supernatant (about 32 liters) was acidified to pH 4.5 with 10 N HCl. The protein was allowed to sediment at about 10° C. for 12 hours, the clear supernatant solution was decanted, and the heavy precipitate (about 2 kg) was collected by centrifugation. The wet precipitate was freeze-dried yielding 670 g protein isolate.

The water-insoluble and water-soluble polypeptide fractions were obtained by means of extraction with water. In the first step, 10 g of the castor protein isolate (lot 5-94) was slurried into 50 g of distilled water. The mixture was dispersed via mechanical stirring for 2 hours. Aliquots then were placed into centrifuge tubes, and the tubes were then spun at 3,400 rpm for a period of approximately 35 minutes. The centrifuged supernatant, which contained the water-soluble fraction, was decanted from the remaining water-insoluble sediment, and was poured into a separate container (this clear yellow supernatant was saved and dried at 37° C. for subsequent dispersion experiments and solid state FTIR analyses). After the first washing step, fresh distilled water was then added to the tubes, and the remaining sediment was dispersed into the water by means of hand-stirring with a spatula. The combined centrifugation, decanting, and re-dispersion procedures were performed for a total of 13 cycles. After the final cycle, the free liquid was decanted from the residual paste-like dispersion (the water-insoluble polypeptide fraction from the starting castor protein). Upon drying, the paste was determined to contain 28.58% solids, and the total yield of the water-insoluble fraction was determined to be 62.87%. Thus, the starting castor protein itself contained 62.87% water-insoluble polypeptide material, and 37.12% water-soluble polypeptide material.

Procedure D: Preparation of Digested Whey Protein.

Digested whey protein (lot 5-72, referred to herein as digested whey protein pH 6.5) was obtained as an experimental sample from Prof. S. Braun, the Laboratory of Applied Biology at the Hebrew University of Jerusalem, Israel, and was prepared as follows; Whey protein (WPI-95® Whey Protein Isolate; Nutritteck, 24 Seguin Street, Rigaud, QC, Canada J0P 1P0) was suspended in water at a ratio of 1:6 (w/w). The pH of the suspension was adjusted to pH 7 with 5N NaOH, and was heated to 55° C. while stirring. FLA-VOURZYME 500MG® (from NOVOZYMES') then was added at a ratio of 20 g per kg of whey protein, and the mixture was stirred at the same temperature for 4 hours. The resulting aqueous mixture was pH 6.5. The resulting mixture then was spray-dried to yield digested whey protein as a pale yellow powder containing a mixture of water-soluble and water-insoluble polypeptide.

Procedure E: Preparation of Digested Castor Protein Reacted with Sodium Nitrite.

Castor meal protein was suspended in water at a ratio of 1:10 (w/w). Calcium chloride was added at an effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at a ratio of 10 g per kg of castor meal protein, and the mixture was stirred at the same temperature for 4 hours. L-lactic acid (90%, 120 g per kg castor protein) then was added to bring the mixture to pH 4.4 followed by gradual addition (over a 20 hour period) of sodium nitrite solution in water (0.4 kg/1, 0.4 liter per kg castor protein) while stirring. The reaction then was left to stand at ambient temperature for 40 hours. $Na_2S_2O_5$ (0.2 kg per kg castor protein) was then added, and the reaction was heated to 60° C. and stirred for 15 minutes. After cooling to ambient temperature, the reaction was brought to pH 2.0 with concentrated HCl. It was then left at 10° C. for 18 hours, and the resulting precipitate was separated by centrifugation for 15 minutes at 24,000×g. The precipitate was re-suspended in 10 mM citric acid (3 vol. per vol. precipitate), and then it was collected and subsequently freeze-dried to yield a tan powder containing a mixture of water-soluble and water-insoluble polypeptide.

Example 2

Characterization of Polypeptide Compositions by Mass Spectrometry

This Example describes characterization of the various protein samples via MALDI Mass Spectrometry using an Ultraflex III instrument from Bruker.

The instrument was set in positive mode, in order to detect positive ions generated during the ionization process. The voltage applied to accelerate the ion into the TOF analyzer was set at 25 KV. The analysis was carried out by using the instrument in reflection mode which improves the resolution. Solid samples were dissolved in DMSO at a concentration of 10 mg/mL. Water-soluble supernatant fractions which were solvated in water.

Each sample solution was mixed with a matrix solution (for analytical purposes). The matrix was an inert compound of low molecular weight which absorbs at the same wavelength of the laser, Nd:YAG 355 nm. The matrices used were: α-CHCA, alpha-cyano-4-hydroxycinnamic acid, dissolved in a solution of ACN/$H_2O$ (70:30) with 0.1% of TFA at a concentration of 10 mg/mL; and DCTB, T-2-[3-(4-t-Butyl-phenyl)-2-methyl-2-propenylidene]malononitrile, dissolved in THF at a concentration of 10 mg/mL. The first matrix was mainly used for the analysis of peptides and proteins while the second one, DCTB, was suitable for the analysis of polymers.

The matrix solutions and the sample solutions were mixed at a 10:1 volume ratio respectively. For the analysis where DCTB was used as matrix, NaTFA (10 mg/mL in THF) was added to the solution matrix/sample as a cationizing agent at a ratio 10:2:1 by volume (matrix:sample:salt, respectively). 0.8 μL of the resulting solutions were spotted on a target plate made of polished steel, and only after the solvents were completely dried was the target loaded into the instrument. The spectra were collected and manipulated by using FlexAnalysis software released by Bruker Daltonics.

Relative fragment intensities were normalized and used to calculate number average (Mn), weight average (Mw), and z-average (Mz) molecular weight parameters for various samples. The results are summarized in Table 2.

TABLE 2

| Sample ID | Mn | Mw | Mz | Mw/Mn |
|---|---|---|---|---|
| Castor protein isolate lot 5-94 [1] | 1149 | 1162 | 1179 | 1.01 |
| Digested castor lot 5-83 [2] | 951 | 1081 | 1250 | 1.13 |
| Digested castor lot 5-108 [3] | 897 | 1011 | 1169 | 1.12 |
| Digested castor Water-insoluble/dispersible fraction (lot 5-108) [3] | 1009 | 1371 | 1928 | 1.35 |
| Digested castor Water-soluble fraction (lot 5-108) [3] | 1532 | 1697 | 1894 | 1.10 |
| Soy Protein Isolate | 2023 | 2104 | 2161 | 1.03 |
| Digested Soy (lot 5-81) [4] | 894 | 989 | 1104 | 1.10 |
| Digested Soy Water-insoluble/dispersible fraction (lot 5-81) [4] | 910 | 1119 | 1512 | 1.22 |
| Digested Soy Water-soluble fraction (lot 5-81) [4] | 837 | 888 | 941 | 1.06 |

[1] see Example 1, Procedure C
[2] see Example 6
[3] see Example 3
[4] see Example 1, Procedure B The results indicate that the molecular weight characteristics (as determined by MALDI mass spectroscopy) of the polypeptide composition can depend on the process used to obtain the polypeptide composition. For example, castor protein isolate was observed to have a higher number average molecular weight than its digested counterpart. Further, upon digestion, the number average molecular weight was observed to decrease while the polydispersity increased. The same trend was observed for the soy protein isolate and its digested counterpart.

Other experimental results indicate that proteins in the water-soluble polypeptide composition from digested castor have a higher number average molecular weight than its parent protein isolate. However, proteins in the water-soluble polypeptide composition from digested soy had a lower number average molecular weight than its parent soy protein isolate.

Nonetheless, each of these water-soluble polypeptide compositions was able to facilitate a reduction in the density of polyurethane foam compared to foams prepared without the polypeptide composition. Furthermore, water-soluble polypeptide compositions having similar molecular weights and molecular weight distributions could be obtained by enzymatic digestion of soy and castor protein isolates (even though the soy protein isolate has higher molecular proteins than and castor protein isolate prior to enzymatic digestion). Collectively, these results indicate that it is possible to prepare reduced-density foams from a variety of polypeptide compositions.

Example 3

Oil Dispersion Characteristics of Water-Soluble and Water-Insoluble Protein Fractions A water-insoluble/water dispersible polypeptide fraction and a water-soluble polypeptide fraction were isolated from digested castor (lot 5-108) based on procedures described in Example 1 (Procedure A). The digested castor can be prepared as follows: castor meal protein is suspended in water at the ratio of about 1:10 w/w. Calcium chloride is added to an effective concentration of about 10 mM, and the pH of the suspension adjusted to pH 9 by the addition of 10 N NaOH. The reaction is then heated to 55° C. while stirring. Next, Everlase 16L Type EX® (NOVOZYMES') is added at the ratio of 10 g per kg of castor meal protein, and the mixture is stirred at the same temperature for about 4 hours. Finally, the resulting mixture is brought to a pH 3.5 with citric acid and spray-dried to provide a powder.

The MALDI fragmentation molecular weight characteristics of the isolated fractions are provided in Example 2 (Table 2). The solid state FTIR spectroscopic absorption characteristics for the isolated water-insoluble/dispersible polypeptide fraction conform with those as described in FIGS. 2, 3, 4, 7, 9, 10, 11 and 12 (amide-I absorption range: 1620-1632 cm$^{-1}$; amide-II absorption range: 1514-1521 cm$^{-1}$). Solution state two-dimensional proton-nitrogen coupled NMR on the isolated water-insoluble/dispersible polypeptide fraction show two protonated nitrogen clusters enveloped by $^{15}$N chemical shift boundaries at approximately 86.2 ppm and 87.3 ppm; and with $^1$H chemical shift boundaries at approximately 7.14 and 7.29 ppm for the first cluster; and at approximately 6.66 and 6.81 ppm for the second cluster. Solution state two-dimensional proton-nitrogen coupled NMR on the isolated water-soluble polypeptide fraction show a cluster of protonated nitrogen nuclei defined by $^{15}$N chemical shift boundaries at about 94 ppm and at about 100 ppm, and $^1$H chemical shift boundaries at about 7.6 ppm and at about 8.1 ppm.

Surprisingly, the water-insoluble/water dispersible polypeptide fractions with these spectral characteristics (unlike their water-soluble counterparts) exhibit the unique ability to emulsify and stabilize dispersions of oil in water and water in oil. This unique oil-dispersing capability is observed with water-insoluble/water dispersible polypeptide compositions that are extracted and isolated from multiple sources, including but not limited to (1) whole meals or protein-isolates from either soy, canola, or castor that are extracted of their water-soluble polypeptide components at or near pH-neutral conditions; (2) whole meals or protein-isolates from soy, canola or castor that are subjected to base catalyzed hydrolysis followed by acid addition and subsequent extraction of water-soluble polypeptide components; (3) whole meals or protein-isolates from soy, canola or castor that are subjected to acid catalyzed hydrolysis followed by base addition and subsequent extraction of their water-soluble polypeptide components; (4) whole meals or protein-isolates from soy, castor, or canola that are subjected to combinations of base catalyzed hydrolysis with enzyme digestion followed by acid addition and subsequent extraction of water-soluble polypeptide components.

It is understood that the stabilization of an oil-in-water or water-in-oil emulsion/dispersion depends on several factors, including but not limited to the presence or absence of a stabilizing entity such as a surfactant or a dispersant; the nature of the oil (i.e., its polarity, hydrophilicity, hydrophobicity, solubility parameter, etc.); the nature of the surfactant or dispersant (i.e., HLB value, charge characteristics, molecular weight, water solubility, oil solubility, etc.); the ionic strength of the water-phase; the presence or absence of additives and impurities in either the oil or water phases; the concentration of the oil (i.e., its weight percent in water); and the concentration of the stabilizing entity. It is further understood that the efficiency of a stabilizing entity (a "stabilizing entity" being a dispersant, an emulsifier, a surfactant, or the water-insoluble/dispersible polypeptide composition of the present invention) is often judged according to its ability stabilize an emulsion for some specified period of time (i.e., to prevent the macroscopic phase separation of immiscible oil and water components under shear or under static conditions).

In order to further demonstrate the generality of this finding, several oil-in-water dispersions were prepared with a water-insoluble/water dispersible polypeptide composition that was isolated from a digested castor protein. The water-insoluble/water dispersible polypeptide fraction was isolated as a paste-like dispersion in water. The paste was diluted with water to 16% solids, and separately to 14% solids. In the next step, 3-gram aliquots of each paste were separately weighed into 15 mL plastic beakers. Next, aliquots of the oils shown in Table 3 were separately added to individual paste aliquots at a ratio of 1 part oil to 1 part solid water-insoluble/water dispersible polypeptide composition on a weight basis (20 mixtures in total). The mixtures were stirred by hand with a spatula, and were observed to form homogenous creams. The creams remained homogeneous with no visible signs of macroscopic phase separation for prolonged periods of time after mixing including periods ranging from 1 minute after mixing, 5 minutes after mixing, 10 minutes after mixing, 15 minutes after mixing, 30 minutes after mixing, 1 hour after mixing, and 2 hours after mixing. By contrast, the analogous water-soluble extract from the digested castor was incapable of stabilizing dispersions of the oils in water.

TABLE 3

| Oil type | Source |
| --- | --- |
| PMDI | Rubinate-M from Huntsman Corporation |
| Mineral oil | Drakeol 35 from Penreco |
| Soybean oil | RBD from ADM Processing Co. |
| Motor oil | Castrol Syntec, 5W-50 |
| Castor oil | Pale Pressed Castor Oil from Alnor Oil Company, Inc. |
| Dibutyl Phthalate | 99% from Acros |
| Epoxidized soybean oil | From Aldrich |
| Caprylic triglyceride | Neobee M-5 from Stepan Co. |
| *Eucalyptus* oil | From Aromas Unlimited |
| Tributyl o-acetylcitrate | 98% from Aldrich |

Protein compositions not enriched for the water-insoluble/water dispersible fractions are unable to disperse oils. For example, a 16% solids dispersion of soy protein isolate, Lot 5-81, (Soy protein isolate SOLPRO 958® Solbar Industries Ltd, POB 2230, Ashdod 77121, Israel; protein content approximately 90%) was prepared by adding 32 grams of soy protein isolate to 168 grams of water at a pH of approximately 4 to 6 (JM-570-1). Seven 10 gram aliquots of JM-570-1 were weighed into 20 mL disposable beakers. A 10 gram aliquot contained 1.6 grams of soy protein isolate and 8.4 grams of water. Seven different oils (namely, PMDI, mineral oil, soybean oil, motor oil, castor oil, dibutyl phthalate and epoxidized soybean oil, see Table 53) were added separately at a w/w ratio of 1 part oil to 1 part protein solids (1.6 grams oil was added to each 10 gram aliquot). The mixtures were stirred by hand with a spatula. None of the oils was observed to be dispersible in the 16% solids dispersion of the soy protein isolate.

Example 4

Characterization of Polypeptide Compositions by Two-Dimensional Proton-Nitrogen NMR Correlation Spectra and Characterization of a Water-Insoluble/Water Dispersible Polypeptide Fraction The water-insoluble and water soluble protein fractions were prepared as follows. Digested castor (lot 5-83) was suspended in water at the ratio of 1:10 w/w. Calcium chloride was added to the effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at the ratio of 10 g per kg of castor meal protein, and the mixture was stirred at the same temperature for 4 hours. The resulting mixture then was brought to a pH 3.5 with citric acid and was spray-dried to yield a tan powder. Then, the water-insoluble and water soluble protein fractions were harvested as described in Example 1 (Procedure A) and were allowed to air-dry at 23° C.

The dried powder containing the water-insoluble protein fraction was dissolved in d6-DMSO (6.8% by weight) to yield a red homogeneous solution (Sample A). An aliquot of the as-made dried digested castor was also dissolved in d6-DMSO (6.8% solids by weight) to yield a comparative homogeneous red solution (Sample B). Solid-state FTIR analyses of the same dried powders revealed distinct differences in both the N—H stretching and carbonyl stretching regions of the solid state FTIR spectra. These spectral differences were attributed to differences in bonding environments for the polypeptide N—H moieties, possibly resulting from differences in secondary and tertiary structure. One of the specific differences involved a shift to lower wavenumbers for the amide-I carbonyl band in the water-insoluble/water dispersible fraction. In order to further characterize these types of differences, a two-dimensional NMR technique was employed for the purpose of characterizing a very specific subset of bonded atomic nuclei; namely, protons bonded to nitrogens.

The samples were dissolved in DMSO-d6 and were placed into 5 mm NMR tubes. All $^1$H NMR spectra were recorded on a Varian INOVA 750 MHz spectrometer equipped with an HCN-PFG (pulsed field gradient) triple resonance Cryo Probe at 30° C. For one-dimensional (1D) $^1$H NMR spectra, a spectral window of 10000 Hz was used with an acquisition time of 3 seconds and relaxation delay of 5 seconds. The spectra were signal averaged for 16 transients using a proton 90° pulse width of 8.6 microseconds. The spectral data were zero filled to 132k points and were processed with 1 Hz line broadening, then baseline corrected and referenced to an internal residual solvent DMSO-d6 peak at 2.50 ppm before integrating and making plots.

Phase sensitive two-dimensional (2D) $^1$H-$^{15}$N gradient-HSQC (heteronuclear single quantum coherence) data were collected with 2048 acquisition points in the F2 dimension and 768 points in the F1 dimension (90° pulse widths of 6.3 microseconds, and 33.5 microseconds were used for proton and nitrogen, respectively) 48 transients were collected for each increment, with a repetition delay of 1.2 seconds and acquisition time of 0.124 seconds with GARP decoupling during acquisition. The acquired data were processed with sine bell weighting and zero filled to 8196×8196 points in F2 and F1 dimensions before final transformation to produce the 2D correlation data.

Figure 13:
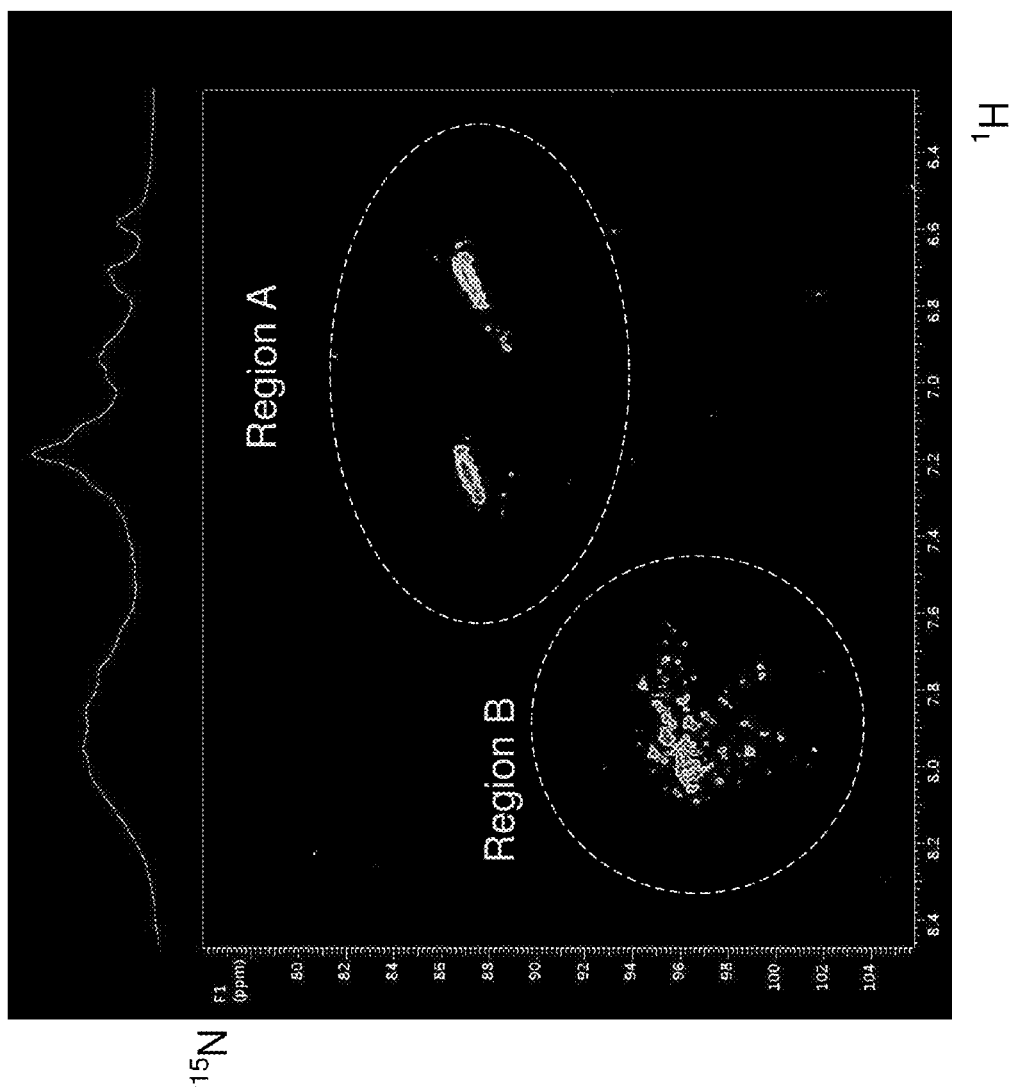
FIG. 13 is a two-dimensional HSQC$^1$H-$^{15}$N NMR spectrum for digested castor (lot 5-83) in d6-DMSO, showing two regions of interest denoted Region A and Region B.
Figure 14:
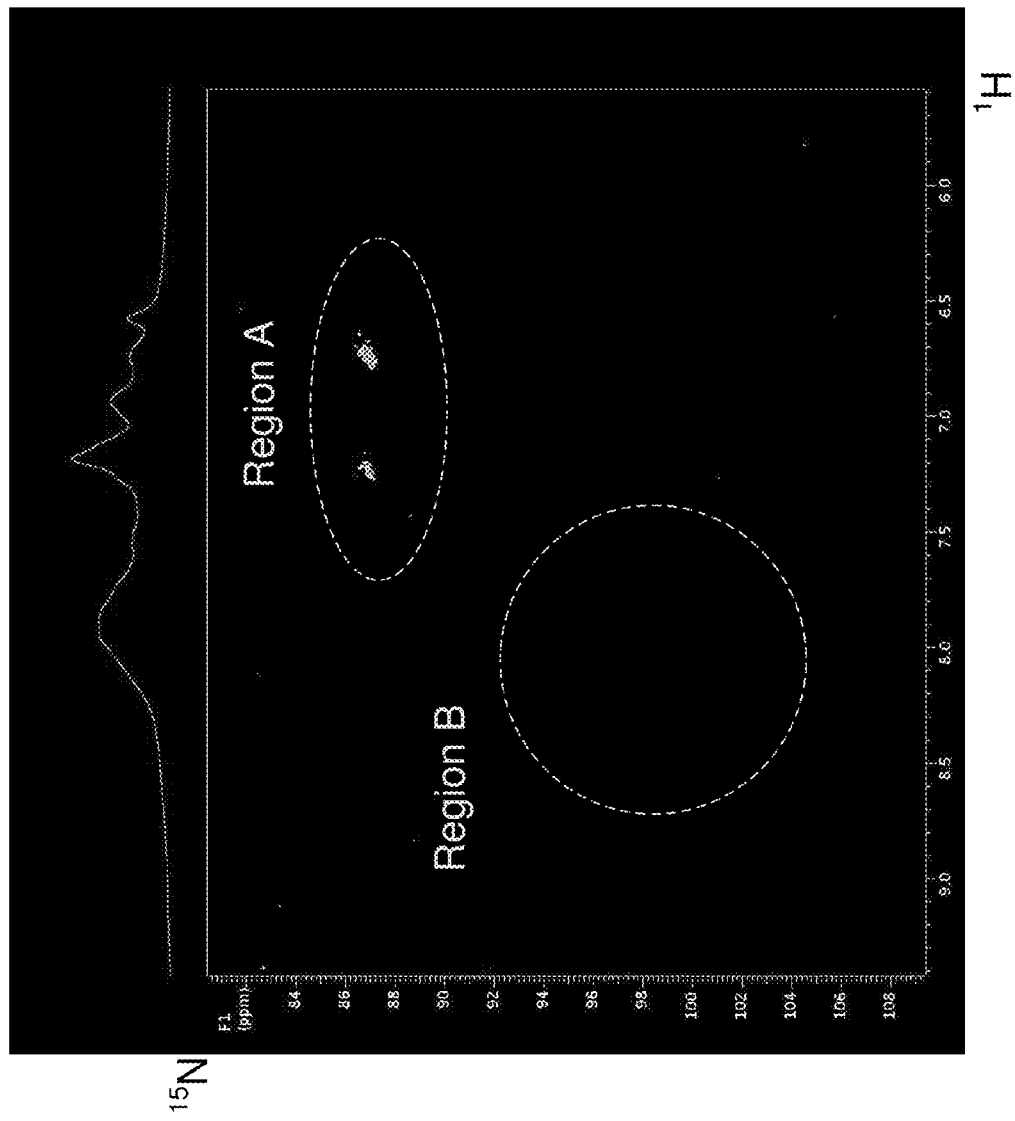
FIG. 14 is a two-dimensional HSQC$^1$H-$^{15}$N NMR spectrum for water-insoluble/dispersible polypeptide fraction derived from digested castor (lot 5-83) in d6-DMSO, again showing Region A and Region B.

The results are presented in FIGS. 13 and 14. FIG. 13 represents the two-dimensional HSQC$^1$H-$^{15}$N NMR spectrum for digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from all of the fractions that were present within the as-made digested castor (i.e., the water-insoluble/water dispersible polypeptide fractions plus the water-soluble polypeptide fractions). The multiple peaks in region B were observed to disappear upon removal of the water-soluble fractions (see FIG. 14). This indicates that these protonated nitrogens are specific to the water-soluble polypeptide fractions, whereas at least a portion of the peaks in region A are specific to the water-insoluble/water dispersible fraction.

FIG. 14 represents the two-dimensional HSQC$^1$H-$^{15}$N NMR spectrum for the water-insoluble/dispersible polypeptide extract from digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from the water-insoluble/water dispersible polypeptide fraction. The peaks within Region B were observed to be very weak in comparison to the analogous peaks within the digested castor before extraction (see FIG. 13). Conversely, the remaining peaks were predominantly from the protonated nitrogens in Region A. This indicates that these particular protonated nitrogens are specific to the water-insoluble polypeptide fractions.

As shown in FIG. 14, the peaks within the spectrum represent protonated nitrogen atoms that are specific to the water-insoluble/water dispersible polypeptide fraction. Upon expansion, the two "peaks" appear as narrow clusters that can be readily defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

The results of these studies revealed that while the water-soluble polypeptide fraction was composed of multiple types of protonated nitrogen atoms (see FIG. 13), the water-insoluble/water dispersible fraction contained significantly fewer types of protonated nitrogens, and was predominantly characterized by the presence of two major proton-nitrogen cross peak clusters (see FIG. 14). These differences, like those as seen by solid state FTIR, illustrate that the chemical bonding environments within the water-soluble polypeptide fraction are distinctly different from those that exist within the water-insoluble/dispersible fraction.

Together, the solid state FTIR and NMR data also characterize the water-insoluble/dispersible polypeptide fraction, where there is a solid-state infrared amide-I absorption band between 1620-1632 cm$^{-1}$; a solid-state infrared amide-II absorption band between 1514-1521 cm$^{-1}$; and a solution-state pair of protonated nitrogen clusters as determined by a $^1$H-$^{15}$N nuclear magnetic resonance correlation technique. More specifically, when the pair of protonated nitrogen clusters is observed by means of NMR with deuterated d6-DMSO as the solvent using a two-dimensional HSQC$^1$H-$^{15}$N NMR technique, the clusters are defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

Together, the solid state FTIR and NMR data characterize the water-soluble polypeptide fraction, where there is a solid-state infrared amide-I absorption band between about 1633-1680 cm$^{-1}$; a solid-state infrared amide-II absorption band between 1522-1560 cm$^{-1}$; two prominent 1° amide N—H stretch absorption bands centered at about 3200 cm$^{-1}$, and at about 3300 cm$^{-1}$, as determined by solid state FTIR, and a prominent cluster of protonated nitrogen nuclei defined by $^{15}$N chemical shift boundaries at about 94 ppm and at about 100 ppm, and $^1$H chemical shift boundaries at about 7.6 ppm and at about 8.1 ppm, as determined by solution state, two-dimensional proton-nitrogen coupled NMR.

Example 5

Preparation of Protein-Containing Polyurethane Foam

In this Example, polyurethane foams containing water-soluble digested castor protein were prepared and characterized.

A—Extraction of Proteins by Polyol Blends

Sample JM-69-1 was prepared by adding 45 parts of Polyol (i.e., JEFFOL PPG-2000 from Huntsman Corporation) into a glass reaction vessel. Then, 5 grams of digested castor protein (Lot 5-83) was added to the Polyol with stirring using a high-speed rotary mixer while heating, and held at a temperature of 95° C. for a total reaction time of one hour.

Sample JM-69-2 was prepared by adding 43 parts of Polyol (i.e., JEFFOL PPG-2000 from Huntsman Corporation) and 2 parts distilled water into a glass reaction vessel. The Polyol/water blend was stirred using a high-speed rotary mixer until it was homogenous and transparent. Then, 5 grams of digested castor protein (Lot 5-83) was added while the blend was stirred. The sample was stirred using a high-speed rotary mixer while heating, and held at a temperature of 95° C. for a total reaction time of one hour.

Both during and after the reaction, sample JM-69-1 was a homogeneous, brown translucent material. In contrast, sample JM-69-2 behaved much differently during the reaction. At the start of the reaction, the sample looked similar to JM-69-1. At a temperature of approximately 85° C. phase separation was observed and the castor protein agglomerated and precipitated leaving a clear, slightly yellow supernatant material. After sitting on the bench top for 24 hours and settling, sample JM-69-1 had a cloudy supernatant above the sediment and the JM-69-2 sample looked the same as it did immediately after the reaction.

The same supernatant trend was observed with samples, JM-69-3 and JM-69-4, which were prepared at room temperature (not heated and reacted as in JM-69-1 & JM-69-2). The only visual difference appeared to be that the digested castor protein in sample containing water did not agglomerate in the same way as the heated and reacted sample (JM-69-2).

In a subsequent series of experiments, digested soy protein (Lot 5-81) and digested whey protein (Lot 5-80) were prepared using the method described for sample JM-69-2. In these experiments, the protein did not agglomerate and precipitate during the reaction. However, after sitting on the bench top and cooling, the soy and whey proteins did settle to the bottom of the reaction vessel resulting in a layer of supernatant on top of the settled proteins.

B—Preparation of Polyurethane Foams

To confirm that the chemical species extracted from the protein composition was compatible with the blowing of foam, several foam samples were prepared from the supernatants of samples JM-69-2, JM-71-1, and JM-71-2. The supernatant was used because, without wishing to be bound by a particular theory, it is believed that the supernatant contains water-soluble polypeptide that has been extracted by the polyol (see Example 14). In addition, a control sample was prepared in the same way as samples JM-69-2, JM-71-1, and JM-71-2 except that no water-soluble protein was added to the polyol/water blend. The control polyol/water blend was heated using the same heating profile described above. The control blend was labeled sample JM-74-1.

Foam 75-3 was prepared by mixing the following components: 7.1 grams of control blend JM-74-1, 1.6 grams Jeffol A-630 from Huntsman Corporation, 0.06 grams JEFFCAT DMDLC from Huntsman Corporation, and 0.06 parts dibutyltin dilaurate from Air Products & Chemicals, Inc. in a 150 ml disposable beaker. The polyol blend was mixed thoroughly with a spatula and vortex mixer. Then, 9 grams of PMDI (RUBINATE-M from Huntsman Corporation) was added to the beaker and mixed thoroughly with a spatula by hand, and then allowed to rise freely in the beaker.

Foam JM-75-4 was prepared in the same way except that 7.1 grams of the supernatant from sample JM-69-2 was used instead of JM-74-1. Foam JM-75-5 used 7.1 grams of the supernatant from sample JM-71-1 instead of JM-74-1 and foam JM-75-6 used 7.1 grams of the supernatant from sample JM-71-2 instead of JM-74-1.

Another foam control sample (JM-75-2) was prepared having the following formulation: 7.1 grams of JEFFOL PPG-2000 from Huntsman Corporation, 1.6 grams JEFFOL A-630 from Huntsman Corporation, 0.06 grams JEFFCAT DMDLC from Huntsman Corporation, and 0.06 parts dibutyltin dilaurate from Air Products & Chemicals, Inc. and 0.39 grams of distilled water. The polyol blend was prepared in a 150 mL disposable beaker and thoroughly with a spatula and vortex mixer. Then 9 grams of PMDI (RUBINATE-M from Huntsman Corporation) was added to the beaker and mixed thoroughly by hand with a spatula, and then allowed to rise freely in the beaker. This control formulation used the same ratio of water to polyol as was used in the preparation of control polyol blend JM-74-1 except this sample was not "cooked."

Figure 15:
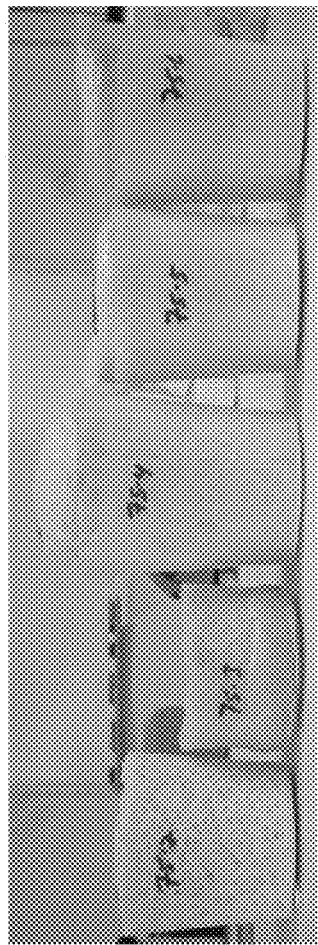
FIG. 15 shows polyurethane foams produced according to the procedures in Example 5.

Foams obtained using protein supernatant each had high rise and a tight cell structure. Pictures of the foams are provided in FIG. 15, and further observations from the experiment are provided in Table 4 below.

TABLE 4

| Sample | Description | Observations | Density (g/cm) |
|---|---|---|---|
| JM-75-2 | Control-1 | Course foam cell structure | 0.218 |
| JM-75-3 | Control-2 | Very little rise, very dense foam, tacky to the touch | 0.350 |
| JM-75-4 | Supernatant JM-69-2 | High rise, small, tight cell structure | 0.103 |
| JM-75-5 | Supernatant JM-71-1 | High rise, slight collapse, small, tight cell structure | 0.134 |
| JM-75-6 | Supernatant JM-71-2 | High rise, slight collapse, small, tight cell structure | 0.119 |

The data indicate that a water-soluble proteins harvested from the supernatant derived from digested castor enhances the rise of polyurethane foams and facilitates a very uniform, small cell structure in the foam. Without wishing to be bound by theory, it is believed that the protein acts as a surfactant that allows for efficient mixing of the reacting components and nucleation of the evolved carbon dioxide gas allowing for a high foam rise, uniform cell structure, and lower density foam (other than the polypeptide, none of the materials used to prepare the foam are believed to act as a surfactant).

Example 6

Preparation of Polyurethane Foams Containing Digested Protein

In this Example, a series of polyurethane foams were prepared by combining an isocyanate, a polyol blend, and dispersed agricultural proteins. The presence of the dispersed proteins resulted in polyurethane foams that rose to a higher height and had a smaller cellular structure and lower density.

The isocyanate used for the "A" component was RUBINATE-M, polymeric diphenylmethane diisocyanate (PMDI) from Huntsman Corporation. The composition of the polyol blend or "B" component contained 71.4 parts JEFFOL PPG-2000 from Huntsman Corporation, 15.6 parts of Jeffol A-630 from Huntsman Corporation, 3.0 parts distilled water, 0.6 JEFFCAT DMDLC from Huntsman Corporation, and 0.6 parts dibutyltin dilaurate from Air Products & Chemicals, Inc. The "B" component was denoted as sample JM-37-1. Digested soy protein isolate (Lot 5-81), Whey protein proteolyzed with Flavourzyme (Lot 5-80), and castor meal protein digested with Everlast (Lot No. 5-83) were obtained from Prof. Sergei Braun of The Hebrew University of Jerusalem.

A series of comparative cup foam samples were prepared by adding 9 grams the polyol blend described above (sample JM-37-1) into a 250 ml disposable beaker and then 1 gram of a specific protein from the list described above was added. The protein/polyol blends were mixed using a spatula and a vortex mixer to disperse the protein. The total sample weight for the polyol/protein "B" components was 10 grams. 10 grams of component "A" (PMDI) was added to the "B" component in the beaker and was mixed thoroughly by hand with a spatula, and then allowed to rise freely in the beaker. The protein containing foams were compared to a control foam consisting of 10 grams of the polyol blend described above (JM-37-1) reacted with 10 grams of PMDI. All of the components for the experiments were at ambient temperature (23° C.). All the foam reactions were conducted at ambient temperature.

Foam containing the dispersed soy, whey, and castor proteins rose higher than the control foam. The resulting densities of these foams are set forth in Table 5.

TABLE 5

| Sample | Description | Density (g/cm) |
|---|---|---|
| JM-67-1 | Polyol Blend JM-37-1 + Soy Protein | 0.042 |
| JM-67-3 | Polyol Blend JM-37-1 + Whey Protein | 0.034 |
| JM-67-5 | Polyol Blend JM-37-1 + Castor Protein | 0.035 |
| JM-67-7 | Polyol Blend JM-37-1 Control | 0.056 |

In addition to the density changes, there were differences in the cell structure of the resulting foams. The foams made with the soy and whey proteins (JM-67-1 and JM67-3 respectively) had smaller and tighter cells as compared to the foam made with castor protein (JM-67-5) and the control (JM-67-7) which both had larger, coarser cell structure.

Example 7

Foam Prepared Using Either Digested Castor Protein or Derivatized, Digested Castor Protein In this Example, polyurethane foam was prepared using digested castor protein and using derivatized, digested castor protein.

A series of comparative cup foam samples were prepared by adding 9 grams the polyol blend described in Example-6 (sample JM-37-1) into a 250 mL disposable beaker and then adding 1 gram of digested Castor protein (Lot 5-83) or derivatized, digested castor protein (Lot 5-82). The protein and polyol blend were mixed using a spatula and a vortex mixer to disperse the protein. The total sample weight for the polyol/protein "B" components was 10 grams. Then, 10 grams of component "A" (PMDI) was added to the "B" component in the beaker, and were mixed thoroughly by hand with a spatula, and then allowed to rise freely in the beaker. The protein containing foams were compared to two control foams: Control-1 consisting of 9 grams of the polyol blend described above (JM-37-1) reacted with 10 grams of PMDI and Control-2 consisting of 10 grams of the polyol blend described above (JM-37-1) reacted with 10 grams of PMDI. All of the components for the experiments were at ambient temperature (23° C.). The foam forming reactions were conducted at ambient temperature.

The foams containing the dispersed castor proteins rose higher than the control foam. The resulting densities of these foams can be seen in Table 6.

TABLE 6

| Sample | Description | Density (g/cm) |
|---|---|---|
| JM-59-2 | Polyol Blend JM-37-1 + Castor Protein | 0.057 |
| JM-59-3 | Polyol Blend JM-37-1 Control-1 | 0.089 |
| JM-59-4 | Polyol Blend JM-37-1 Control-2 | 0.113 |
| JM-59-5 | Polyol Blend JM-37-1 Derivatized, Digested Castor Protein | 0.056 |

Example 8

Comparison of Different Loadings of Digested Whey Protein on the Resulting Foam

In this Example, polyurethane foam was prepared using either 10% (wt/wt) or 20% (wt/wt) of digested whey protein.

Two comparative cup foam samples were prepared. A first sample, JM-43-1, was prepared by adding 9 grams the polyol blend described in Example-6 (sample JM-37-1) into a 250 mL disposable beaker and then adding 1 gram of Flavourzyme digested Whey protein (Lot No. 5-80) into the polyol blend. After the protein was added to the polyol blend, the composition was mixed using a spatula and a vortex mixer to disperse the protein. The total sample weight for the polyol/protein "B" components was 10 grams. Then, 10 grams of component "A" (PMDI) was added to the "B" component in the beaker and was mixed thoroughly by hand with a spatula, and then allowed to rise freely in the beaker.

A second sample, JM-43-2, was prepared by adding 8 grams the polyol blend described in Example-2 (sample JM-37-1) into a 250 mL disposable beaker and then adding 2 grams of Flavourzyme digested Whey protein (Lot No. 5-80) into the polyol blend. After the protein was added to the polyol blend, the composition was mixed using a spatula and a vortex mixer to disperse the protein. The total sample weight for the polyol/protein "B" components was 10 grams. 10 grams of component "A" (PMDI) was added to the "B" component in the beaker and was mixed thoroughly by hand with a spatula, and then allowed to rise freely in the beaker. All of the components for the experiments were at ambient temperature (23° C.). All the foam reactions were conducted at ambient temperature.

The polyol/protein blend for sample JM-43-2 was higher in viscosity compared to polyol/protein blend JM-43-1. However, the resulting foams rose to approximately the same height. The cell structure of each foam was similar. The relative bulk densities for the middle section of each sample are set forth in Table 7, where M1 denotes a one-inch thick cross-section cut below the center of the risen foam and M2 denotes the one inch thick cross-section cut above the center of the risen foam.

TABLE 7

| Sample | Description | Density (g/cm) |
| --- | --- | --- |
| JM-43-1 | Polyol Blend JM-37-1 + 10% Flavourzyme digested Whey Protein, cut M-1 | 0.042 |
| JM-43-1 | Polyol Blend JM-37-1 + 10% Flavourzyme digested Whey Protein, cut M-2 | 0.039 |
| JM-43-2 | Polyol Blend JM-37-1 + 20% Flavourzyme digested Whey Protein, cut M-1 | 0.040 |
| JM-43-2 | Polyol Blend JM-37-1 + 20% Flavourzyme digested Whey Protein, cut M-2 | 0.037 |

In the resulting foam, the bottom section of the cup foam was approximately 1 inch thick, M-1 was the first middle section of the foam above the bottom section was approximately 1 inch thick, and M-2 was the second middle section of the foam above M-1 and was approximately 1 inch thick. It is believed that the polyol blend extracts water-soluble proteins from the digested whey protein and contributes to the efficient foam rise and small cell structure. When these foams are compared to the control foams (JM-59-3 and JM-59-4) in Example 7, the density of all the foams in Table 7 were observed to have lower density than the control foams.

Example 9

Polyurethane Foam Made Using Flavourzyme Digested Whey Proteins of Differing pH

This Example describes the preparation and characterization of polyurethane foams using Flavourzyme digested whey proteins of different pH.

A series of cup foam samples were prepared comparing Flavourzyme digested Whey protein prepared in two ways. A first sample, JM-40-1, was prepared by adding 9 grams the polyol blend described in Example 6 (sample JM-37-1) into a 250 mL disposable beaker and then adding 1 gram of Flavourzyme digested Whey protein (Lot 5-72) into the polyol blend. After the protein was added to the polyol blend, the composition was mixed using a spatula and a vortex mixer to disperse the protein. The total sample weight for the polyol/protein "B" components was 10 grams. Then, 10 grams of component "A" (PMDI) was added to the "B" component in the beaker and was mixed thoroughly by hand with a spatula, and then allowed to rise freely in the beaker.

A second sample, JM-40-2, was prepared by adding 9 grams the polyol blend described in Example 6 (sample JM-37-1) into a 250 mL disposable beaker and then adding 1 gram of Flavourzyme digested Whey protein (Lot No. 5-80) into the polyol blend. After the protein was added to the polyol blend, the composition was mixed using a spatula and a vortex mixer to disperse the protein. The total sample weight for the polyol/protein "B" components was 10 grams. Then, 10 grams of component "A" (PMDI) was added to the "B" component in the beaker and was mixed thoroughly by hand with a spatula, and then allowed to rise freely in the beaker. All of the components for the experiments were at ambient temperature (23° C.). All the foam reactions were conducted at ambient temperature.

A third sample, JM-40-5, was prepared by adding 8 grams the polyol blend described in Example-6 (sample JM-37-1) into a 250 mL disposable beaker and then adding 2 grams of Flavourzyme digested Whey protein (Lot No. 5-80) into the polyol blend. After the protein was added to the polyol blend, the composition was mixed using a spatula and a vortex mixer to disperse the protein. The total sample weight for the polyol/protein "B" components was 10 grams. Then, 10 grams of component "A" (PMDI) was added to the "B" component in the beaker and was mixed thoroughly by hand with a spatula, and then allowed to rise freely in the beaker. All of the components for the experiments were at ambient temperature (23° C.). All the foam reactions were conducted at ambient temperature.

The protein containing foams were compared to two control foams: Control-1 (JM-40-3) containing 9 grams of the polyol blend described above (JM-37-1) reacted with 10 grams of PMDI and Control-2 (JM-40-4) containing 10 grams of the polyol blend described above (JM-37-1) reacted with 10 grams of PMDI. All of the components for the experiments were at ambient temperature (23° C.). All the foam reactions were conducted at ambient temperature.

Figure 16:
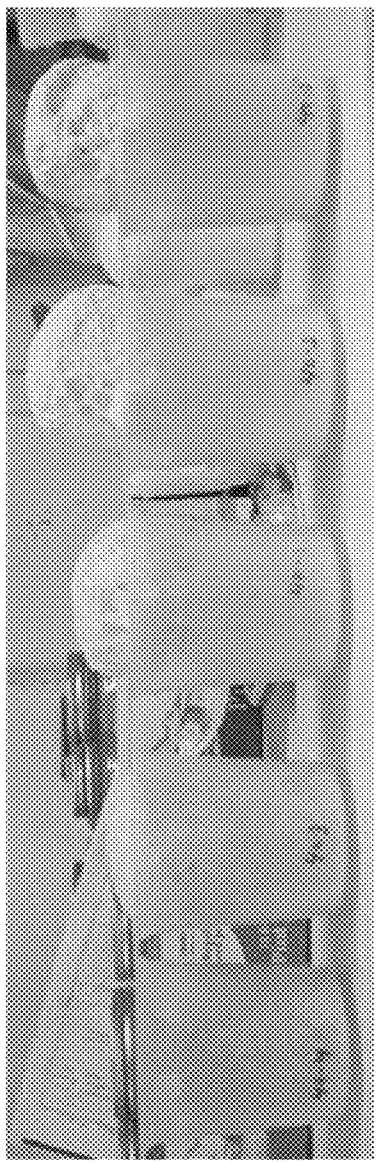
FIG. 16 shows polyurethane foams produced according to the procedures in Example 9.

Images of the foams produced from the above procedures are shown in FIG. 16. Foam prepared with Flavourzyme digested Whey protein Lot No. 5-80, (samples JM-40-2 and JM-40-5) which has a pH of approximately 3.5, rose higher than foam sample JM-40-1 prepared with Flavourzyme digested Whey protein Lot No. 5-72 having a pH of approximately 6.0. In addition, foam prepared with Flavourzyme digested Whey protein Lot No. 5-80, (samples JM-40-2 and JM-40-5) which has a pH of approximately 3.5, rose higher than the control foam samples (i.e., JM-40-3 and JM-40-4). Density of each of the foam samples is set forth in Table 8.

TABLE 8

| Sample | Description | Density (g/cm) |
| --- | --- | --- |
| JM-40-1 | Polyol Blend JM-37-1 + 10% Flavourzyme digested Whey Protein, Lot No. 5-72, pH ~6.0 | 0.056 |
| JM-40-2 | Polyol Blend JM-37-1 + 10% Flavourzyme digested Whey Protein, Lot No. 5-80, pH ~3.5 | 0.049 |
| JM-40-5 | Polyol Blend JM-37-1 + 20% Flavourzyme digested Whey Protein, Lot No. 5-80, pH ~6.0 | 0.047 |
| JM-40-3 | Polyol Blend JM-37-1 Control-1 | 0.060 |
| JM-40-4 | Polyol Blend JM-37-1 Control-2 | 0.072 |

Example 10

Foam Prepared Using a Water Soluble Polypeptide Composition Obtained from Digested Castor Protein This Example describes the preparation of polyurethane foam prepared using a water soluble polypeptide composition obtained from digested castor protein.

A—Preparation of Polypeptide Composition

Digested castor protein (Lot No. 5-108) was obtained as an experimental sample ("digested castor") from Prof. S. Braun, the Laboratory of Applied Biology at the Hebrew University of Jerusalem, Israel. The digested castor was prepared as follows: Castor meal protein was suspended in water at the ratio of 1:10 w/w. Calcium chloride was added to the effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at the ratio of 10 g per kg of castor meal protein, and the mixture was stirred at the same temperature for 4 hours. The resulting mixture then was lowered to pH 3.5 with citric acid and was spray-dried to yield a tan powder.

The digested castor was fractionated to yield a water-soluble polypeptide fraction, and a water-insoluble/water dispersible polypeptide fraction. In the first step, 100 g of digested castor was slurried into 0.5 liters of distilled water. The mixture was mixed for a period of 30 minutes with a mechanical stirrer. Aliquots of the slurry then were centrifuged at 3,400 rpm for a period of approximately 15 minutes. The resulting supernatant, which contained the water-soluble polypeptide fraction, was decanted off and used for the foam experiments in this Example. The remaining water-insoluble sediment was washed with neutral water and again centrifuged. This step was repeated 5 times for the water insoluble sediment. The water-insoluble sediment was harvested.

The percent solids were measured for the washed, water-insoluble/water dispersible fraction following drying the sample in an oven. The percent solids were found to be 16.36%. The water soluble fraction, which was also isolated from the first centrifuge cycle (as described above), was dried in an oven. The dried, water-soluble residue was collected and used to make a 16.36% solids solution for comparison to the water-insoluble, dispersible fraction. A third 16.36% solids sample was prepared by mixing 3.272 grams of digested castor, lot 5-108 with 16.728 grams of water to yield a 16.36% solids mixture, which inherently contains both the water soluble and water-insoluble, dispersible fractions.

B—Preparation of Polyurethane Foams

A series of polyurethane foams then were prepared by combining an isocyanate, a polyol blend, and the various digested castor polypeptide fractions. The polyol blend used in these experiments was similar to that described in Example 6 except that the water used contained the isolated fractions of the digested castor protein. Control samples were prepared at an appropriate water concentration so as to provide the same water content in all the polyol blends. The various formulations are shown in Table 9.

TABLE 9

| Sample | Polyol Blend Water Fraction |
|---|---|
| JM-582-1 | Distilled Water |
| JM-582-2 | 16.36% solution of the soluble fraction of digested castor (lot 5-108) |
| JM-582-3 | 16.36% mixture of digested castor (lot 5-108) (contains both water-soluble and water-insoluble fractions) |
| JM-582-4 | 16.36% Water-insoluble/water dispersible fraction of digested castor (lot 5-108) |

The isocyanate used for the "A" component was RUBINATE-M, polymeric diphenylmethane diisocyanate (PMDI) from Huntsman Corporation. The composition of the polyol blend or "B" component contained 71.4 parts JEFFOL PPG-2000 from Huntsman Corporation, 15.6 parts of Jeffol A-630 from Huntsman Corporation, 0.6 JEFFCAT DMDLC from Huntsman Corporation, and 0.6 parts dibutyltin dilaurate from Air Products & Chemicals, Inc, and 2.51 parts distilled water for the control or 3.0 parts of a 16.36% solids containing fraction.

The isocyanate ("A" Component) and polyol blends ("B" Component) were mixed at two ratios, 9 parts "B" to 10 parts "A" and 10 parts "B" to 10 parts "A," which would represent two different isocyanate indexes. The mixtures produced foams having different features. Images of the foams are shown in FIG. 17, where FIG. 17A represents the samples containing 9 parts "B":10 parts "A" denoted 9/10 Polyl/PMDI, and FIG. 17B represents the samples containing 10 parts "B":10 parts "A" denoted 10/10 Polyl/PMDI. At both of the polyol/isocyanate ratios, the presence water soluble polypeptide resulted in polyurethane foams that rose significantly and had a smaller cellular structure as compared to the controls. The sample containing the water insoluble dispersible fraction (JM-582-4) did not rise as high as the samples containing the water soluble polypeptide fractions. Without wishing to be bound by theory, it is possible that the increase in height of the foam for the water insoluble polypeptide fraction could be attributable to a small amount of water-soluble protein in the water insoluble protein composition.

Example 11

Foam Prepared from Water Soluble Polypeptide Compositions Derived from Castor Meal or Canola Meal In this Example, polyurethane foam was prepared using a water-soluble polypeptide composition obtained from castor meal or canola meal.

A—Preparation of Polypeptide Composition

Two samples were prepared under identical conditions, one using whole canola meal and the other made with whole castor meal. The canola preparation was prepared as follows: Whole canola meal (Canola Meal MA Viterra 00200, reported to contain approximately 37% protein by weight, obtained from Viterra Canola Processing, Step Agatha, MB) was dispersed in a 1.0% sodium hydroxide solution, and was then mixed with a 1 M HCl solution to a final pH value of approximately 4 to 5. Similarly, whole castor meal (from Kopco Oil Products, Rajkot, India) was dispersed in a 1.0% sodium hydroxide solution, and was then mixed with a 1 M HCl solution to a final pH value of approximately 4 to 5.

The castor and canola samples were allowed to sit on the bench top. The water-insoluble/water dispersible polypeptide-containing component settled while the water soluble polypeptide component was observed as a supernatant. The solids content of the supernatant was determined by drying samples in an oven. The castor meal supernatant had a solids content of 2.85 percent and the canola meal supernatant had a solids content of 3.25 percent. For the foam experiments, the canola supernatant was diluted with distilled water to achieve a solids content of 2.85%, to be equivalent to that of the castor sample.

B—Preparation of Polyurethane Foam

A series of polyurethane foams were prepared by combining an isocyanate, a polyol blend, and the various supernatant fractions. The polyol blend used in these experiments was similar to that described in Example 10. The control samples were prepared at an appropriate water concentration so as to provide the same water content in all the polyol blends. The comparative formulations are set forth in Table 10.

TABLE 10

| Sample | Polyol Blend Water Fraction |
|---|---|
| JM-587-1 | Distilled Water |
| JM-587-2 | 2.85% solution of the soluble fraction of castor meal |
| JM-587-3 | 2.85% solution of the soluble fraction of canola meal |

The isocyanate used for the "A" component was RUBINATE-M, polymeric diphenylmethane diisocyanate (PMDI)] from Huntsman Corporation. The composition of the polyol blend or "B" component contained 71.4 parts JEFFOL PPG-2000 from Huntsman Corporation, 15.6 parts of Jeffol A-630 from Huntsman Corporation, 0.6 JEFFCAT DMDLC from Huntsman Corporation, and 0.6 parts dibutyltin dilaurate from Air Products & Chemicals, Inc, and 2.91 parts distilled water or 3.0 parts of a 2.85% solids containing soluble fraction.

The isocyanate ("A" Component) and polyol blends ("B" Component) were mixed at a ratio of 7 parts "B" to 10 parts "A."

Figure 18:
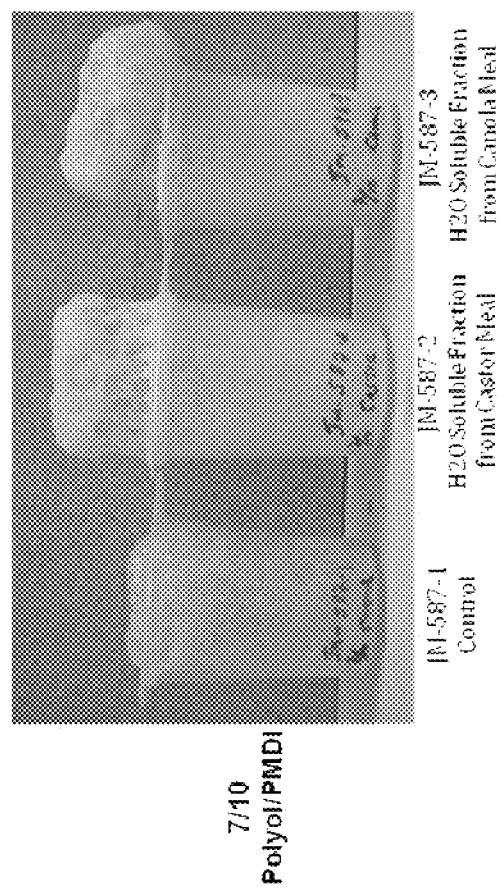
FIG. 18 shows polyurethane foams produced according to the procedures in Example 11.
Figure 19:
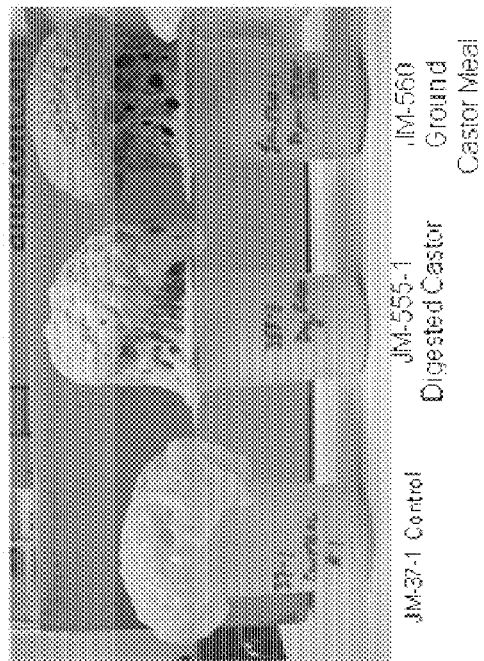
FIG. 19 shows polyurethane foams produced according to the procedures in Example 13.

Images of the foam produced by the above procedures are shown in FIG. 18. The presence of the water soluble polypeptide fractions resulted in polyurethane foams that rose to a higher height and had a smaller cellular structure as compared to the controls that lacked the water-soluble protein fractions.

Example 12

Foam Prepared Using Water-Soluble Polypeptide Compositions Derived from Digested Castor Meal In this Example, polyurethane foam was prepared using a water soluble polypeptide composition obtained from digested castor meal.

Digested castor (Lot 5-108) was fractionated to yield a water-soluble fraction, and a water-insoluble/water dispersible fraction using the isolation procedures as reported in Example 10. The supernatant, which contained the water-soluble polypeptide fraction, was harvested by decanting for the foam experiments and the remaining water-insoluble sediment, and was harvested into a separate container. In Example 10 the supernatant fractions were collected and dried in order to make a 16.36% solution of the water soluble polypeptide fraction. In contrast, in this Example, the supernatant from the first centrifuge cycle was collected and used as is, without drying. The solids content of the digested castor supernatant was determined by drying an aliquot in an oven. The digested castor supernatant from the first centrifugation step as found to have a solids content of 8.93%.

A series of polyurethane foams were prepared by combining an isocyanate, a polyol blend, and the supernatant fraction. The polyol blend used in these experiments was similar to that described in Example 10. A control sample was prepared at an appropriate water concentration so as to provide the same water content in both polyol blends. The various formulations can be seen in Table 11.

TABLE 11

| Sample | Polyol Blend Water Fraction |
|---|---|
| JM-561-1 | Distilled Water |
| JM-559-1-2 | 8.93% solution of the soluble fraction of digested castor (Lot No. 5-108) |

The isocyanate ("A" Component) and polyol blends ("B" Component) were mixed at two ratios, 9 parts "B" to 10 parts "A" and 8 parts "B" to 10 parts "A," which would represent two different isocyanate indexes.

The presence of the water soluble polypeptide fractions resulted in polyurethane foams that rose to a higher height and had a smaller cellular structure as compared to the controls. Both mixtures: 9 parts "B" to 10 parts "A" and 8 parts "B" to 10 parts "A" behaved similarly.

Example 13

Foam Prepared Using Whole, Ground Castor Meal or Digested Castor Meal

In this Example, polyurethane foam was prepared using whole, ground castor meal or digested castor meal.

Digested castor (Lot 5-108) was prepared as described in Example 10. In this Example, the whole, ground meal and the digested castor sample were dry solid powders containing both a water soluble polypeptide composition and a water insoluble/water dispersible polypeptide composition.

Polyurethane foams were prepared by combining an isocyanate, a polyol blend, and adding the dry castor particles to the polyol blend. The polyol blend used in these experiments was similar to that described in Example 6.

Specifically, two comparative cup foam samples were prepared. A first sample, JM-560-1, was prepared by adding 9 grams the polyol blend described in Example-6 (sample JM-37-1) into a 250 mL disposable beaker and then adding 1 gram of the 80 micron ground whole castor meal into the polyol blend. After the protein was added to the polyol blend, the composition was mixed using a spatula and a vortex mixer to disperse the protein. The total sample weight for the polyol/protein "B" components was 10 grams. Then, 10 grams of component "A" (PMDI) was added to the "B" component in the beaker and was mixed thoroughly by hand with a spatula, and then allowed to rise freely in the beaker.

A second sample, JM-555-3, was prepared by adding 9 grams the polyol blend described in Example 6 (sample JM-37-1) into a 250 mL disposable beaker and then adding 2 grams digested castor (Lot No. 5-108) into the polyol blend. After the protein was added to the polyol blend, the composition was mixed using a spatula and a vortex mixer to disperse the protein. The total sample weight for the polyol/protein "B" components was 10 grams. Then, 10 grams of component "A" (PMDI) was added to the "B" component in the beaker and was mixed thoroughly by hand with a spatula, and then allowed to rise freely in the beaker.

The two samples were compared to a control foam (JM-37-1) which did not contain the added dry protein containing powders.

The presence of the protein containing powders resulted in polyurethane foams that rose to a higher height and had a smaller cellular structure as compared to the controls.

Example 14

Characterization of Mixture Formed by Addition of Protein Composition to a Polyol Composition Polyol compound PPG 200 and a protein composition (e.g., digested castor, digested soy, and digested whey) were mixed together in the presence and absence of water for the purposes of investigating whether or not certain chemical reactions might occur between these components. In particular, because FTIR analyses indicated the presence of free carboxylic acid functionality in the digested proteins, studies were conducted to try and identify the existence of esterification reactions between the hydroxyl end groups of the polyol and the free acid moieties of the digested proteins. This was conducted in the absence of the isocyanate component so that the potential reaction could be isolated. The procedures used for mixing the polyol and protein composition are reported in Example 5, along with physical observations of the polyol/protein mixture.

Upon completing the mixing procedure, the sample jars were allowed to set under ambient conditions for several days. Once the precipitated components from the various mixtures had settled to the bottom of the containers, aliquots of the supernatants were retrieved together with certain samples of the precipitated products. The resulting aliquots were analyzed via solution state FTIR, and subtraction spectra were created for the purposes of testing for the presence or absence of extracted and/or reacted components The subtraction spectra were created by subtracting the spectrum of neat PPG2000 from the supernatant spectra (multiplicative factors=1). The resulting subtraction spectra were then overlaid and compared to the starting ingredients (PPG2000 and digested proteins) for the purpose of testing for the possibility of a chemically transformed reaction product.

A subtraction spectrum of the supernatant from the mixture that was made with digested castor in polyol with water revealed the presence of a compound in the supernatant. By comparing the subtraction spectrum to the spectrum for neat digested castor, it was found that the supernatant compound possessed predominant absorption bands at approximately 3540 cm−1 and 3423 $cm^{-1}$. The 3423 $cm^{-1}$ group appeared only as a shoulder in the starting digested castor compound (the predominant N—H stretch in the digested castor appeared at approximately 3270 $cm^{-1}$). In addition, the predominant N—H band in the neat digested castor was absent in the supernatant compound. Moreover, although the supernatant-compound contained the dominant digested castor band centered near 1638 $cm^{-1}$, there was no evidence of the carbonyl at 1717 $cm^{-1}$ (the absorbance at 1717 $cm^{-1}$ in the digested castor is consistent with the presence of a free carboxylic acid). Instead, the supernatant compound showed the presence of a significantly different carbonyl stretch at 1739 $cm^{-1}$, which is consistent with the presence of an ester.

Importantly, the ratio of the absorbance intensity for the peak near 1639 $cm^{-1}$ to that of the ester peak near 1739 $cm^{-1}$ was determined to be approximately 2/1, which was nearly the same for the comparable ratio of the 1639 $cm^{-1}$ peak in digested castor to that of the carbonyl peak near 1717 $cm^{-1}$. In addition, the 1531 $cm^{-1}$ peak that appears in the digested castor spectrum was missing from the supernatant compound. The supernatant exhibits the presence of water as evidenced by the broad peak near 3550 $cm^{-1}$, and by the assembly of peaks between 2300 $cm^{-1}$ and 1900 $cm^{-1}$.

An overlay of the supernatant compound spectrum with that of PPG 2000 polyol shows that the polyol hydroxyl peak centered near 3474 $cm^{-1}$ is distinctly absent in the supernatant compound. Collectively, these spectral comparisons show that the supernatant compound is either a solubilized fractional component of the starting digested castor protein itself, or a solubilized reaction product between a digested castor component and the polyol compound.

In order to determine the potential effect of water on these findings, the supernatant of the analogous mixture with digested castor and PPG2000 was made in the absence of water. No compound was detected in the supernatant. The material that precipitated out of the JM-69-2 sample (See Example 5) was separately collected and analyzed via FTIR, and its spectrum was overlaid with that of the starting digested castor material, and that of the PPG 2000 polyol. Analysis of the spectra revealed that the precipitate was quite similar in composition to the starting digested castor protein. The precipitate was not washed, and it contained a spectral component at 1092 $cm^{-1}$ is consistent with the presence of a polyol impurity.

In analogous experiments with digested whey and digested soy proteins, the supernatants were similarly collected and analyzed via FTIR. The resulting subtraction spectra, when overlayed with that of the supernatant compound that was made with digested castor, show that the supernatant compounds appear to have strikingly similar structural attributes. These similarities are further exemplified by overlays of the hydroxyl region, and the carbonyl region.

As discussed in Example 5, the bulk addition of digested proteins to polyurethane foam formulations (approximately 5% by weight of the foam) led to a surprising decrease in foam density. In light of this observation, and in light of the striking similarities between the supernatant compounds as seen by FTIR, studies were conducted to produce foamed polyurethane formulations by using the supernatants compounds in place of the bulk proteins themselves. The foams that were made with the supernatant compounds were all surprisingly low in density. Thus, although bulk-addition of the preferred digested proteins can lead to favorable results, similar results can be surprisingly achieved by virtue of the low-concentration addition of a compound with structural attributes like those found in the supernatants from the present example. Thus, the trend observed by means of the bulk-addition of digested proteins was reproduced by means of simply adding the solvated supernatant compounds in the absence of the water-insoluble protein fractions (i.e., the water-soluble fractions as extracted from the digested protein using a mixture of polyol and water) produced the desired effect of density reduction in the absence of the water-insoluble fraction that precipitated from the polyol/water blend.

Incorporation by Reference

The entire disclosure of each of the patent documents and scientific articles referred to herein is incorporated by reference for all purposes.

Equivalents

The invention may be embodied in other specific forms without departing from the spirit or essential characteristics thereof. The foregoing embodiments are therefore to be considered in all respects illustrative rather than limiting the invention described herein. Scope of the invention is thus indicated by the appended claims rather than by the foregoing description, and all changes that come within the meaning and range of equivalency of the claims are intended to be embraced therein.

What we claim is:
1. A polyurethane foam comprising a reaction product of a mixture comprising:
  (a) an isocyanate-based reactant;
  (b) an optional isocyanate-reactive compound; and
  (c) an isolated, water-soluble polypeptide composition that is capable of stabilizing a polyurethane-based foam, wherein the composition comprises one or more of the following features:
    (a) an amide-I absorption band between about 1633 $cm^{-1}$ and 1680 $cm^{-1}$, as determined by solid state FTIR;

(b) an amide-II band between approximately 1522 cm$^{-1}$ and 1560 cm$^{-1}$, as determined by solid state FTIR;
(c) two prominent 1° amide N—H stretch absorption bands centered at about 3200 cm$^{-1}$, and at about 3300 cm$^{-1}$, as determined by solid state FTIR;
(d) a prominent cluster of protonated nitrogen nuclei defined by $^{15}$N chemical shift boundaries at about 94 ppm and at about 100 ppm, and $^{1}$H chemical shift boundaries at about 7.6 ppm and at about 8.1 ppm, as determined by solution state, two-dimensional proton-nitrogen coupled NMR;
(e) an average molecular weight of between about 600 and about 2,500Daltons;
(f) an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing;
(g) the water-soluble polypeptide composition is capable of stabilizing a polyurethane-based foam relative to a polyurethane-based foam created from the same starting composition lacking the water soluble protein composition; or
(h) the water-soluble polypeptide composition is capable of reducing the density of a polyurethane-based foam by at least 5% relative to a polyurethane-based foam created from the same starting composition lacking the water-soluble polypeptide composition;
wherein the foam is substantially free of water-insoluble/water dispersible polypeptides.

2. The polyurethane foam of claim 1, wherein the isocyanate-based reactant is an organic polyisocyanate.

3. The polyurethane foam of claim 2, wherein the organic polyisocyanate is polymeric diphenylmethane diisocyanate, 2,4-tolylene diisocyanate, 2,6-tolylene diisocyanate, benzene diisocyanate, m-xylylene diisocyanate, 1,4-phenylene diisocyanate, 1,3-phenylene diisocyanate, 4,4'-diphenyl diisocyanate, 4,4'-diphenyldimethylmethane diisocyanate, hexamethylene diisocyanate, tolidine diisocyanate, dianisidine diisocyanate, 1,5-naphthalene diisocyanate, 1,4-cyclohexane diisocyanate, or a combination thereof.

4. The polyurethane foam of claim 1, wherein the isocyanate-based reactant comprises a urethane, allophanate, urea, biuret, carbodiimide, uretonimine, isocyanurate, or a combination thereof.

5. The polyurethane foam of claim 1, wherein the isocyanate-based reactant is polymeric diphenylmethane diisocyanate.

6. The polyurethane foam of claim 1, wherein the isocyanate-reactive compound is present and is nucleophilically reactive with an isocyanate.

7. The polyurethane foam of claim 6, wherein the isocyanate-reactive compound is a compound having a hydroxyl group or an amino group capable of reacting with the isocyanate.

8. The polyurethane foam of claim 1, wherein the isocyanate-reactive compound is present and is a polyol.

9. The polyurethane foam of claim 1, wherein the isocyanate-reactive compound is present and is a polyol derived from castor oil, linseed oil, or soy oil.

10. The polyurethane foam of claim 1, wherein the isocyanate-reactive compound is present and is a polyol initiated with a compound selected from the group consisting of glycerol, trimethylopropane, triethanolamine, pentaerythritol, sorbitol sucrose, diamine, tolylene diamine, diaminodiphenylmethane, a polymethylene polyphenylene polyamine, ethanolamine, diethanolamine, or a mixture thereof.

11. The polyurethane foam of claim 1, wherein the isocyanate-reactive compound is present and is a hydroxyl terminated polythioether, polyamide, polyesteramide, polycarbonate, polyacetal, polyolefin or polysiloxane, or is a polyester obtained by condensation of a glycol or higher functionality polyol with a dicarboxylic acid.

12. The polyurethane foam of claim 1, wherein the isocyanate-reactive compound is present and is polyoxypropylene glycol, polypropylene oxide-ethylene oxide, propylene glycol, propane diol, glycerin, an amine alkoxylate, or a mixture thereof.

13. The polyurethane foam of claim 1, wherein the isocyanate-reactive compound is present and is polyoxypropylene glycol.

14. The polyurethane foam of claim 1, wherein the mixture further comprises a surfactant.

15. The polyurethane foam of claim 1, wherein the foam has a density in the range of from about 0.01 g/cm$^3$ to about 0.5 g/cm$^3$ as determined by ASTM D-7487.

16. The polyurethane foam of claim 1, wherein the foam has a density that is from 5% to 80% less dense than a foam created from the same starting composition lacking the water-soluble polypeptide composition.

17. The polyurethane foam of claim 1, wherein the foam cream time, as defined by ASTM D-7487, is less than one minute.

18. The polyurethane foam of claim 1, wherein the foam free rise height, as determined by ASTM D7487, is greater than the foam free rise height of a foam created from the same starting composition lacking the water-soluble polypeptide composition.

19. The polyurethane foam of claim 18, wherein the foam free rise height is at least 5% greater than the foam free rise height of a foam created from the same starting composition lacking the water-soluble polypeptide composition.

20. The polyurethane foam of claim 1, wherein the foam has a larger number of small, uniform cells when compared to a foam created from the same starting composition lacking the water-soluble polypeptide composition.

21. A method of producing a polyurethane foam, comprising the steps of:
(a) mixing a protein containing composition and an isocyanate-based reactant to produce a mixture; and
(b) permitting the mixture to produce a polyurethane foam, wherein the protein containing composition is an isolated, water-soluble polypeptide composition that is capable of stabilizing a polyurethane-based foam, wherein the isolated, water-soluble polypeptide composition comprises one or more of the following features:
(a) an amide-I absorption band between about 1633 cm$^{-1}$ and 1680 cm$^{-1}$, as determined by solid state FTIR;
(b) an amide-II band between approximately 1522 cm$^{-1}$ and 1560 cm$^{-1}$, as determined by solid state FTIR;
(c) two prominent 1° amide N—H stretch absorption bands centered at about 3200 cm$^{-1}$, and at about 3300 cm$^{-1}$, as determined by solid state FTIR;
(d) a prominent cluster of protonated nitrogen nuclei defined by $^{15}$N chemical shift boundaries at about 94 ppm and at about 100 ppm, and $^{1}$H chemical shift boundaries at about 7.6 ppm and at about 8.1 ppm, as determined by solution state, two-dimensional proton-nitrogen coupled NMR;

(e) an average molecular weight of between about 600 and about 2,500 Daltons;
(f) in an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing;
(g) the water-soluble polypeptide composition is capable of stabilizing a polyurethane-based foam relative to a polyurethane-based foam created from the same starting composition lacking the water soluble protein composition; or
(h) the water-soluble polypeptide composition is capable of reducing the density of a polyurethane-based foam by at least 5% relative to a polyurethane-based foam created from the same starting composition lacking the water-soluble polypeptide composition;

wherein the foam is substantially free of water-insoluble/water dispersible polypeptides.

22. The method of claim 21, wherein the protein containing composition is an isolated, water-soluble polypeptide composition that is capable of stabilizing a polyurethane-based foam, wherein the composition comprises the following features:
(a) an amide-I absorption band between about 1633 $cm^{-1}$ and 1680 $cm^{-1}$, as determined by solid state FTIR;
(b) an amide-II band between approximately 1522 $cm^{-1}$ and 1560 $cm^{-1}$, as determined by solid state FTIR;
(c) two prominent 1° amide N—H stretch absorption bands centered at about 3200$cm^{-1}$, and at about 3300 $cm^{-1}$, as determined by solid state FTIR;
(d) a prominent cluster of protonated nitrogen nuclei defined by $^{15}N$ chemical shift boundaries at about 94 ppm and at about 100 ppm, and $^{1}H$ chemical shift boundaries at about 7.6 ppm and at about 8.1 ppm, as determined by solution state, two-dimensional proton-nitrogen coupled NMR;
(e) an average molecular weight of between about 600 and about 2,500 Daltons;
(f) an inability to stabilize an oil-in-water emulsion, wherein, when an aqueous solution comprising 14 parts by weight of protein dissolved or dispersed in 86parts by weight of water is admixed with 14 parts by weight of PMDI, the aqueous solution and the PMDI produce an unstable suspension that macroscopically phase separates under static conditions within five minutes after mixing;
(g) the water-soluble polypeptide composition is capable of stabilizing a polyurethane-based foam relative to a polyurethane-based foam created from the same starting composition lacking the water soluble protein composition; and
(h) the water-soluble polypeptide composition is capable of reducing the density of a polyurethane-based foam by at least 5% relative to a polyurethane-based foam created from the same starting composition lacking the water-soluble polypeptide composition.

23. The method of claim 21, wherein the mixture in step (a) further comprises an isocyanate-reactive compound.

24. The method of claim 21, wherein the isocyanate-based reactant is an organic polyisocyanate.

25. The method of claim 24, wherein the organic polyisocyanate is polymeric diphenylmethane diisocyanate, 2,4-tolylene diisocyanate, 2,6-tolylene diisocyanate, benzene diisocyanate, m-xylylene diisocyanate, 1,4-phenylene diisocyanate, 1,3-phenylene diisocyanate, 4,4'-diphenyl diisocyanate, 4,4'-diphenyldimethylmethane diisocyanate, hexamethylene diisocyanate, tolidine diisocyanate, dianisidine diisocyanate, 1,5-naphthalene diisocyanate, 1,4-cyclohexane diisocyanate, or a combination thereof.

26. The method of claim 21, wherein the isocyanate-based reactant comprises a urethane, allophanate, urea, biuret, carbodiimide, uretonimine, isocyanurate, or a combination thereof.

27. The method of claim 21, wherein the isocyanate-based reactant is polymeric diphenylmethane diisocyanate.

28. The method of claim 23, wherein the isocyanate-reactive compound is nucleophilically reactive with an isocyanate.

29. The method of claim 28, wherein the isocyanate-reactive compound is a compound having a hydroxyl group or an amino group capable of reacting with the isocyanate.

30. The method of claim 23, wherein the isocyanate-reactive compound is a polyol.

31. The method of claim 23, wherein the isocyanate-reactive compound is a polyol derived from castor oil, linseed oil, or soy oil.

32. The method of claim 23, wherein the isocyanate-reactive compound is a polyol initiated with a compound selected from the group consisting of glycerol, trimethylopropane, triethanolamine, pentaerythritol, sorbitol sucrose, diamine, tolylene diamine, diaminodiphenylmethane, a polymethylene polyphenylene polyamine, ethanolamine, diethanolamine, or a mixture thereof.

33. The method of claim 23, wherein the isocyanate-reactive compound is a polyester obtained by condensation of a glycol or higher functionality polyol with a dicarboxylic acid; or a hydroxyl terminated polythioether, polyamide, polyesteramide, polycarbonate, polyacetal, polyolefin or polysiloxane.

34. The method of claim 23, wherein the isocyanate-reactive compound is polyoxypropylene glycol, polypropylene oxide-ethylene oxide, propylene glycol, propane diol, glycerin, an amine alkoxylate, or a mixture thereof.

35. The method of claim 23, wherein the isocyanate-reactive compound is polyoxypropylene glycol.

36. The method of claim 21, wherein the mixture in step (a) further comprises a blowing agent or a compound that forms a blowing agent.

37. The method of claim 36, wherein the compound that forms the blowing agent is water.

38. The method of claim 21, wherein the mixture in step (a) further comprises a catalyst that facilitates generation of the foam.

39. The method of claim 38, wherein the catalyst is dibutyltin dilaurate, dibutyltin diacetate, triethylenediamine, 2,2'-dimethylamino diethyl ether, 2-dimethylamino ethanol, stannous octoate, potassium octoate, an alkali metal salt of a carboxylic acid, or a combination thereof.

40. A premix for preparing a polyurethane foam, comprising:
(a) a protein containing composition; and
(b) an isocyanate-based reactant, wherein the protein containing composition is an isolated, water-soluble polypeptide composition that is capable of stabilizing a polyurethane-based foam, wherein the isolated, water-soluble polypeptide composition comprises one or more of the following features:

(a) an amide-I absorption band between about 1633 cm$^{-1}$ and 1680 cm$^{-1}$, as determined by solid state FTIR;
(b) an amide-II band between approximately 1522 cm$^{-1}$ and 1560 cm$^{-1}$, as determined by solid state FTIR;
(c) two prominent 1° amide N—H stretch absorption bands centered at about 3200 cm$^{-1}$, and at about 3300 cm$^{-1}$, as determined by solid state FTIR;
(d) a prominent cluster of protonated nitrogen nuclei defined by $^{15}$N chemical shift boundaries at about 94 ppm and at about 100 ppm, and $^{1}$H chemical shift boundaries at about 7.6 ppm and at about 8.1 ppm, as determined by solution state, two-dimensional proton-nitrogen coupled NMR;
(e) an average molecular weight of between about 600 and about 2,500Daltons;
(f) an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing;
(g) the water-soluble polypeptide composition is capable of stabilizing a polyurethane-based foam relative to a polyurethane-based foam created from the same starting composition lacking the water soluble protein composition; or
(h) the water-soluble polypeptide composition is capable of reducing the density of a polyurethane-based foam by at least 5% relative to a polyurethane-based foam created from the same starting composition lacking the water-soluble polypeptide composition;
wherein the premix is substantially free of water-insoluble/water dispersible polypeptides.

41. The premix of claim 40, wherein the protein containing composition is an isolated, water-soluble polypeptide composition that is capable of stabilizing a polyurethane-based foam, wherein the isolated, water-soluble polypeptide composition comprises the following features:
(a) an amide-I absorption band between about 1633 cm$^{-1}$ and 1680 cm$^{-1}$, as determined by solid state FTIR;
(b) an amide-II band between approximately 1522 cm$^{-1}$ and 1560 cm$^{-1}$, as determined by solid state FTIR;
(c) two prominent 1° amide N—H stretch absorption bands centered at about 3200cm$^{-1}$, and at about 3300 cm$^{-1}$, as determined by solid state FTIR;
(d) a prominent cluster of protonated nitrogen nuclei defined by $^{15}$N chemical shift boundaries at about 94 ppm and at about 100 ppm, and $^{1}$H chemical shift boundaries at about 7.6 ppm and at about 8.1 ppm, as determined by solution state, two-dimensional proton-nitrogen coupled NMR;
(e) an average molecular weight of between about 600 and about 2,500 Daltons;
(f) an inability to stabilize an oil-in-water emulsion, wherein, when an aqueous solution comprising 14 parts by weight of protein dissolved or dispersed in 86parts by weight of water is admixed with 14 parts by weight of PMDI, the aqueous solution and the PMDI produce an unstable suspension that macroscopically phase separates under static conditions within five minutes after mixing;
(g) the water-soluble polypeptide composition is capable of stabilizing a polyurethane-based foam relative to a polyurethane-based foam created from the same starting composition lacking the water soluble protein composition; and
(h) the water-soluble polypeptide composition is capable of reducing the density of a polyurethane-based foam by at least 5% relative to a polyurethane-based foam created from the same starting composition lacking the water-soluble polypeptide composition.

42. The premix of claim 40, wherein the isocyanate-based reactant is an organic polyisocyanate.

43. An article comprising the foam of claim 1.

44. The polyurethane foam of claim 1, wherein the isolated, water-soluble polypeptide composition has at least the following features:
(a) an amide-I absorption band between about 1633 cm$^{-1}$ and 1680 cm$^{-1}$, as determined by solid state FTIR;
(b) an amide-II band between approximately 1522 cm$^{-1}$ and 1560 cm$^{-1}$, as determined by solid state FTIR;
(c) two prominent 1° amide N—H stretch absorption bands centered at about 3200 cm$^{-1}$, and at about 3300 cm$^{1}$, as determined by solid state FTIR;
(d) a prominent cluster of protonated nitrogen nuclei defined by $^{15}$N chemical shift boundaries at about 94 ppm and at about 100 ppm, and $^{1}$H chemical shift boundaries at about 7.6 ppm and at about 8.1 ppm, as determined by solution state, two-dimensional proton-nitrogen coupled NMR;
(e) an average molecular weight of between about 600 and about 2,500 Daltons; and
(f) an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing.

45. A polyurethane foam comprising a reaction product of a mixture comprising:
(a) an isocyanate-based reactant;
(b) an isocyanate-reactive compound; and
(c) an isolated, water-soluble polypeptide composition that is capable of stabilizing a polyurethane-based foam, wherein the composition comprises one or more of the following features:
(a) an amide-I absorption band between about 1633 cm$^{-1}$ and 1680 cm$^{-1}$, as determined by solid state FTIR;
(b) an amide-II band between approximately 1522 cm$^{-1}$ and 1560 cm$^{-1}$, as determined by solid state FTIR;
(c) two prominent 1° amide N—H stretch absorption bands centered at about 3200 cm$^{-1}$, and at about 3300 cm$^{-1}$, as determined by solid state FTIR;
(d) a prominent cluster of protonated nitrogen nuclei defined by $^{15}$N chemical shift boundaries at about 94 ppm and at about 100 ppm, and $^{1}$H chemical shift boundaries at about 7.6 ppm and at about 8.1 ppm, as determined by solution state, two-dimensional proton-nitrogen coupled NMR;
(e) an average molecular weight of between about 600 and about 2,500 Daltons;
(f) an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing;

(g) the water-soluble polypeptide composition is capable of stabilizing a polyurethane-based foam relative to a polyurethane-based foam created from the same starting composition lacking the water soluble protein composition; or (h) the water-soluble polypeptide composition is capable of reducing the density of a polyurethane-based foam by at least 5% relative to a polyurethane-based foam created from the same starting composition lacking the water-soluble polypeptide composition;

wherein the foam is substantially free of water-insoluble/water dispersible polypeptides.

46. The polyurethane foam of claim 45, wherein the isocyanate-based reactant is an organic polyisocyanate.

47. The polyurethane foam of claim 46, wherein the organic polyisocyanate is polymeric diphenylmethane diisocyanate, 2,4-tolylene diisocyanate, 2,6-tolylene diisocyanate, benzene diisocyanate, m-xylylene diisocyanate, 1,4-phenylene diisocyanate,1,3-phenylene diisocyanate, 4,4'-diphenyl diisocyanate, 4,4'-diphenyldimethylmethane diisocyanate, hexamethylene diisocyanate, tolidine diisocyanate, dianisidine diisocyanate, 1,5-naphthalene diisocyanate, 1,4-cyclohexane diisocyanate, or a combination thereof.

48. The polyurethane foam of claim 45, wherein the isocyanate-based reactant comprises a urethane, allophanate, urea, biuret, carbodiimide, uretonimine, isocyanurate, or a combination thereof.

49. The polyurethane foam of claim 45, wherein the isocyanate-based reactant is polymeric diphenylmethane diisocyanate.

50. The polyurethane foam of claim 49, wherein the isocyanate-reactive compound is a compound having a hydroxyl group or an amino group capable of reacting with the isocyanate.

51. The polyurethane foam of claim 49, wherein the isocyanate-reactive compound is a polyol.

52. The polyurethane foam of claim 45, wherein the foam has a density in the range of from about 0.01 g/cm$^3$ to about 0.5 g/cm$^3$ as determined by ASTM D-7487.

53. The polyurethane foam of claim 45, wherein the foam has a density that is from 5% to 80% less dense than a foam created from the same starting composition lacking the protein containing composition.

* * * * *